US012578615B2

(12) United States Patent
McManamon et al.

(10) Patent No.: US 12,578,615 B2
(45) Date of Patent: Mar. 17, 2026

(54) SYSTEM, METHOD, AND APPARATUS FOR HIGH PRECISION LIGHT BEAM STEERING

(71) Applicant: Exciting Technology LLC, Dayton, OH (US)

(72) Inventors: Paul F. McManamon, Dayton, OH (US); Abtin Ataei, Oakwood, OH (US)

(73) Assignee: Exciting Technology LLC, Dayton, OH (US)

( * ) Notice: Subject to any disclaimer, the term of this patent is extended or adjusted under 35 U.S.C. 154(b) by 241 days.

(21) Appl. No.: 18/339,151

(22) Filed: Jun. 21, 2023

(65) Prior Publication Data

US 2023/0350192 A1     Nov. 2, 2023

Related U.S. Application Data

(63) Continuation of application No. PCT/US2022/033640, filed on Jun. 15, 2022, which
(Continued)

(51) Int. Cl.
*G02F 1/00*          (2006.01)
*G02B 7/10*          (2021.01)
(Continued)

(52) U.S. Cl.
CPC ................. *G02F 1/29* (2013.01); *G02B 7/10* (2013.01); *G02B 26/0875* (2013.01); *G02B 26/0891* (2013.01); *G02B 26/101* (2013.01)

(58) Field of Classification Search
CPC ......... G02F 1/29; G02B 7/10; G02B 26/0875; G02B 26/0891; G02B 26/101
(Continued)

(56) References Cited

U.S. PATENT DOCUMENTS

| 3,822,932 A | 7/1974 | Humphrey |
| 3,940,204 A | 2/1976 | Withrington |

(Continued)

FOREIGN PATENT DOCUMENTS

| DE | 102007004609 A1 | 8/2007 |
| EP | 0903608 A2 | 3/1999 |

(Continued)

OTHER PUBLICATIONS

"Surface", Britannica School, Encyclopedia Britannica, Inc., URL: school.eb.com/levels/high/article/surface/473422, Dec. 1, 2020, 1 page.
(Continued)

*Primary Examiner* — Daniel A Hess
(74) *Attorney, Agent, or Firm* — GTC Law Group PC & Affiliates

(57) ABSTRACT

An example system includes a first steering lens positioned between an EM source and a second steering lens, and the second steering lens positioned between the first steering lens and an emission lens. The example system includes the first and second steering lenses having a combined first effective focal length, and where the emission lens is a positive lens have a second focal length. The example system includes the first effective focal length being shorter than the second focal length. The example system includes a first steering actuator that move the first steering lens along a first movement course, and a second steering actuator that moves the second steering lens along a second movement course.

18 Claims, 38 Drawing Sheets

Related U.S. Application Data is a continuation-in-part of application No. PCT/US2021/027986, filed on Apr. 19, 2021, and a continuation-in-part of application No. PCT/US2020/056253, filed on Oct. 19, 2020.

(60) Provisional application No. 63/210,734, filed on Jun. 15, 2021, provisional application No. 63/296,086, filed on Jan. 3, 2022, provisional application No. 63/314,989, filed on Feb. 28, 2022, provisional application No. 63/011,706, filed on Apr. 17, 2020, provisional application No. 63/040,319, filed on Jun. 17, 2020.

(51) Int. Cl.
*G02B 26/08* (2006.01)
*G02B 26/10* (2006.01)
*G02F 1/29* (2006.01)

(58) Field of Classification Search
USPC ........................................................ 359/226.2
See application file for complete search history.

(56) References Cited

U.S. PATENT DOCUMENTS

| | | |
|---|---|---|
| 4,243,300 A | 1/1981 | Richards et al. |
| 5,223,971 A | 6/1993 | Magel |
| 5,249,079 A | 9/1993 | Umeda |
| 5,392,157 A | 2/1995 | Shih |
| 5,444,572 A | 8/1995 | Gal et al. |
| 5,598,299 A | 1/1997 | Hayakawa |
| 5,703,726 A | 12/1997 | Griffith |
| 5,923,480 A | 7/1999 | Labeye |
| 5,943,159 A | 8/1999 | Zhu |
| 5,987,041 A | 11/1999 | Taniguchi et al. |
| 6,169,594 B1 | 1/2001 | Aye et al. |
| 6,172,792 B1 | 1/2001 | Jepsen et al. |
| 6,288,815 B1 | 9/2001 | Lambert |
| 6,295,171 B1 | 9/2001 | Chao et al. |
| 6,317,251 B1 | 11/2001 | Wang |
| 6,373,620 B1 | 4/2002 | Wang |
| 6,384,975 B1 | 5/2002 | Hayakawa |
| 6,400,855 B1 | 6/2002 | Li et al. |
| 6,456,419 B1 | 9/2002 | Winker et al. |
| 6,556,260 B1 | 4/2003 | Itou et al. |
| 6,728,033 B2 | 4/2004 | Hayakawa |
| 6,746,618 B2 | 6/2004 | Li et al. |
| 6,807,329 B2 | 10/2004 | Zalevsky et al. |
| 6,832,028 B2 | 12/2004 | Gu et al. |
| 6,985,373 B2 | 1/2006 | Tsu |
| 7,057,787 B2 | 6/2006 | Cicchiello et al. |
| 7,265,911 B2 | 9/2007 | Goosey et al. |
| 7,352,514 B2 | 4/2008 | Hendriks et al. |
| 7,411,711 B2 | 8/2008 | Debenedictis et al. |
| 7,411,724 B2 | 8/2008 | Cicchiello et al. |
| 7,518,779 B2 | 4/2009 | Wasilousky |
| 7,544,945 B2 | 6/2009 | Tan et al. |
| 7,678,507 B2 | 3/2010 | Cole et al. |
| 7,683,975 B2 | 3/2010 | Kageyama |
| 7,720,116 B2 | 5/2010 | Anderson et al. |
| 8,014,050 B2 | 9/2011 | Mcgrew |
| 8,301,027 B2 | 10/2012 | Shaw et al. |
| 8,614,743 B2 | 12/2013 | Winsor |
| 8,654,292 B2 | 2/2014 | Kubota et al. |
| 8,674,792 B2 | 3/2014 | Yonak et al. |
| 8,699,137 B2 | 4/2014 | Mcgrew |
| 8,717,659 B2 | 5/2014 | Zheludev et al. |
| 8,941,921 B2 | 1/2015 | Ito et al. |
| 8,982,313 B2 | 3/2015 | Escuti et al. |
| 9,025,230 B2 | 5/2015 | Sagan et al. |
| 9,075,324 B2 | 7/2015 | Zimmerman et al. |
| 9,164,206 B2 | 10/2015 | Valley et al. |
| 9,291,828 B2 | 3/2016 | Kroll et al. |
| 9,369,106 B2 | 6/2016 | Yonak et al. |
| 9,577,327 B2 | 2/2017 | Driscoll et al. |
| 9,594,262 B2 | 3/2017 | Zheludev et al. |
| 9,709,829 B2 | 7/2017 | Mcgrew |
| 9,753,351 B2 | 9/2017 | Eldada |
| 9,857,591 B2 | 1/2018 | Welch et al. |
| 9,915,850 B2 | 3/2018 | Bitauld et al. |
| 9,989,765 B2 | 6/2018 | Jepsen |
| 10,162,182 B2 | 12/2018 | Jepsen |
| 10,295,671 B2 | 5/2019 | Gazit et al. |
| 10,297,180 B2 | 5/2019 | Shi et al. |
| 10,303,037 B2 | 5/2019 | Spector et al. |
| 10,338,451 B2 | 7/2019 | Shi et al. |
| 10,345,599 B2 | 7/2019 | Jepsen |
| 10,359,629 B2 | 7/2019 | Jepsen |
| 10,359,686 B2 | 7/2019 | Galstian et al. |
| 10,386,489 B2 | 8/2019 | Albelo et al. |
| 10,451,876 B2 | 10/2019 | Jepsen |
| 10,459,305 B2 | 10/2019 | Shi et al. |
| 10,534,173 B2 | 1/2020 | Jepsen |
| 10,552,676 B2 | 2/2020 | Shroff et al. |
| 10,649,235 B2 | 5/2020 | Ito |
| 10,670,928 B2 | 6/2020 | Shi et al. |
| 10,761,195 B2 | 9/2020 | Donovan |
| 10,838,043 B2 | 11/2020 | Hansson |
| 10,845,671 B2 | 11/2020 | McManamon et al. |
| 10,989,982 B2 | 4/2021 | Ataei et al. |
| 11,169,425 B2 | 11/2021 | Ataei et al. |
| 11,221,435 B2 | 1/2022 | Gopinath et al. |
| 11,561,451 B2 | 1/2023 | Ataei et al. |
| 11,762,068 B2 | 9/2023 | Donovan |
| 11,822,205 B2 * | 11/2023 | McManamon .... G02B 26/0891 |
| 11,835,837 B2 | 12/2023 | McManamon et al. |
| 11,835,838 B2 | 12/2023 | McManamon et al. |
| 11,835,841 B2 | 12/2023 | McManamon et al. |
| 11,921,399 B2 | 3/2024 | Tigaev et al. |
| 12,055,836 B2 | 8/2024 | Mcmanamon et al. |
| 12,248,139 B2 | 3/2025 | Mcmanamon et al. |
| 12,379,640 B2 * | 8/2025 | McManamon .......... G02B 7/10 |
| 12,405,460 B2 | 9/2025 | Mcmanamon et al. |
| 2002/0126383 A1 | 9/2002 | Hayakawa |
| 2003/0021519 A1 | 1/2003 | Zalevsky et al. |
| 2003/0220184 A1 | 11/2003 | Li et al. |
| 2004/0067013 A1 | 4/2004 | Gu et al. |
| 2004/0135965 A1 | 7/2004 | Holmes |
| 2004/0264229 A1 | 12/2004 | Tsu |
| 2005/0213964 A1 | 9/2005 | Kreger et al. |
| 2005/0265403 A1 | 12/2005 | Anderson et al. |
| 2005/0271325 A1 | 12/2005 | Anderson et al. |
| 2006/0092499 A1 | 5/2006 | Cicchiello et al. |
| 2006/0119928 A1 | 6/2006 | Cicchiello et al. |
| 2007/0106285 A1 | 5/2007 | Raksi |
| 2007/0146910 A1 | 6/2007 | Duston et al. |
| 2007/0166625 A1 | 7/2007 | Cole et al. |
| 2007/0181810 A1 | 8/2007 | Tan et al. |
| 2007/0279365 A1 | 12/2007 | Kageyama |
| 2008/0015553 A1 | 1/2008 | Zacharias |
| 2008/0212007 A1 | 9/2008 | Meredith |
| 2008/0239420 A1 | 10/2008 | Mcgrew |
| 2008/0247031 A1 | 10/2008 | Wasilousky |
| 2009/0046338 A1 | 2/2009 | Zimmerman et al. |
| 2009/0073411 A1 | 3/2009 | Tanitsu |
| 2009/0079824 A1 | 3/2009 | Winsor |
| 2009/0206963 A1 | 8/2009 | Nguyen et al. |
| 2009/0304328 A1 | 12/2009 | Presley et al. |
| 2010/0046953 A1 | 2/2010 | Shaw et al. |
| 2010/0165322 A1 | 7/2010 | Kane et al. |
| 2010/0301971 A1 | 12/2010 | Yonak et al. |
| 2010/0302492 A1 | 12/2010 | Kubota et al. |
| 2011/0025955 A1 | 2/2011 | Bos et al. |
| 2011/0028948 A1 | 2/2011 | Raksi et al. |
| 2011/0286063 A1 | 11/2011 | Mcgrew |
| 2012/0188467 A1 | 7/2012 | Escuti et al. |
| 2012/0327502 A1 | 12/2012 | Zheludev et al. |
| 2013/0128334 A1 | 5/2013 | Stephen |
| 2013/0241761 A1 | 9/2013 | Cooper et al. |
| 2013/0286309 A1 | 10/2013 | Valley et al. |
| 2013/0307644 A1 | 11/2013 | Yonak et al. |
| 2014/0016051 A1 | 1/2014 | Kroll et al. |

(56) References Cited

U.S. PATENT DOCUMENTS

| | | | |
|---|---|---|---|
| 2015/0049377 A1 | 2/2015 | Zheludev et al. | |
| 2015/0293409 A1 | 10/2015 | Usukura et al. | |
| 2015/0301427 A1 | 10/2015 | Galstian et al. | |
| 2015/0346495 A1 | 12/2015 | Welch et al. | |
| 2015/0346521 A1 | 12/2015 | Williams | |
| 2015/0378241 A1 | 12/2015 | Eldada | |
| 2016/0170287 A1 | 6/2016 | Bitauld et al. | |
| 2016/0327636 A1 | 11/2016 | Gazit et al. | |
| 2017/0038590 A1 | 2/2017 | Jepsen | |
| 2017/0039904 A1 | 2/2017 | Jepsen | |
| 2017/0039906 A1 | 2/2017 | Jepsen | |
| 2017/0039907 A1 | 2/2017 | Jepsen | |
| 2017/0039960 A1 | 2/2017 | Jepsen | |
| 2017/0059960 A1 | 3/2017 | Shi et al. | |
| 2017/0061838 A1 | 3/2017 | Shi et al. | |
| 2017/0109562 A1 | 4/2017 | Shroff et al. | |
| 2017/0115519 A1 | 4/2017 | Shi et al. | |
| 2017/0176753 A1 | 6/2017 | Shi et al. | |
| 2017/0269453 A1 | 9/2017 | Galstian et al. | |
| 2017/0307736 A1 | 10/2017 | Donovan | |
| 2017/0357142 A1 | 12/2017 | Spector et al. | |
| 2018/0038576 A1 | 2/2018 | Mao | |
| 2018/0101083 A1 | 4/2018 | Aflatouni et al. | |
| 2018/0136538 A1 | 5/2018 | Khan | |
| 2018/0180256 A1 | 6/2018 | Mao et al. | |
| 2018/0252924 A1 | 9/2018 | Jepsen | |
| 2018/0275394 A1 | 9/2018 | Yeoh et al. | |
| 2018/0284461 A1 | 10/2018 | Grasser | |
| 2018/0364463 A1 | 12/2018 | Yuan et al. | |
| 2019/0129275 A1 | 5/2019 | McManamon et al. | |
| 2019/0146070 A1 | 5/2019 | Hansson | |
| 2019/0187482 A1 | 6/2019 | Lanman | |
| 2019/0285902 A1 | 9/2019 | Ouderkirk et al. | |
| 2020/0124864 A1 | 4/2020 | Rothberg et al. | |
| 2020/0183016 A1 | 6/2020 | Wang et al. | |
| 2020/0326606 A1 | 10/2020 | Ataei et al. | |
| 2020/0333679 A1 | 10/2020 | Ataei et al. | |
| 2020/0333680 A1 | 10/2020 | Ataei et al. | |
| 2020/0333682 A1 | 10/2020 | Ataei et al. | |
| 2021/0048723 A1 | 2/2021 | McManamon et al. | |
| 2021/0048725 A1 | 2/2021 | McManamon et al. | |
| 2021/0116778 A1 | 4/2021 | Zhang et al. | |
| 2021/0311369 A1 | 10/2021 | McManamon et al. | |
| 2021/0333443 A1 | 10/2021 | Gopinath et al. | |
| 2022/0326589 A1 | 10/2022 | Ataei et al. | |
| 2022/0350135 A1 | 11/2022 | McManamon et al. | |
| 2022/0350136 A1 | 11/2022 | McManamon et al. | |
| 2022/0360037 A1 | 11/2022 | McManamon et al. | |
| 2023/0038746 A1* | 2/2023 | McManamon | G02B 7/10 |
| 2023/0039081 A1* | 2/2023 | McManamon | G02F 1/29 |
| 2023/0161219 A1 | 5/2023 | McManamon et al. | |
| 2023/0168560 A1 | 6/2023 | McManamon et al. | |
| 2023/0296958 A1 | 9/2023 | Ataei et al. | |
| 2023/0324762 A1 | 10/2023 | McManamon et al. | |
| 2023/0350192 A1* | 11/2023 | McManamon | G02B 7/10 |

FOREIGN PATENT DOCUMENTS

| | | |
|---|---|---|
| WO | 2015171125 A1 | 11/2015 |
| WO | 2018097869 A2 | 5/2018 |
| WO | 2018097869 A3 | 8/2018 |
| WO | 2020086111 A1 | 4/2020 |
| WO | 2020086692 A1 | 4/2020 |
| WO | 2020086111 A9 | 12/2020 |
| WO | 2021119165 A1 | 6/2021 |
| WO | 2021119165 A8 | 8/2021 |
| WO | 2021211162 A1 | 10/2021 |
| WO | 2021211163 A1 | 10/2021 |
| WO | 2022005554 A1 | 1/2022 |
| WO | 2022266229 A1 | 12/2022 |

OTHER PUBLICATIONS

"Symmetry", Encyclopedia Britannica, Inc., URL: https://www.britannica.com/science/symmetry-crystallography, Dec. 8, 2017, 2 pages.

Cheng, Jierong , et al., "Real-time two-dimensional beam steering with gate-tunable materials: a theoretical investigation", Appl. Opt. 55,, 2016, pp. 6134-6144.

Gibson, Jennifer L., et al., "Wide Angle Decentered Lens Beam Steering for Infrared Countermeasures", Opt'Eng; Publication [online]. Mar. 31, 2004 [retrieved Dec. 26, 2020]. Retrieved from the Internet;, Mar. 31, 2004, 11 pages.

Glockner, Steffen , et al., "Micro-opto-mechanical beam deflectors", Opt Eng; Publication [online]. Jan. 12, 1997 [retrieved Dec. 31, 2020], Retrieved from the Internet; DOI:, Jan. 12, 1997, 7 pages.

Hassanfiroozi, Amir , et al., "Dual layer electrode liquid crystal lens for 2D/3D tunable endoscopy imaging system", Optics Express; vol. 24, No. 8, Apr. 18, 2016, 12 pages.

Hatcher, Burrell R., ""Granularity of beam positions in digital phased arrays"", Proceedings of the IEEE (vol. 56, Issue: 11, Nov. 1968), Nov. 1968, 1795-1800.

Isaenko, Ludmila , et al., "Properties of LiGaO.5InO.5Se2: A Quaternary Chalcogenide Crystal for Nonlinear Optical Applications in the Mid-IR, Crystals", 6, 85; doi: 10.3390/cryst6080085., 2016, 10 pages.

Jiang, Tao , et al., "Low-DC Voltage-Controlled Steering-Antenna Radome Utilizing Tunable Active Metamaterial", IEEE Transactions on Microwave Theory and Techniques, vol. 60, No. 1, Jan. 2012, pp. 170-178.

Lou, Yimin , et al., "Design and fabrication of tunable liquid crystal diffractive lens", Optical Engineering 091713-1, vol. 52(9), 2013, 6 pages.

McManamon, Paul F., et al., ""Broadband optical phased-array beam steering"", Opt. Eng. 44, 128004, 2005, Dec. 2005, 1-5.

McManamon, Paul F., et al., "Nonmechanical beam steering for active and passive sensors", Downloaded From: https://www.spiedigitallibrary.org/conference-proceedings-of-spie on Aug. 22, 2019 Terms of Use: https://www.spiedigitallibrary.org/terms-of-use, 1993, 1-10.

McManamon, Paul F., et al., ""Optical Phased Array Technology"", Proc. IEEE 84(2), 268-298,, Feb. 1996, 268-298.

McManamon, Paul F., et al., "A Review of Phased Array Steering for Narrow-Band Electrooptical Systems", Proceedings of the IEEE | vol. 97, No. 6, Jun. 2009, 19 pages.

McManamon, Paul F., "LIDAR Technologies and Systems", https://doi.org/10.1117/3.2518254, 2019, p. 329.

Oliveri, Giacomo , et al., "Reconfigurable electromagnetics through metamaterials—a review", Proceedings of the IEEE, 103(7), 2015, pp. 1034-1056.

Orazbayev, B. , et al., "Graphene-dielectric metamaterial for beam steering", 2016 10th International Congress on Advanced Electromagnetic Materials in Microwaves and Optics (Metamaterials), 2016, 2016, pp. 253-255.

Orazbayev, B. , et al., "Tunable beam steering enabled by graphene metamaterials", Opt. Express 24, 2016, pp. 8848-8861.

Orazbayev, Bakhtiyar , et al., "Ultrafast beam steering based on graphene metamaterial", 2017 11th European Conference on Antennas and Propagation (EUCAP), 2017, pp. 3896-3899.

Pancharatnam, S. , "Achromatic combinations of birefringent plates—Part II. An achromatic quarter-wave plate", Indian Academy of Sciences, vol. 41, issue 4, Apr. 1955, pp. 137-144.

PCT/US19/57616 , "International Application Serial No. PCT/US19/57616, International Preliminary Report on Patentability mailed May 6, 2021", Exciting Technology LLC, 9 pages.

PCT/US19/57616 , "International Application Serial No. PCT/US19/57616, International Search Report and Written Opinion mailed Jan. 13, 2020", Exciting Technology LLC, 10 pages.

PCT/US2019/023915 , "International Application Serial No. PCT/US2019/023915, International Preliminary Report on Patentability mailed May 6, 2021", Exciting Technology LLC, 12 pages.

PCT/US2019/023915 , "International Application Serial No. PCT/US2019/023915, International Search Report and Written Opinion mailed Jul. 18, 19", Exciting Technology LLC, 15 pages.

(56) References Cited

OTHER PUBLICATIONS

PCT/US2019/023915 , "International Application Serial No. PCT/US2019/023915, Invitation to Pay Additional Fees and, Where Applicable, Protest Fee mailed May 29, 2019", Exciting Technology LLC, 2 pages.

PCT/US2020/056253 , "International Application Serial No. PCT/US2020/056253, International Preliminary Report on Patentability mailed Oct. 13, 2022", Exciting Technology LLC, 9 pages.

PCT/US2020/056253 , "International Application Serial No. PCT/US2020/056253, International Search Report and Written Opinion mailed Feb. 3, 2021", Exciting Technology LLC, 8 pages.

PCT/US2020/056254 , "International Application Serial No. PCT/US2020/056254, International Preliminary Report on Patentability mailed Oct. 27, 2022", Exciting Technology LLC, 10 pages.

PCT/US2020/056254 , "International Application Serial No. PCT/US2020/056254, International Search Report and Written Opinion mailed Mar. 17, 2021", Exciting Technology LLC, 11 pages.

PCT/US2020/056254 , "International Application Serial No. PCT/US2020/056254, Invitation to Pay Additional Fees and, Where Applicable, Protest Fee mailed Jan. 11, 2021", Exciting Technology LLC, 2 pages.

PCT/US2020/064071 , "International Application Serial No. PCT/US2020/064071, International Preliminary Report on Patentability mailed May 17, 2022", Exciting Technology LLC, 13 pages.

PCT/US2020/064071 , "International Application Serial No. PCT/US2020/064071, International Search Report and Written Opinion mailed Apr. 16, 2021", Exciting Technology LLC, 14 pages.

PCT/US2020/064071 , "International Application Serial No. PCT/US2020/064071, Invitation to Pay Additional Fees and, Where Applicable, Protest Fee mailed Feb. 19, 2021", Exciting Technology LLC, 2 pages.

PCT/US2021/027986 , "International Application Serial No. PCT/US2021/027986, International Preliminary Report on Patentability mailed Jan. 12, 2023", Exciting Technology LLC, 15 pages.

PCT/US2021/027986 , "International Application Serial No. PCT/US2021/027986, International Search Report and Written Opinion mailed Jul. 14, 2021", Exciting Technology LLC, 14 pages.

PCT/US2022/033640 , "International Application Serial No. PCT/US2022/033640, International Search Report and Written Opinion mailed Oct. 5, 2022", Exciting Technology LLC, 12 pages.

PCT/US2022/033640 , "International Application Serial No. PCT/US2022/033640, International Preliminary Report on Patentability and Written Opinion mailed Dec. 28, 2023", Exciting Technology LLC, 6 pages.

Rabinovich, William S., et al., "Two-dimensional beam steering using a thermo-optic silicon photonic optical-phased-array", Opt. Eng. 55(11), 111603 (2016), doi: 10.1117/1.OE.55.11.111603, 2016, 8 pages.

Reis, Joao , et al., "Two-dimensional antenna beamsteering using metamaterial transmitarray", 2015 9th European Conference on Antennas and Propagation (EuCAP), 2015, 2015, pp. 1-5.

Salary, Mohammad Mahdi, et al., "Electrically Tunable Metamaterials Based on Multimaterial Nanowires Incorporating Transparent Conductive Oxides", Scientific Reports 7: 10055, DOI: 10.1038/S41598-017-09523-4, 2017, 14 pages.

Scheuer, Jacob , "Metasurfaces-based holography and beam shaping: engineering the phase profile of light", Nanophotonics 2017; 6(1):, 2017, pp. 137-152.

Shang, Xiaobing , et al., "Tunable Optical Beam Deflection via Liquid Crystal Gradient Refractive Index Generated by Highly Resistive Polymer Film", IEEE Photonics Journal, vol. 8, No. 3, 2016, pp. 1-11.

Thalhammer, Gregor , et al., ""Speeding up liquid crystal SLMs using overdrive with phase change reduction"", Jan. 28, 2013 / vol. 21, No. 2/ Optics Express p. 1779-1797, Jan. 2013, 1779-1797.

Wang, X. , et al., ""Spatial resolution limitation of liquid crystal spatial light modulator"", Liquid Crystal Conference, Great Lakes Photonics Symposium, Cleveland, OH Jun. 7-11, 2004, Oct. 2004, 45-57.

Wolf, Omri , et al., "Enhanced optical nonlinearities in the near-infrared using III-nitride heterostructures coupled to metamaterials", Appl. Phys. Lett. 107, 151108 (2015); https://doi.Org/10.1063/1.4933332, 2015, 6 pages.

Wolf, Omri , et al., "Phased-array sources based on nonlinear metamaterial nanocavities", Nature Communications 6:7667 | DOI: 10.1038/ncomms8667 |www.nature.com/naturecommunications, 2015, 6 pages.

Yu, Nanfang , et al., "Flat optics with designer metasurfaces", Nature Materials | vol. 13, www.nature.com/naturematerials., Feb. 2014, 12 pages.

"European Application Serial No. 20931402.0, Extended European Search Report mailed Mar. 4, 2024", Exciting Technology LLC, 5 pages.

"European Application Serial No. 21833255.9, European Search Report mailed Jun. 18, 2024", Exciting Technology LLC, 11 pages.

Bawart, et al., "Dynamic beam-steering by a pair of rotating diffractive elements", Optics Communications, vol. 460, 125071, ISSN 0030-4018, https://doi.Org/10.1016/j.optcom.2019.125071, 2020, 6 pages.

Duerr, et al., "Tracking integration in concentrating photovoltaics using laterally moving optics", Opt. Express 19, A207-A218, 2011, 12 pages.

Fan, et al., "Switchable Fresnel lens using polymer-stabilized liquid crystals", Opt. Express 11, 2003, pp. 3080-3086.

"Military Handbook Optical Design", Jul. 29, 1986, 1 page.

Lin, et al., "Broadband and polarization-independent beam steering using dielectrophoresis-tilted prism", Opt. Express 17, 2009, pp. 8651-8656.

"Military Standardization Handbook Optical Design", specifically pp. 8-15, section 8.7.4.2, points 1-3, Oct. 5, 1962, 714 pages.

Niu, et al., "High precision beam steering using a liquid crystal spatial light modulator", Optical and Quantum Electronics, Springer US, New York, vol. 51, No. 6, XP036790412, ISSN: 0306-8919, DOI: 10.1007/S11082-019-1858-0, May 24, 2019, pp. 1-13.

Ren, et al., "Liquid crystal lens with large focal length tunability and low operating voltage", Opt. Express 15, 2007, pp. 11328-11335.

Serati, et al., "Advanced liquid crystal on silicon optical phased arrays", Proceedings, IEEE Aerospace Conference, Big Sky, MT, USA, 2002, 9 pages.

Shi, et al., "Design considerations for high efficiency liquid crystal decentered microlens arrays for steering light", Appl. Opt. 49,, 2010, pp. 109-421.

Zohrabi, et al., "Wide-angle nonmechanical beam steering using liquid lenses", Opt. Express 24, 2016, pp. 23798-23809.

* cited by examiner

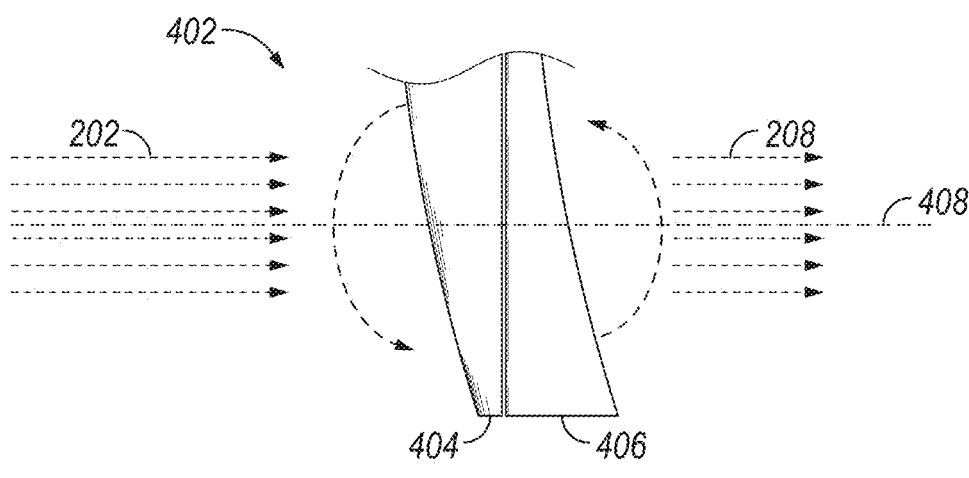
*FIG. 6A*
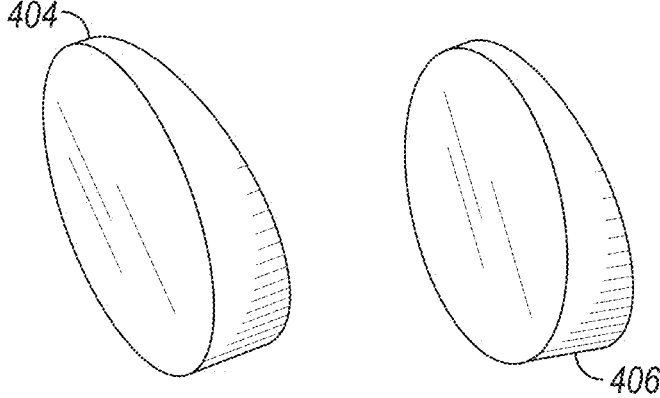
*FIG. 6B*

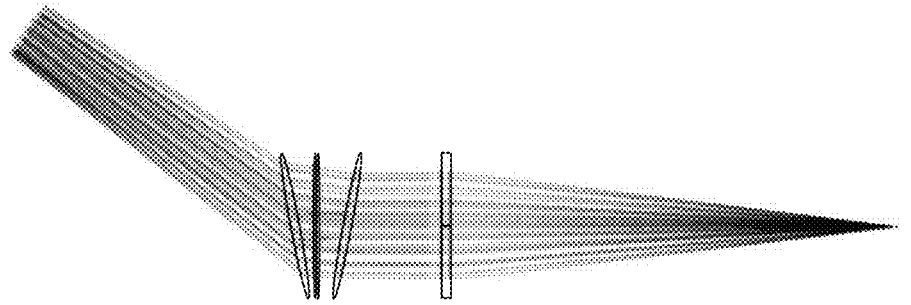
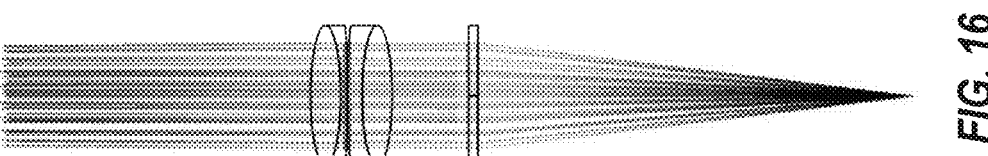
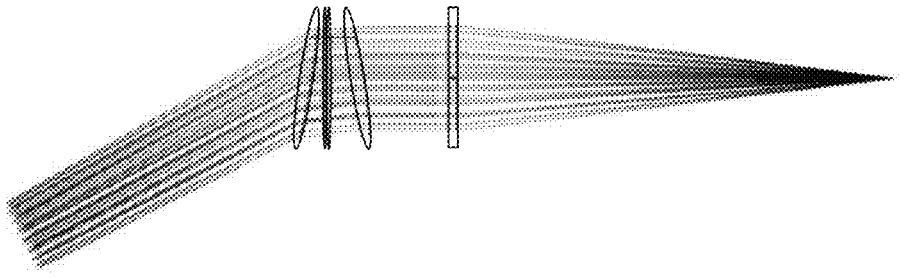
*FIG. 16*

3100

3102            3104

V1            V2

3200

3202

3204

V1

V2

3700

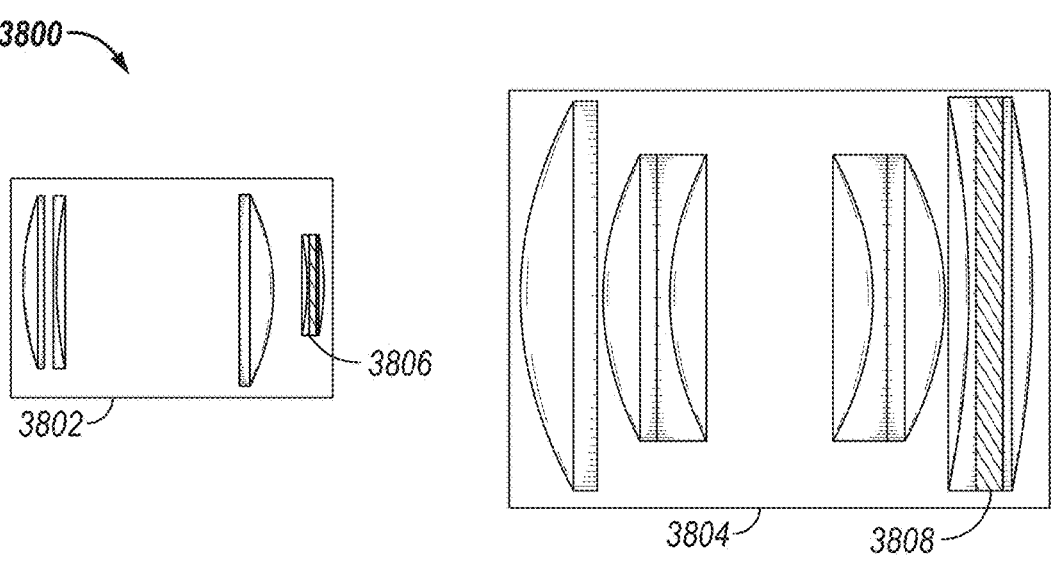
*FIG. 38*
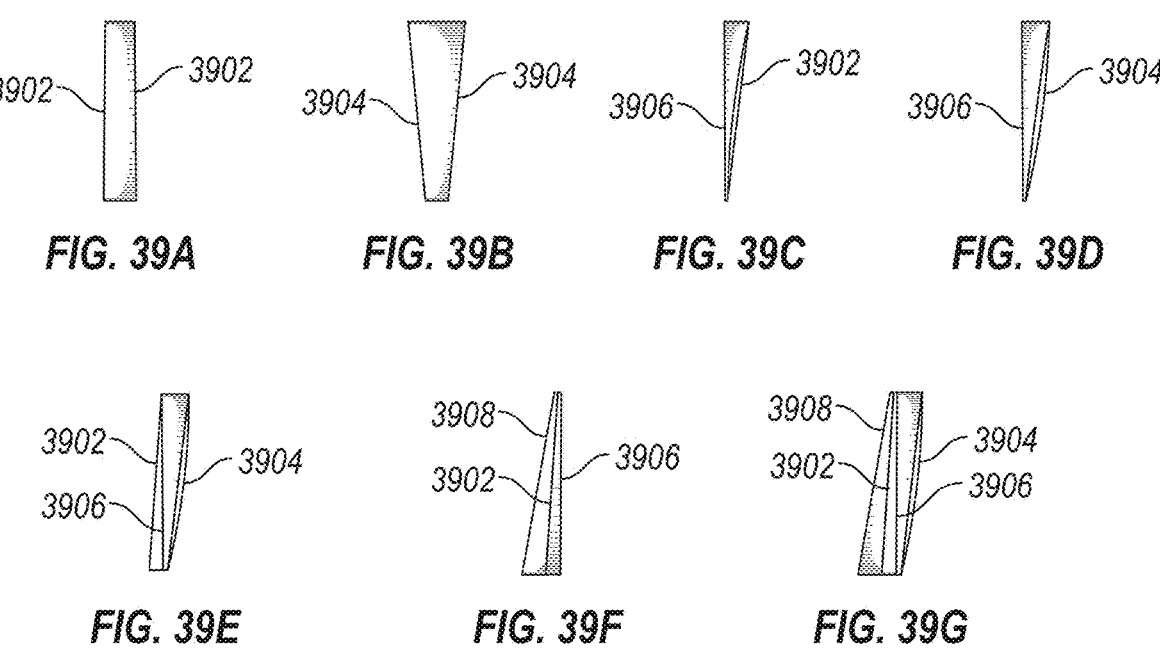
*FIG. 39A*    *FIG. 39B*    *FIG. 39C*    *FIG. 39D*
*FIG. 39E*    *FIG. 39F*    *FIG. 39G*

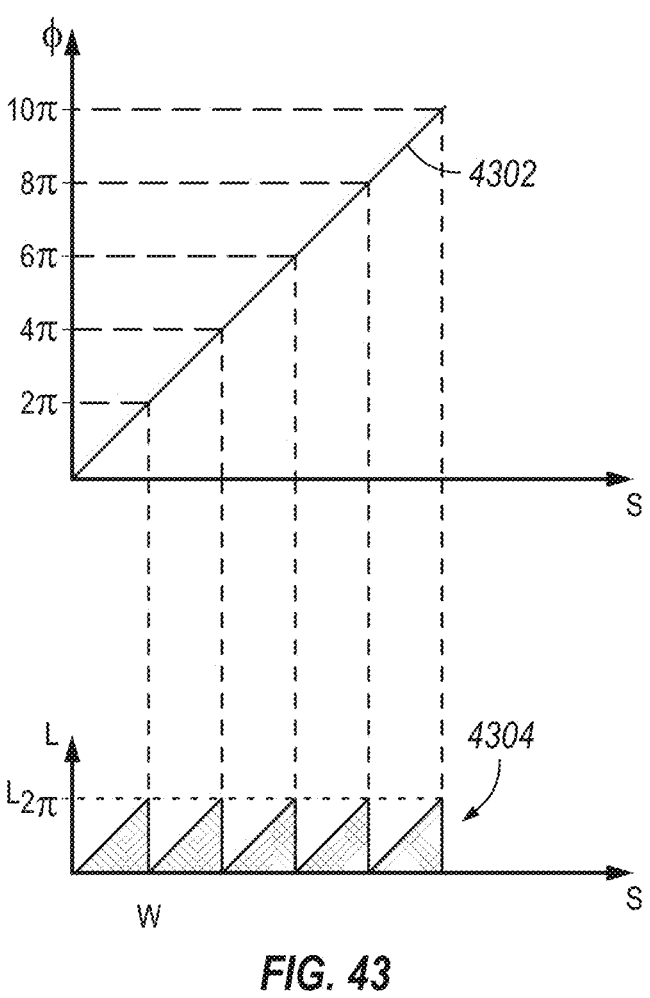
*FIG. 43*
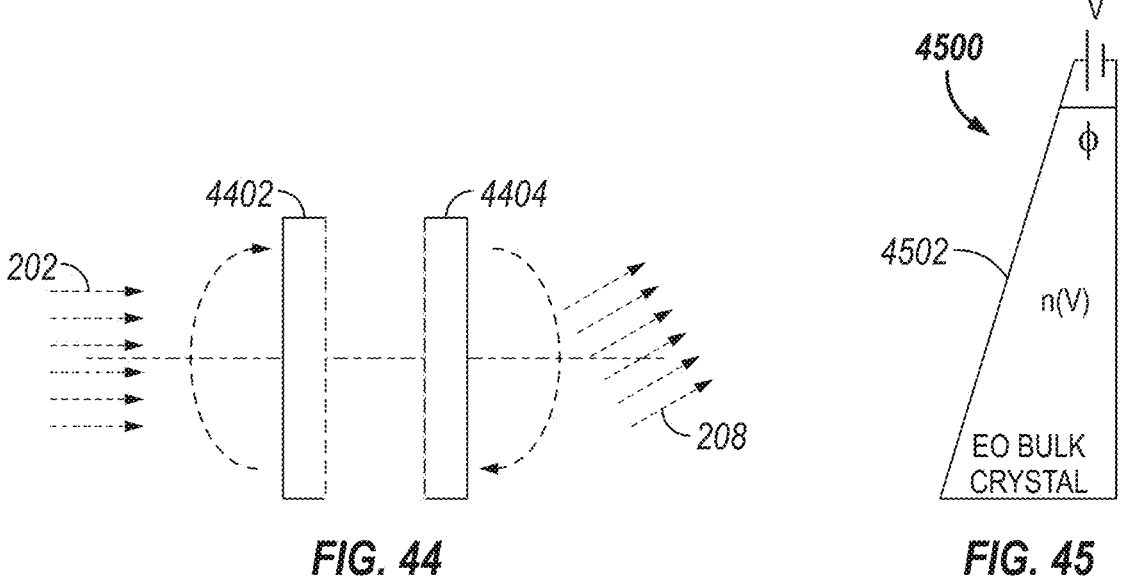
*FIG. 44*             *FIG. 45*

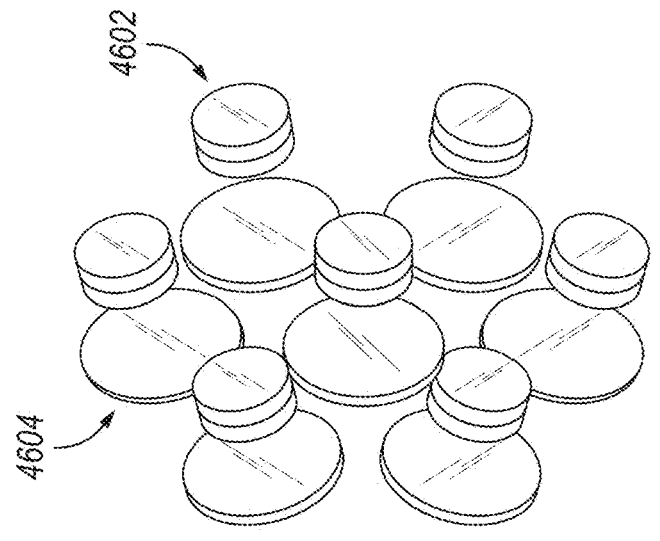
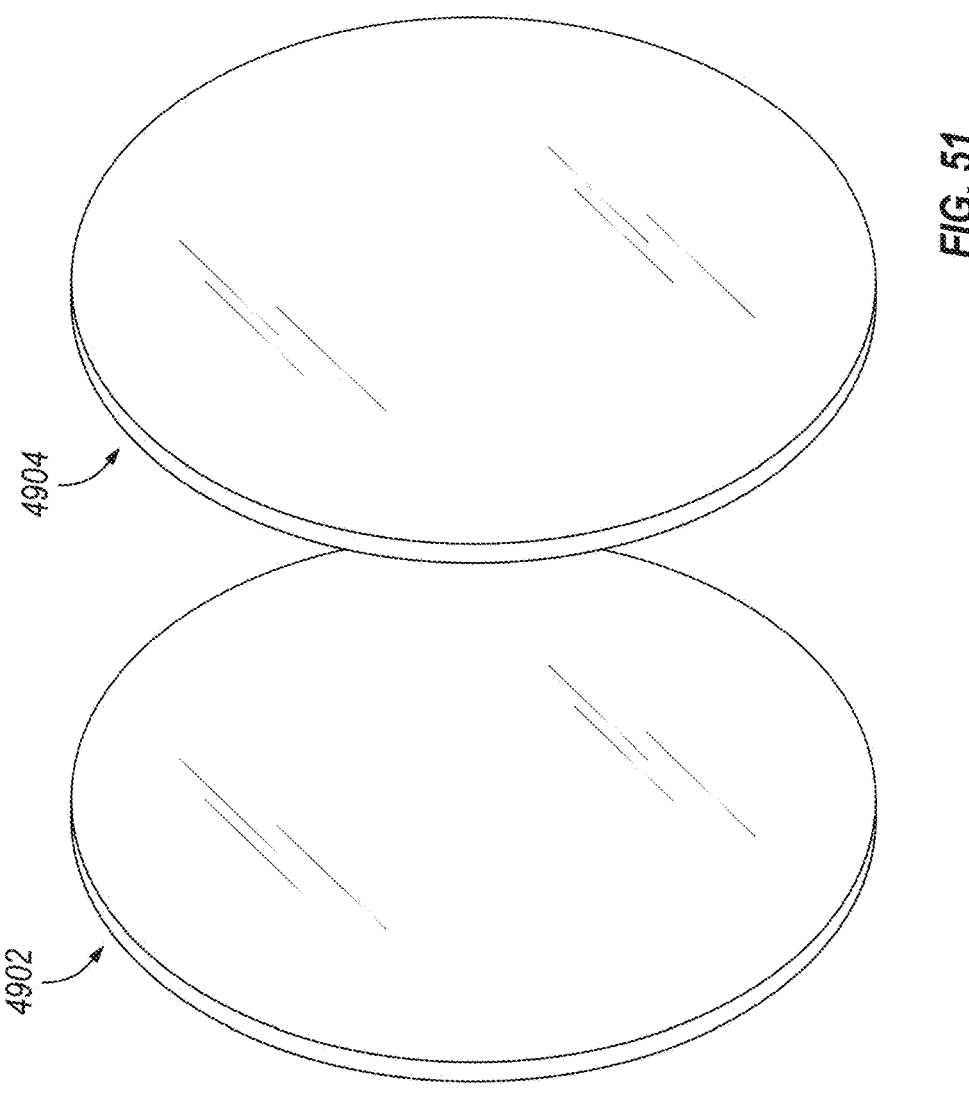
FIG. 51

SYSTEM, METHOD, AND APPARATUS FOR HIGH PRECISION LIGHT BEAM STEERING

CROSS-REFERENCE TO RELATED APPLICATIONS

The present application is a bypass continuation of International Application Serial No. PCT/US2022/033640, filed 15 Jun. 2022, and entitled "SYSTEM, METHOD, AND APPARATUS FOR HIGH PRECISION LIGHT BEAM STEERING", now published as WO 2022/266229.

International Application Serial No. PCT/US2022/033640 claims the benefit of U.S. Provisional Application Ser. No. 63/210,734, filed on 15 Jun. 2021, and entitled "OPTICAL AND PHOTONIC BEAM STEERING USING ROTATING LENS ELEMENTS".

International Application Serial No. PCT/US2022/033640 claims the benefit of U.S. Provisional Application Ser. No. 63/296,086, filed on 3 Jan. 2022, and entitled "HIGH PRECISION ELECTRO-OPTICAL BEAM STEERING BASED ON DECENTRED LENSES".

International Application Serial No. PCT/US2022/033640 claims the benefit of U.S. Provisional Application Ser. No. 63/314,989, filed on 28 Feb. 2022 and entitled "BEAM SCANNER".

International Application Serial No. PCT/US2022/033640 claims priority to, and is a continuation-in-part of, International Application Serial No. PCT/US2021/027986, filed 19 Apr. 2021 entitled "SYSTEM, METHOD AND APPARATUS FOR NON-MECHANICAL OPTICAL AND PHOTONIC BEAM STEERING", now published as WO 2022/005554.

International Application Serial No. PCT/US2022/033640 claims priority to, and is a continuation-in-part of, International Application Serial No. PCT/US2020/056253 filed 19 Oct. 2020 and entitled "DECENTERED LENS LIGHT BEAM STEERING", now published as WO 2021/211162. International Application Serial No. PCT/US2020/056253 claims priority to U.S. Provisional Application Ser. No. 63/011,706 filed 17 Apr. 2020 entitled "DECENTERED LENS LIGHT BEAM ELECTRO-MECHANICAL STEERING". International Application Serial No. PCT/US2020/056253 also claims priority to U.S. Application Ser. No. 63/040,319, filed 17 Jun. 2020, and entitled "DECENTERED LENS LIGHT BEAM ELECTRO-MECHANICAL STEERING".

Each of the foregoing patent applications is incorporated by reference herein in the entirety for all purposes.

BACKGROUND

Previously known beam steering devices suffer from a number of drawbacks. Previously known devices are constrained in one or more dimensions such as steering capability (e.g., magnitude of steering deflection angle), steering efficiency (e.g., amount of the beam energy that is incident upon the target, with losses due to side lobes, vignetting losses, steering portions of the beam to undesired locations, fringing fields, and/or losses to heat within a steering device), scan speed (e.g., time to traverse a desired steering range, and/or time between steering events from one arbitrary position to another), and/or aperture size (e.g., the effective width of a beam that can be steered). Previously known devices are often configured to support one of these aspects, while sacrificing performance for other aspects. In certain embodiments, previously known devices may be formed to achieve a desired performance by adding cost (e.g., higher capability materials, actuators, or the like, and/or by adding manufacturing expense for example with a high number of small electrodes, etc.), adding weight (e.g., larger components and/or actuators), and/or increasing the footprint of the beam steering device (e.g., a larger and/or longer device to compensate for a reduced capability, to improve aperture size, and/or provide more room for larger components).

SUMMARY

An example system, including a first steering layer interposed between an electromagnetic (EM) source and an emission lens, the first steering layer including a steering lens; a second steering layer interposed between the EM source and the emission lens, the second steering layer including at least one steering lens operationally coupled to a rotating actuator, wherein the steering lens of the first steering layer and the at least one steering lens of the second steering layer include a combined first effective focal length; the emission lens including a positive lens having a second focal length; wherein the first effective focal length is shorter than the second focal length; a first steering actuator coupled to the steering lens of the first steering layer, and configured to move the steering lens of the first steering layer along a first movement course; and the rotating actuator coupled to the at least one steering lens of the second steering layer, and configured to move the at least one steering lens of the second steering layer along a second circular movement course.

Certain further aspects of the example system are described following, any one or more of which may be present in certain embodiments. The first movement course includes a linear movement course. The second steering layer further includes a plurality of steering lenses, the plurality of steering lenses including the at least one steering lens. The plurality of steering lenses includes between three (3) and twelve (12) lenses. The first movement course corresponds to a first steering axis, and wherein a steering segment of the second circular movement course corresponds to a second steering axis. The system further including a controller, including a steering request circuit structured to interpret a steering request value; a steering configuration circuit structured to determine a steering response value in response to the steering request value; and a steering implementation circuit structured to provide at least one steering command in response to the steering response value; and wherein at least one of the rotating actuator or the first steering actuator are responsive to the at least one steering command, thereby performing a steering operation of an EM beam from the EM source. The system further including a controller, including a steering request circuit structured to interpret a steering request value and an actuator position value for at least one of the rotating actuator or the first steering actuator; a steering configuration circuit structured to determine a steering configuration value in response to the steering request value and the actuator position value; and a steering implementation circuit structured to provide an EM beam command in response to the steering configuration value; and wherein the EM source is responsive to the EM beam command to provide an EM beam, thereby performing a steering operation of the EM beam from the EM source. The system further including wherein the at least one steering lens operationally coupled to a rotating actuator includes a first lens group assembly; wherein the second steering layer further includes a second lens group assembly, the second lens group assembly including at least one steering lens operationally coupled to a second rotating actuator; and wherein an EM beam from the EM source is selectively steered using the first lens group assembly or the second lens group assembly. The rotating actuator and the second rotating actuator are configured to counter-rotate.

An example system, including an initiating optics layer interposed between an electromagnetic (EM) source and a lenslet steering layer; the lenslet steering layer including a first positive lens element and a second negative lens element, the lenslet steering layer interposed between the initiating optics layer and a concluding optics layer; a steering controller configured to steer an EM beam from the EM source by controlling a first relative rotation between the first positive lens element and the second negative lens element, and further by controlling a second absolute rotation of the lenslet steering layer; and a rotating actuator responsive to rotation commands from the steering controller.

Certain further aspects of the example system are described following, any one or more of which may be present in certain embodiments. The concluding optics layer includes a field lens and an emission lens. The steering controller further includes a steering target circuit structured to interpret a steering request value; a steering control circuit structured to determine the first relative rotation and the second absolute rotation in response to the steering request value; and a steering implementation circuit structured to provide a steering command in response to the first relative rotation and the second absolute rotation, wherein the steering command includes the rotation commands. The first positive lens element and the second negative lens element each include a same optical power magnitude, and an opposite optical power sign. Each of the first positive lens element and the second negative lens element includes a de-centered portion of a corresponding reference lens. Each corresponding reference lens includes at least one of a spherical lens; a cylindrical lens; or a Fresnel lens. At least one of the first positive lens element or the second negative lens element includes a varifocal lens (VFL).

An example system, including a first steering layer interposed between an electromagnetic (EM) source and an emission lens, the first steering layer including a triplet lens including a stacked structure including, in order a Plano-convex lens; and a first transparent electrode on the Plano-convex lens; an electro-optical (EO) crystal having the first transparent electrode on a first side thereof; a second transparent electrode on a second side of the EO crystal, opposite to the first side of the EO crystal; and a Plano-concave lens on the second transparent electrode; the EM source configured to provide an EM beam incident upon the first steering layer; and the emission lens configured to emit a steered EM beam to a target location.

Certain further aspects of the example system are described following, any one or more of which may be present in certain embodiments. The EO crystal is configured to have a voltage applied across the EO crystal to change a refraction index of the EO crystal. The applying the voltage changes an optical distance between the Plano-convex lens and the Plano-concave lens. An absolute radius of curvature of the Plano-convex lens and the Plano-concave lens are equal. The triplet lens is a spherical or a cylindrical lens. The triplet lens has a net positive or net negative power. Each of the Plano-convex lens and the Plano-concave lens further includes a respective circular cut curvature surface. The system further including a second steering layer interposed between the EM source and the emission lens, wherein the second steering layer includes a bulk steering layer. The bulk steering layer includes a fishtail booster. The second steering layer is interposed between the first steering layer and the emission lens. The system further including a second steering layer interposed between the EM source and the emission lens, wherein the second steering layer includes a thin steering layer. The thin steering layer includes a half-wave voltage profile thin steering layer. The thin steering layer includes a resistive high-side electrode thin steering layer. The thin steering layer is interposed between the first steering layer and the emission lens. The system further including a second steering layer interposed between the EM source and the emission lens, wherein the second steering layer includes a lenslet steering layer. The lenslet steering layer is interposed between the first steering layer and the emission lens. The system further including a second steering layer interposed between the EM source and the emission lens, wherein the second steering layer includes a de-centered lens steering layer. The de-centered lens steering layer is interposed between the first steering layer and the emission lens. The system further including a second steering layer interposed between the EM source and the emission lens, wherein the second steering layer includes a rotating steering layer. The rotating steering layer includes two counter-rotating lens group assemblies. The rotating steering layer is interposed between the first steering layer and the emission lens.

BRIEF DESCRIPTION OF THE FIGURES

FIG. 6A depicts an example lenslet.

FIG. 6B is a schematic perspective view of an example lenslet.

FIG. 16 depicts illustrative steering performance of a lenslet steering layer.

FIG. 38 depicts an illustrative steering layer, modified with the addition of ATLs.

FIGS. 39A to 39G depict a number of configuration options for an ATL.

FIG. 43 depicts a prism operating curve for a phased array.

FIG. 44 depicts illustrative steering performance for a rotating phased array steering layer.

FIG. 45 depicts a steering component to compensate for speed of light considerations.

FIG. 51 is a schematic depiction of a rotating steering layer.

DETAILED DESCRIPTION

Figure 1:
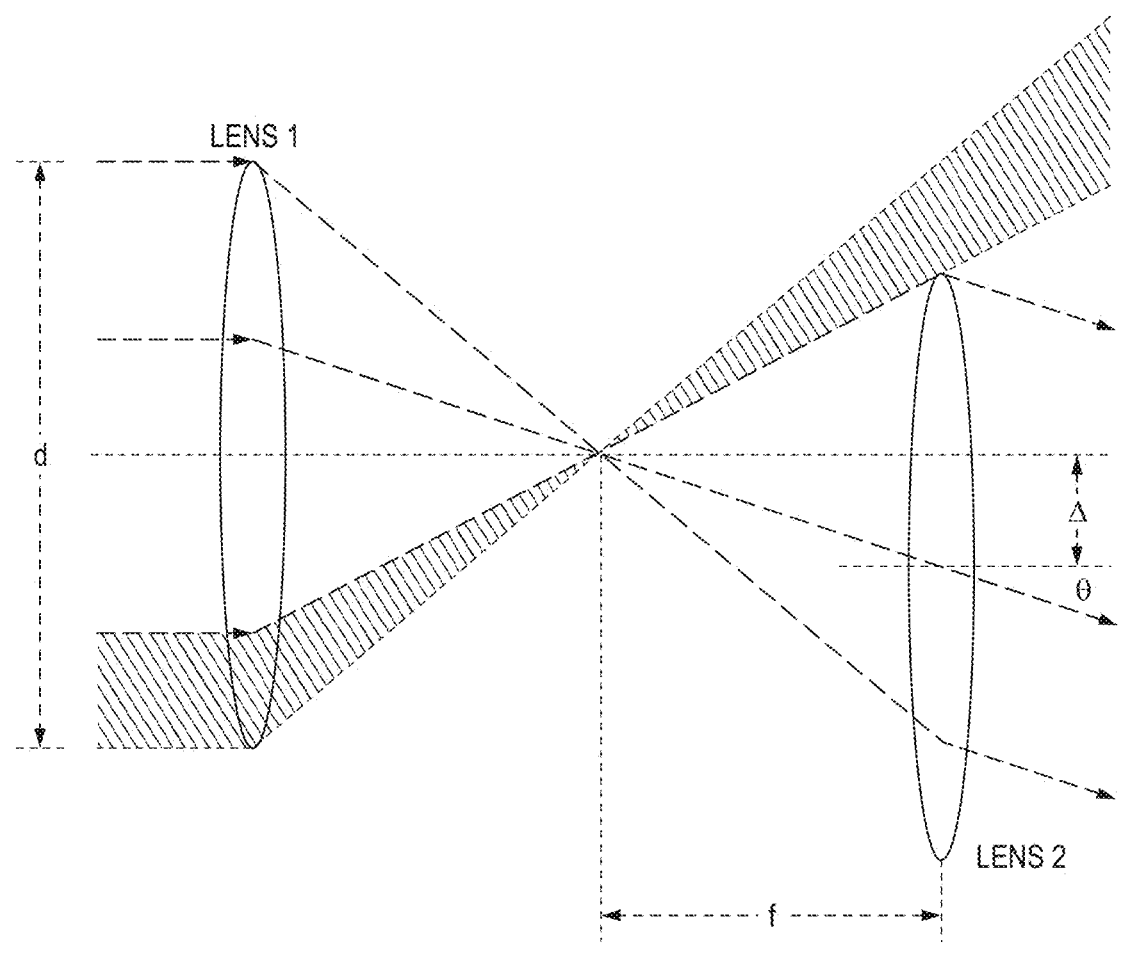
FIG. 1 depicts an example previously known steering device.

Certain embodiments of the present disclosure reference a thin beam steering device, a thin scanner, a thin film scanner, a thin steering layer, and/or other similar terminology. Without limitation to any other aspect of the present disclosure, example steering devices as set forth in U.S. patent application Ser. No. 16/999,815, filed on 21 Aug. 2020, and entitled "SYSTEM, METHOD AND APPARATUS FOR NON-MECHANICAL OPTICAL AND PHOTONIC BEAM STEERING" (EXCT-0003-U01-G) are contemplated herein, including embodiments having an EO optical layer positioned between electrode layers, utilization of a modulo-$2\pi n$ steering arrangement, utilization of a half-wave voltage profile, utilization of a chess scanner arrangement, and/or utilization of a castle scanner arrangement. The '815 application is incorporated herein by reference in the entirety for all purposes.

Certain embodiments of the present disclosure reference a bulk beam steering device, a bulk scanner, a bulk steering layer, and/or other similar terminology. Without limitation to any other aspect of the present disclosure, example steering devices as set forth in U.S. patent application Ser. No. 16/916,741, filed on 30 Jun. 2020, and entitled "SYSTEM, METHOD AND APPARATUS FOR NON-MECHANICAL OPTICAL AND PHOTONIC BEAM STEERING" (EXCT-0004-U03) are contemplated herein, including embodiments having a bulk crystal with a continuous voltage gradient applied thereto, embodiments having a fishtail booster, and/or embodiments having a meniscus lens arrangement. The '741 application is incorporated herein by reference in the entirety for all purposes.

Certain embodiments of the present disclosure reference utilizing resistive electrodes with a thin steering layer, including for example resistive high-side electrodes. Without limitation to any other aspect of the present disclosure, example steering devices as set forth in patent application PCT/US2021/027986, filed on 19 Apr. 2021, and entitled "SYSTEM, METHOD AND APPARATUS FOR NON-MECHANICAL OPTICAL AND PHOTONIC BEAM STEERING" (EXCT-0009-WO) are contemplated herein. The '986 application is incorporated herein by reference in the entirety for all purposes.

Certain embodiments of the present disclosure reference utilizing a de-centered steering layer and/or other arrangements including a beam steering device that utilizes de-centered lenses to effect beam steering operations. Without limitation to any other aspect of the present disclosure, example steering devices as set forth in patent application PCT/US2020/056253, filed on 19 Oct. 2020, and entitled "DECENTERED LENS LIGHT BEAM STEERING" (EXCT-0008-WO-ONLY) are contemplated herein. The '253 application is incorporated herein by reference in the entirety for all purposes.

Certain embodiments of the present disclosure reference utilizing a wide angle steering layer, a discontinuous steering layer, and/or other arrangements including a beam steering device that includes a discrete steering layer to boost the magnitude of steering capability. Without limitation to any other aspect of the present disclosure, example steering devices as set forth in U.S. patent application Ser. No. 17/836,710, filed on 9 Jun. 2022, and entitled "SYSTEM, METHOD, AND APPARATUS TO STEER AN ELECTROMAGNETIC BEAM UTILIZING STAGED STEERING" (EXCT-0006-U01), including embodiments utilizing a volume hologram and/or a polar birefringence grating. The '710 application is incorporated herein by reference in the entirety for all purposes.

Embodiments herein are directed to steering an EM beam, whether the EM beam is emitted to a target location, received from the target location, or both. The descriptions herein apply to all of these, including switching between transmitting and receiving at different times, and/or simultaneous transmission and receiving for certain systems and/or operating conditions. Any description referencing an EM source may alternatively be understood to include a description of an EM receiver, such as a pixel grid, photo diode array, and/or any other type of receiving device relevant to EM energy. The description herein references optical beams or energy, photonic beams or energy, an EM beam or energy, and/or light. These terms are utilized for clarity of the description, but embodiments herein are capable to steer EM energy of any relevant wavelength for which optically active materials (e.g., lenses, prisms, EO active materials, etc.) are available to perform the described functions, for example changing a refractive index of the material at the relevant wavelength. The boundaries of the available wavelengths may thus depend upon the specific characteristics of a system that will be readily available, with the benefit of the present disclosure, to the person of skill in the art contemplating a particular system. EM energy includes at least EM energy within the visible spectrum, and infrared and ultraviolet (UV) energy near the visible spectrum. In certain embodiments, depending upon the configuration and materials available, EM energy outside these ranges, for example radio waves and/or microwaves, and/or higher energy UV energy, may also be steerable. The principles herein apply to EM energy anywhere in the spectrum for which suitable optical materials are available.

Example embodiments herein combine one or more steering aspects described into a steering device to enhance the steering capability (e.g., steering magnitude, steering precision, steering speed, and/or optical quality of the steered beam). In certain embodiments, sequential steering components are provided as steering layers—for example a thin steering layer, bulk steering layer, rotating steering layer, lenslet steering layer, and/or a triplet steering layer (e.g., using an ATL). In certain embodiments, the order of the steering layers, where present, is selectable and may be in any order. In certain embodiments, a higher magnitude steering layer is ordered after (e.g., downstream) of a lower magnitude steering layer, for example to provide for easier fabrication of the device (e.g., avoiding a long run within the device where a beam is steered to a high angle). In certain embodiments, a more precise steering layer may be provided upstream of a less precise steering layer (e.g., where the more precise steering layer typically steers to a lower magnitude, to simplify fabrication of the steering device; for example where precision adjustments are expected to survive the higher magnitude steering layer, and/or where feedback is available to allow the high precision layer to adjust during steering operations), or downstream of a less precise steering layer (e.g., to simplify precision adjustments during operation of the device). Any of these arrangements are contemplated herein for various embodiments.

Referencing FIG. 1, an example conventional decentered lenses steerer is schematically depicted. As seen, there are two identical positive lenses (Lens 1 and Lens 2) with an effective focal length of "f". Those two identical lenses are 2f apart to make a telescope with a magnification of 1. If the second lens is displaced by A, the light will be steered to the angle of θ. The angle of θ is calculated as:

$$\tan\theta = \frac{\Delta}{f}$$

Therefore, to increase the deflection angle (θ), a larger displacement and/or a smaller F #will be required. As the second lens is displaced, some light rays will not hit the second lens, so they will be considered as (vignetting) losses. By using a field lens at the common focal plane, it would be possible to displace the second lens up to d/2, where d is the diameter of the lenses.

Therefore, the maximum possible deflection angle for the conventional decentered lenses steerer is as follows:

$$\text{Max } \theta = \tan^{-1}\frac{d}{2f} = \tan^{-1}\left(\frac{1}{2f\#}\right)$$

Previously known decentered lens steering devices suffer from a number of drawbacks, including at least: significant system length (at least double the aperture diameter for F #=1); single dimension steering; steering capability dependent on F #(e.g., F #>2 will significantly limit steering capability); linear actuation of moving elements; moving elements are both large and heavy to support significant steering capability and significant aperture size; a limited overlap area between lenses (e.g., limiting aperture size and/or increasing vignetting losses); and/or sensitivity to lens size (e.g., small lenses reduce available displacement and/or require a small F #, reducing optical quality).

Displacing the lens up to half of its diameter is not always practical, straight forward, and/or may introduce limitations in the steering speed (or frequency—e.g., a sweep frequency for steering through a range of angles) capability. Further, steering to a large angle in previously known systems may prevent some rays from hitting the next lens and introduce vignetting, e.g., depicted as vignetting losses (e.g., grey area in the example of FIG. 1), where some of the initial beam energy is directed to undesired locations, resulting in losses, heat generation, and/or direction of some beam energy to undesirable locations.

Accordingly, previously known decentered beam steering systems require large lenses with large deflections to achieve significant steering capability. Additionally, previously known systems suffer from high expense, low steering capability, a large footprint (e.g., weight, size, and/or power requirements), and generally more than one of these to meet some constraint for the others.

An example previously known beam steering system is a Risley prism system. A Risley prism utilizes two prism wedges that rotate to perform steering operations. Risley prism systems suffer from a number of challenges, including at least: an offset for a straight beam (e.g., an unsteered beam); a center defect region where the beam cannot be steered; fixed design limitations based on the wedge angle, prism thickness, and distance between the final optical surface and scan surface; sensitivity to (and distortion from) misalignment; dispersive optical elements that do not support broadband (e.g., more than one wavelength) lights; high rotational speed requirements for steering near the boresight of the prisms; and/or sensitivity to tolerance elements (e.g., wedge angle, alignment, temperature variation, and/or atmospheric pressure variation). Some of these challenges can be addressed utilizing additional elements, such as a polar birefringence grating and/or utilization of a third prism. However, such elements do not address all of the challenges, and add further expense, weight, complexity, etc. to the beam steering system.

Figure 2:
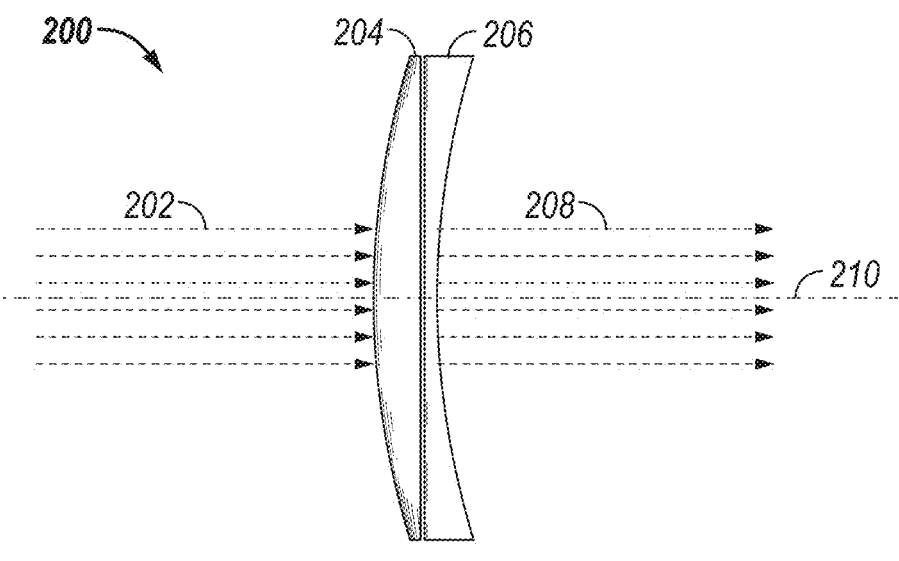
FIG. 2 depicts an example steering device with full lens, de-centered steering.

Referencing FIG. 2, an example scanner 200 includes a negative 206 and a positive 204 optical element (e.g., lenses), each with similar absolute focal lengths (f and –f). The focal lengths may vary slightly, for example due to the real (while minimal) axial separation distance between the elements, to provide a selected net convergence or divergence to the light passing through the optical elements, due to manufacturing differences between the negative and positive elements, or the like. Accordingly, the net negative 206 and positive 204 optical elements have a magnification of about 1. Therefore, the distance (L) between those two elements in the example scanner will be about zero. In practice, the distance L will be small, for example 1-2 mm, providing for a magnification that is slightly different from 1.

$$L = f - f = 0$$

The L parameter being zero means the two elements are touching each other. It should be noted that in practice, the two elements of an example scanner 200 are apart from each other by "a very small distance", such as one or two millimeters. Therefore, the absolute focal lengths of those two elements are slightly different, and hence, the magnification in practice will be slightly different from 1.

Referencing FIG. 2, an example scanner 200 is depicted with the lens elements aligned on the optical axis 210, with the positive lens element 204 separated from the negative lens element 206 by a short distance and having focal lengths with opposite signs, and about the same magnitude. The example scanner 200 does not steer the light (e.g., incident light 202 is aligned with emitted light 208, along the optical axis 210) in the depicted position, as the center points of the two lenses are aligned.

Figure 3:
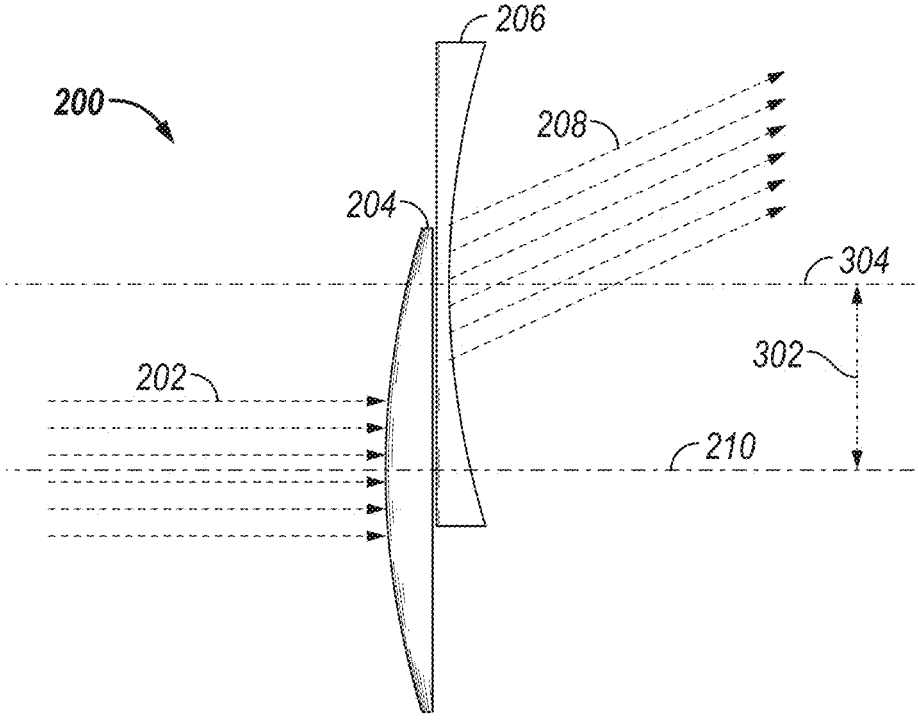
FIG. 3 depicts an example steering device with full lens, de-centered steering.

Referencing FIG. 3, the example scanner 200 is depicted with the negative lens element 206 being displaced a distance 302 (e.g., Δ), for example where the second lens center 304 is displaced relative to the optical axis 210, and accordingly the emitted light 208 is steered. The deflection angle is calculated as $\theta = \tan^{-1} \Delta / f$, where Δ is the displacement between the two lens centerlines. The example of FIG. 3 depicts the displacement of the second negative lens element 206, but may additionally or alternatively be implemented by displacing the first positive lens element 204.

The example of FIG. 3 provides for a shorter length of the steering device 200, for example relative to the example of FIG. 1. The example of FIG. 3 is still subject to a number of challenges, for example a large displacement requirement to steer to large angles, movement of a heavy optical element, and linear actuation of the element. Additionally, the example of FIG. 3 still provides for a low overlap design between the steering lenses, which limits any or all of: maximum displacement (Δ), maximum steering angle, or steering efficiency.

Embodiments of the present disclosure reference a scanner utilizing rotating lens elements, lenslets, a lenslet steering layer, or the like. Without limitation to any other aspect of the present disclosure, these elements may be embodied utilizing one or more aspects of embodiments depicted in FIGS. 4-12 and the related descriptions.

Figure 4A:
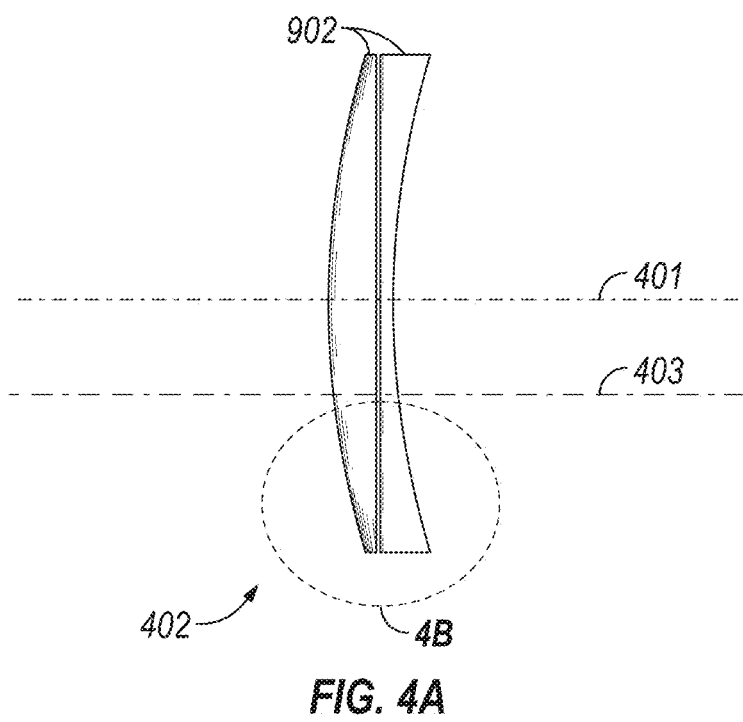
FIG. 4A depicts a conceptual reference lens and a lenslet.

Referencing FIG. 4A, an example scanner includes a pair of lens elements (or lenslets) 404, 406, that may be provided together as the optical portion of a lenslet steering layer 402. The example of FIG. 4A includes one positive lenslet 404 and one negative lenslet 406, each having approximately the same absolute focal length.

Figure 4B:
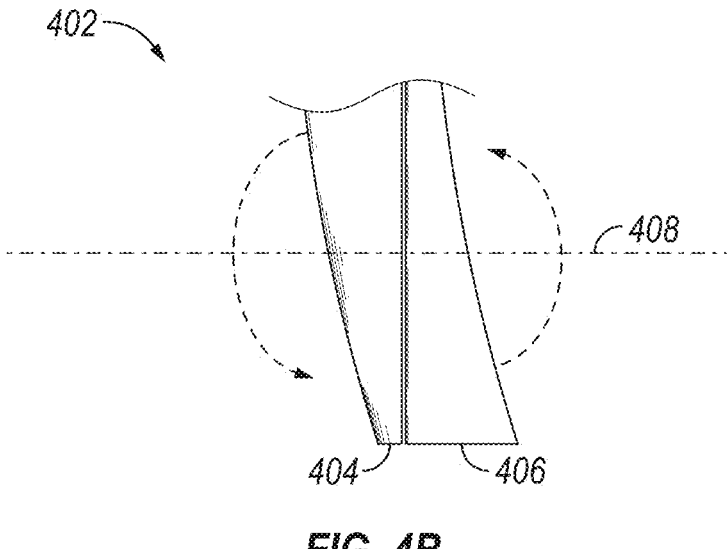
FIG. 4B depicts an example lenslet.

The example of FIG. 4A shows the optical line 401 through the center of the reference lenses 902, and a cut line 403 depicting geometrically the portion of the references lenses 902 that is used to form the lenslets 404, 406. In the example of FIG. 4B, an optical line 408 through the lenslet 404, 406 is utilized as the optical line for a scanner or beam steering device utilizing the lenslet steering layer 402.

Figure 9:
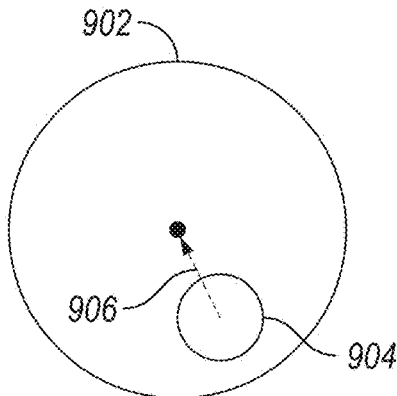
FIG. 9 depicts an example reference lens and lenslet.

Referencing FIG. 9, an example lens element 904 is depicted schematically in relationship to a reference lens 902. The example lens element 904 is formed from a portion of a full lens, for example the reference lens 902, which may include a circular portion of the reference lens 902. The reference lens 902, as used herein, indicates the lens shape from which the lens element 904 is formed, which may be formed by cutting the lens element 904 from a fully formed lens, but may additionally or alternatively be formed directly, for example cutting and polishing the lens element 904 directly into the final shape. The reference lens 902 is utilized to clarify aspects of the present disclosure, but is not limiting and example embodiments may not include or utilize a reference lens 902. A reference lens 902 may be described as an "equivalent lens," "full lens," "complete lens", "virtual lens", and/or portions of the reference lens 902 (e.g., center line, focal length, etc.) may be described using similar terminology. The example of FIG. 4A depicts each lenslet 404, 406 formed from a corresponding reference lens 902.

The example reference lens 902 may be a spherical lens, a cylindrical lens, or another lens type. In certain embodiments, the reference lens 902 may be a bulk lens (e.g., glass, acrylic, etc.), a Fresnel lens, or other optical construction providing properties of a lens element as set forth herein. In certain embodiments, a lens includes a high index material, and/or a variable index material (e.g., KTN), allowing for selection of high precision operation and/or high capability operation of the scanner. With further reference to FIG. 9, an example operating line 906 is depicted between a center of the lens element 904 and the reference lens 902. In the example of FIG. 9, the optical response of the lens element 904 will not be symmetrical, for example with regard to the radial distance of a given portion of the lens element 904, depending upon the position and size of the lens element 904 relative to the reference lens 902, the type of reference lens 902 (e.g., positive, negative, spherical, cylindrical, etc.), etc. Rotation of the lens element 904 about the optical axis therefore provides steering activity on the incident EM beam. In certain embodiments, a reference angle for rotation is utilized herein, for example to provide the desired position of each lens element 904 to provide selected steering operations. An example reference angle may be defined according to the lens element 904 and its relationship to the reference lens 902, for example defining the operating line 906 as 0°. Any angle referencing may be utilized herein, including referencing based upon optical properties of the lens element

904 and/or reference lens 902, arbitrary referencing (e.g., using a mark or feature on the lens element), etc.

Figure 5A:
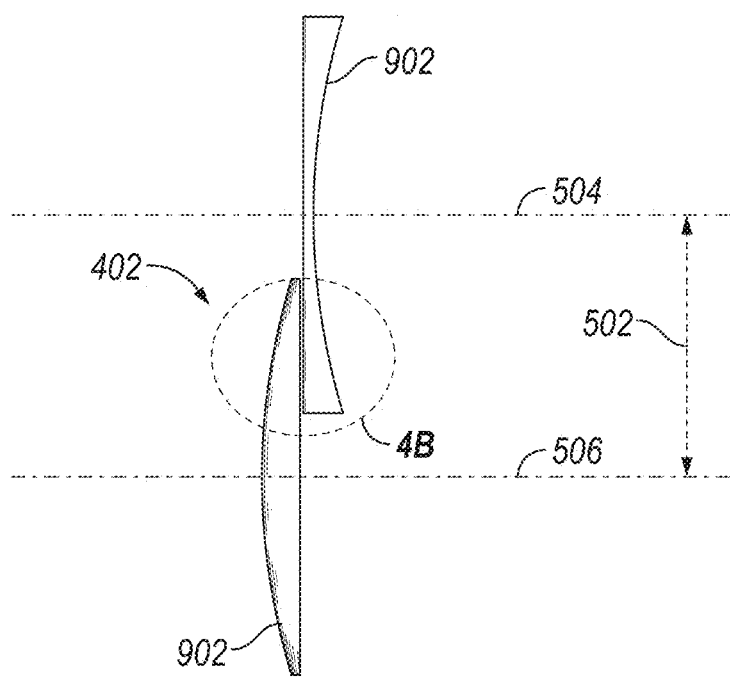
FIG. 5A depicts a conceptual reference lens and a lenslet.
Figure 5B:
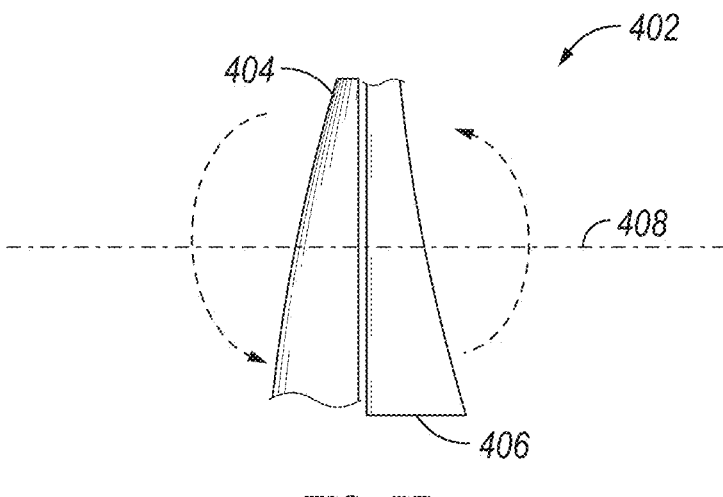
FIG. 5B depicts an example lenslet.

Referencing FIG. 5A, steering of the incident EM beam can be performed by the lenslet steering layer 402 by rotating the lens elements 404, 406. A change in the relative rotational position of the lens elements 404, 406 adjusts the magnitude of the steered angle, for example a relative angle of the final steered beam relative to the optical axis 408 (reference FIG. 5B). A change in the mutual rotational position of the lens elements 404, 406 (e.g., rotation of both lens elements, while keeping a fixed relative rotational position between the lens elements) adjusts the dimension steered (e.g., the azimuth of steering relative to the optical axis). The relative rotational position and mutual rotational position are described separately for clarity of aspects of the present disclosure, but they may be considered and/or controlled simultaneously in a given embodiment. In certain embodiments, the lens elements 404, 406 are designed to be doublet or triplet achromat, allowing for effective steering for a broader spectrum of incident light.

In certain embodiments, the lens elements 904 rotated to a minimum position do not perform steering operations (e.g., by canceling each other out). The minimum position is the angular difference between the lens elements, or the relative rotational position, associated with minimal (or zero) steering magnitude. The minimum position depends upon the configuration of the given system, such as the portion of each reference lens 902 embodied by each lens element 904, the reference angle utilized, and will generally correspond to the negative lens element and positive lens element positioned at "opposite" rotations. In certain embodiments, the lens elements 904 rotated to a maximum position perform maximum (magnitude) steering operations. The maximum position is the angular difference between the lens elements, or the relative rotational position, associated with maximal steering magnitude. The maximum position depends upon the configuration of the given system, and may typically, but not exclusively, be positioned 180° apart from the minimum position. The lens elements 904 rotated to a different angle, with a fixed relative rotational position (e.g., both elements 904 rotated 30° clockwise), adjusts the steering dimension, for example the azimuthal direction of the steered beam relative to the optical axis.

In the example of FIG. 5A, the lens elements 404, 406 are rotated to the maximum position, which provides a maximum displacement 502 between the virtual lenses represented by the reference lenses for each of the negative element 406 and positive element 404. The displacement 502 is determined by the virtual displacement between a centerline 504 for the reference lens for the negative lens element 406, and the centerline 506 for the reference lens for the positive lens element 404. It can be seen that the displacement 502 can be controlled between the minimum value (e.g., zero displacement) and the maximum value by changing the relative angle of rotation between the lens elements 404, 406. In the example of FIG. 5A, the lenslet steering layer 402 is depicted with the virtual reference lenses 902 to illustrate the operation of the lenslet steering layer 402, but the virtual reference lenses 902 are not present in the lenslet steering layer 402. The example of FIG. 5A depicts the equivalent arrangement of reference lenses 902 that would implement the steering applied by the depicted rotation of the lenslets 404, 406. Accordingly, embodiments herein provide for displacement between steering elements by rotating circular elements, without the need for linear actuation, reversal of direction, movement of large lenses, etc. It will be understood that, in certain embodiments, one or more of these may be present—for example the rotating elements 404, 406 may be rotated in a single direction, rotated continuously, and/or moved independently or in coordination to specified rotational positions (including uni-directional or bi-directional motion). The example of FIG. 5A further provides for a full aperture steering device, for example since the lenslets 404, 406 are coextensive along the optical axis for all steering positions, the example lenslet steering layer 402 can support steering operations through-out the full cross-section of each lenslet 404, 406, allowing for a larger beam size relative to the lens size, reducing the size, weight, and cost of the scanner to support equivalent steering operations.

Referencing FIG. 6A, an example beam steering layer 402 has a positive element 404 and a negative element 406 positioned in close proximity. Each element 404, 406 can be rotated independently around the optical axis 408 to provide a decentered lens capability (e.g., virtual displacement of the reference lenses) without requiring linear actuation. The mutual angle of rotation defines the decenteredness, or the relative displacement between the virtual reference lenses. In the example of FIG. 6A, the mutual angle of rotation is zero, providing the minimum steering angle, which in the example of FIG. 6A is zero (not steered). Accordingly, when the lenslets 404, 406 are in the position indicated in FIG. 6A, the emitted light 208 is along the same axis 408 as the incident light 202. In the example of FIG. 6A, the centerline 401 for the reference lenses is depicted. While the centerline 401 for the reference lenses is not aligned with the optical axis 408, the action of each lenslet 404, 406 in the rotational position of FIG. 6A cancel each other out. Referencing FIG. 6B, a perspective view of the lenslets 404, 406 is schematically depicted.

Figure 7:
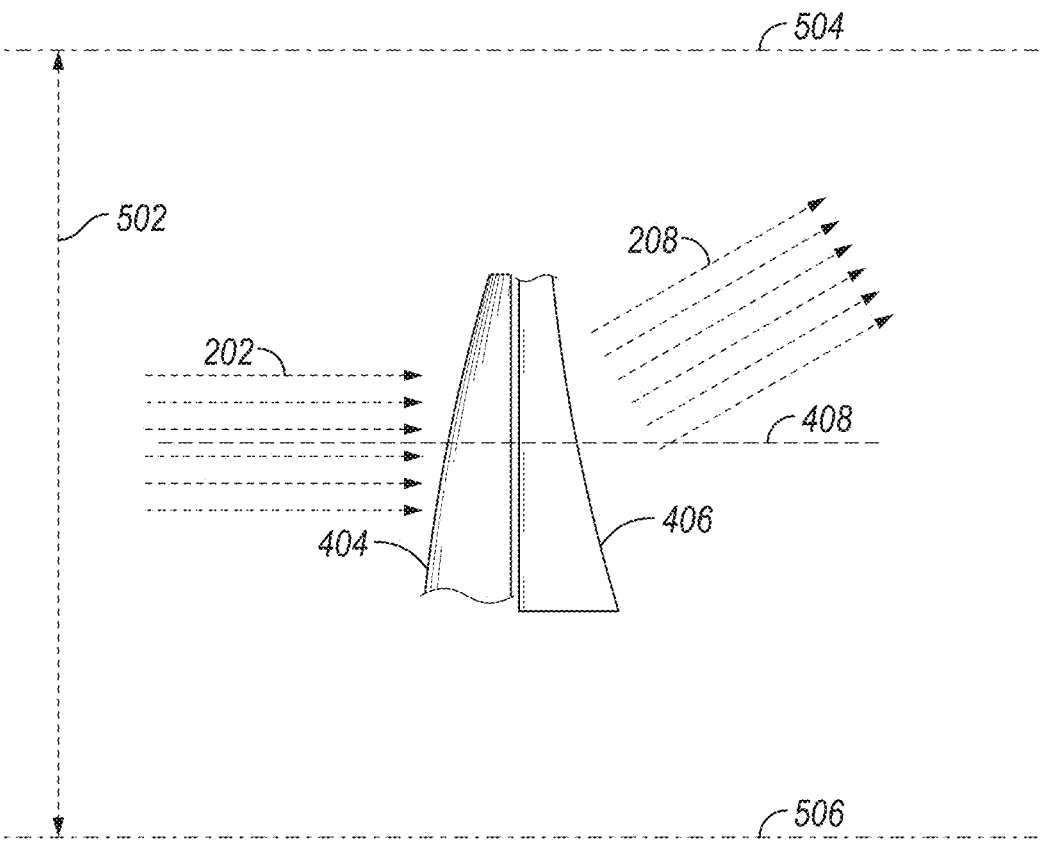
FIG. 7 depicts an illustrative steering operation using a lenslet.

Referencing FIG. 7, the example lenslets 404, 406 are rotated to provide a maximum deflection angle, for example with one of the lenslets 404, 406 rotated 180 degrees relative to the positions depicted in FIG. 6A. In the example of FIG. 7, a centerline 504 of the virtual negative reference lens is displaced from the centerline 506 of the virtual positive reference lens. Depending upon the section of each reference lens utilized to create the lenslets, it can be seen that the displacement 502 can exceed d/2 (e.g., the radius of the reference lenses), providing for greater displacement capability for the lenslet steering layer 402 than an equivalent full lens scanner such as that depicted in FIG. 1. The examples of FIGS. 4-8 provide for two dimensional steering, or two axis steering, which can conceptually include two dimen-sions in spherical coordinates—for example a deflection angle (e.g., relative to the optical axis 408), and an azimuthal angle. It will be seen that the two independent dimensions for steering provide equivalent capability to steer arbitrarily in any other reference frame, for example with a vertical axis and horizontal axis.

In the example of FIG. 7, the angle of deflection θ, can be calculated as follows;

$$\theta = \tan^{-1}\frac{\Delta \times \sin\frac{\varphi}{2}}{f}$$

Where 4 is the maximum displacement which is not limited by d/2 anymore, φ is the mutual angle of rotation between the two elements of the example scanner. The maximum displacement can be determined from the refer-ence lenses 902 and the portion thereof defined by each of the lens elements 904. For example, referencing FIG. 10, the operating line 906 determines the distance between the lenslet centerline (e.g., optical axis 408) and the corresponding reference lens center (e.g., centerline 504, 506), which determines the contribution to the displacement for the corresponding lenslet 404, 406. Assuming the two lenslets 404, 406 are taken from the same portions of their respective reference lenses 902 (e.g., which may be typical but is not required), then the available displacement 502 will be double the length of the operating line 906. It will be seen that the relative size of the lenslet 904 to the reference lens 902, as well as the radial position of the lenslet 904 on the reference lens 902, determine the available length of the operating line 906, but that operating lines 906 exceeding d/2, and thereby providing for increased steering capability (in addition to any other advantages herein) relative to previously known systems can be readily created.

Example benefits of example embodiments herein include:

A reduced system length (e.g., the lens elements and any minimum distance therebetween).

2-dimensional steering in a single steering layer (e.g., using a combination of mutual and/or independent rotation of the lens elements)·

Independence of scanner steering capability to F #

Ease of actuation and control—e.g., rotation versus linear motion, and with or without reversal of direction as a part of steering operations.

Full aperture steering support.

Provision for broadband EM sources

Figure 8:
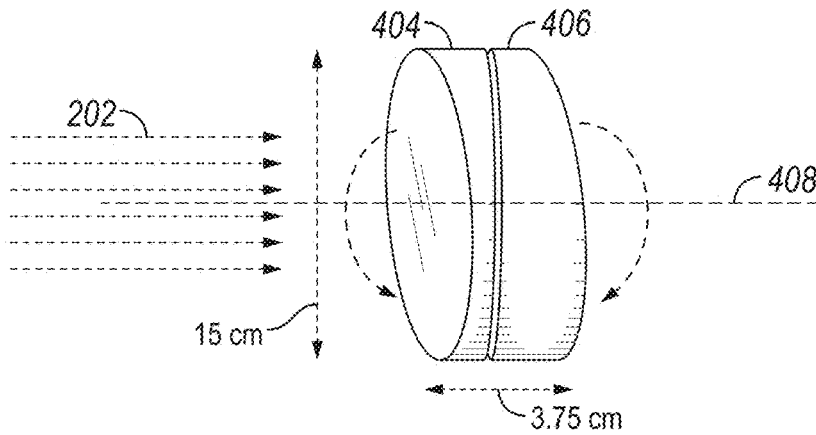
FIG. 8 depicts an example lenslet.

Referencing FIG. 8, an illustrative scanner is schematically depicted, which may be utilized herein to form the optical portion of a lenslet steering layer 402. The example of FIG. 8 is believed, based on simulation and experience, to be readily achievable for embodiments set forth herein. The example scanner includes a 15 cm aperture that is fully steerable, and capable to steer 1.55 um light to +/−30 degrees. The optical length of the example system is less than about 1.5 inches (e.g., the thickness of the two elements). In certain embodiments, the thickness can be reduced using a material with a high refractive index.

Figure 10:
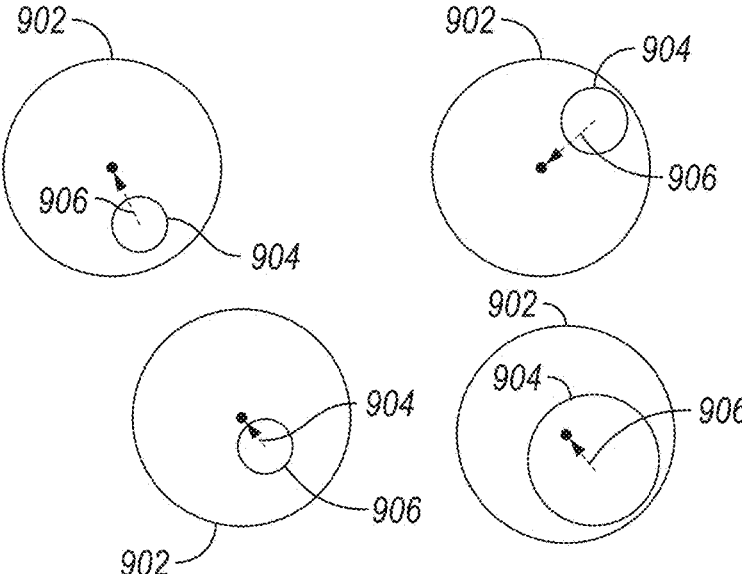
FIG. 10 depicts a number of example reference lenses and lenslets.

Referencing FIG. 10, example reference lens 902 and lens element 904 pairs are depicted for illustration. The reference lens 902 may be any type of lens, including a positive lens, negative lens, Fresnel lens, spherical lens, and/or cylindrical lens. The lens element may embody any portion of the reference lens 902, except as noted herein. The lens element 904 should not be centered onto the center point of the reference lens, or rotation of the lens element will not provide steering activity. Where the lens element 904 includes the center point of the reference lens 902 (e.g., the lower right example of FIG. 10), the rotational response of the lens element to steering activity may include reversals, cyclic response, or the like, which may be desirable for certain embodiments. In certain embodiments, control complications or other aspects indicate that the center point of the reference lens should not be included in the lens element. In certain embodiments, the rotational response of the lens element to the steering activity may be favorable with the inclusion of the center point of the reference lens (e.g., providing an enhanced velocity profile, position trajectory, each of which may be with respect to time and/or angular position), indicating that the center point of the reference lens should be included in the lens element. In certain embodiments, positioning the lens element 904 further from the center point of the reference lens 902 provides for enhanced steering capability, including both in magnitude (e.g., maximum displacement) and response (e.g., displacement per unit of rotation, e.g., degrees of rotation). In certain embodiments, positioning the lens element 904 closer to the center point of the reference lens 902 provides for greater steering precision, adjustment to the scan time (e.g., time for the steering to progress through a selected range of steering values), modulating the response of a lenslet for desired characteristics, or the like.

Figures 11, 12:
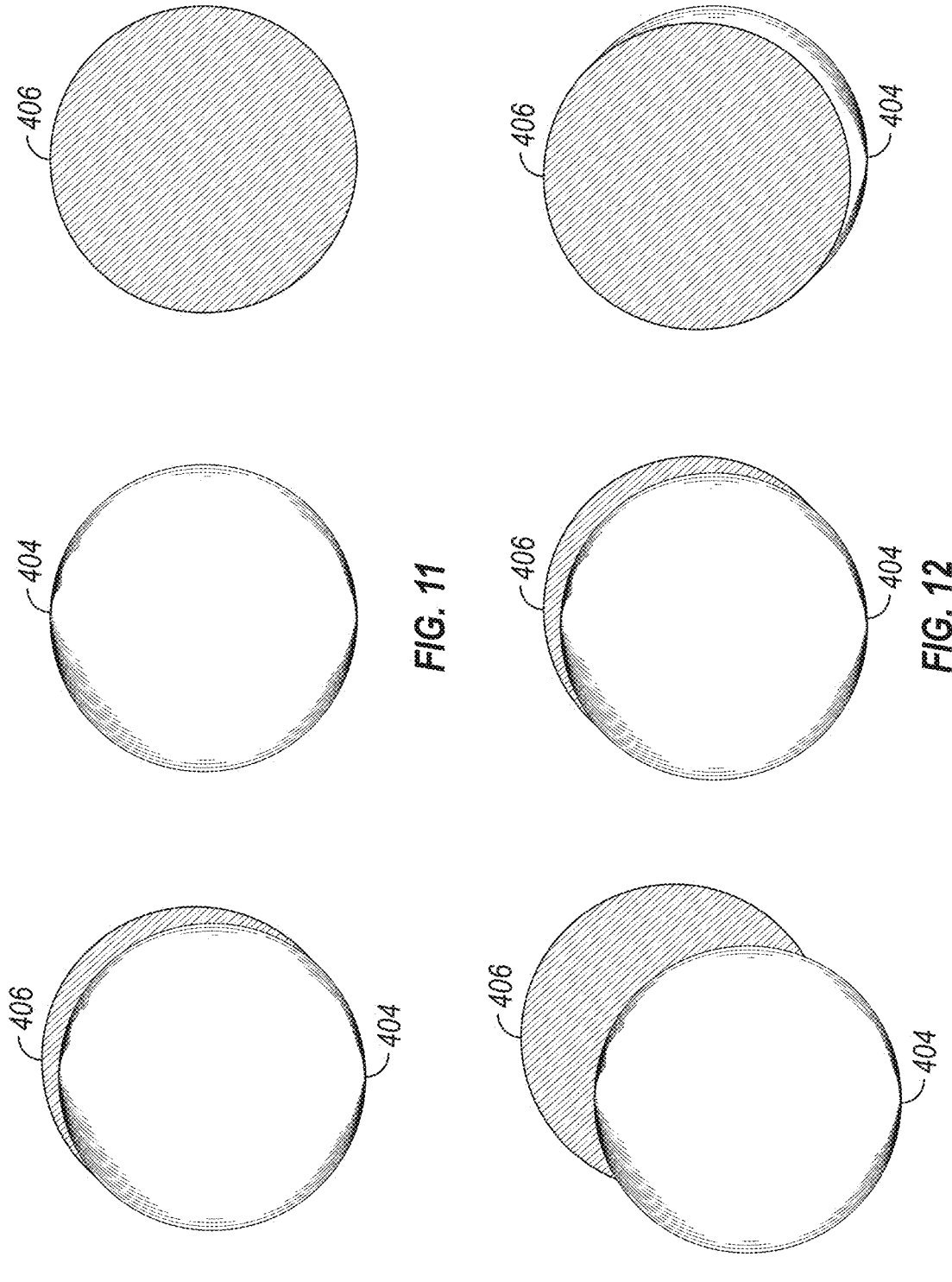
FIG. 11 depicts several schematic views of a lenslet.
FIG. 12 depicts several schematic views of a lenslet.

Referencing FIG. 11, an example overlap area of an example lenslet steering layer is depicted herein. In the example of FIG. 11, the size and shape of each lens element 404, 406—as viewed along the optical axis—is identical (or approximately—e.g. difference due to manufacturing tolerances, coupling to the system, etc.), and therefore the full aperture is available for steering activity. The example of FIG. 11 depicts a perspective view (left), a front view (center), and a rear view (right). Referencing FIG. 12, an example overlap area of an example lenslet steering layer is depicted herein. In the example of FIG. 12, the overlap area is a subset of the full aperture (e.g., reference the front view, FIG. 12 center), due to misalignment (e.g., due to assembly tolerances, due to changes over time, implemented by design, etc.) is depicted. The overlap area may additionally or alternatively be affected by the shape of the lens elements 404, 406 and/or the size of the lens elements 404, 406. Providing a lenslet steering layer with partial overlap (e.g., FIG. 12) rather than full overlap (e.g., FIG. 11) is not necessarily desirable from a steering perspective. For example, a reduction in overlap reduces the available steering aperture, may cause efficiency losses, and make steering control more complex (e.g., changing the relationship between rotational position and steering capability, and/or for significant overlap differences it may limit the available steering angles). However, embodiments using partial overlap may be desirable for other considerations, including due to assembly tolerances, availability of specific reference lenses and/or lenslets, allowing for the utilization of lenslets having a different size and/or shape, and/or due to space constraints or other limitations.

Figures 13, 14:
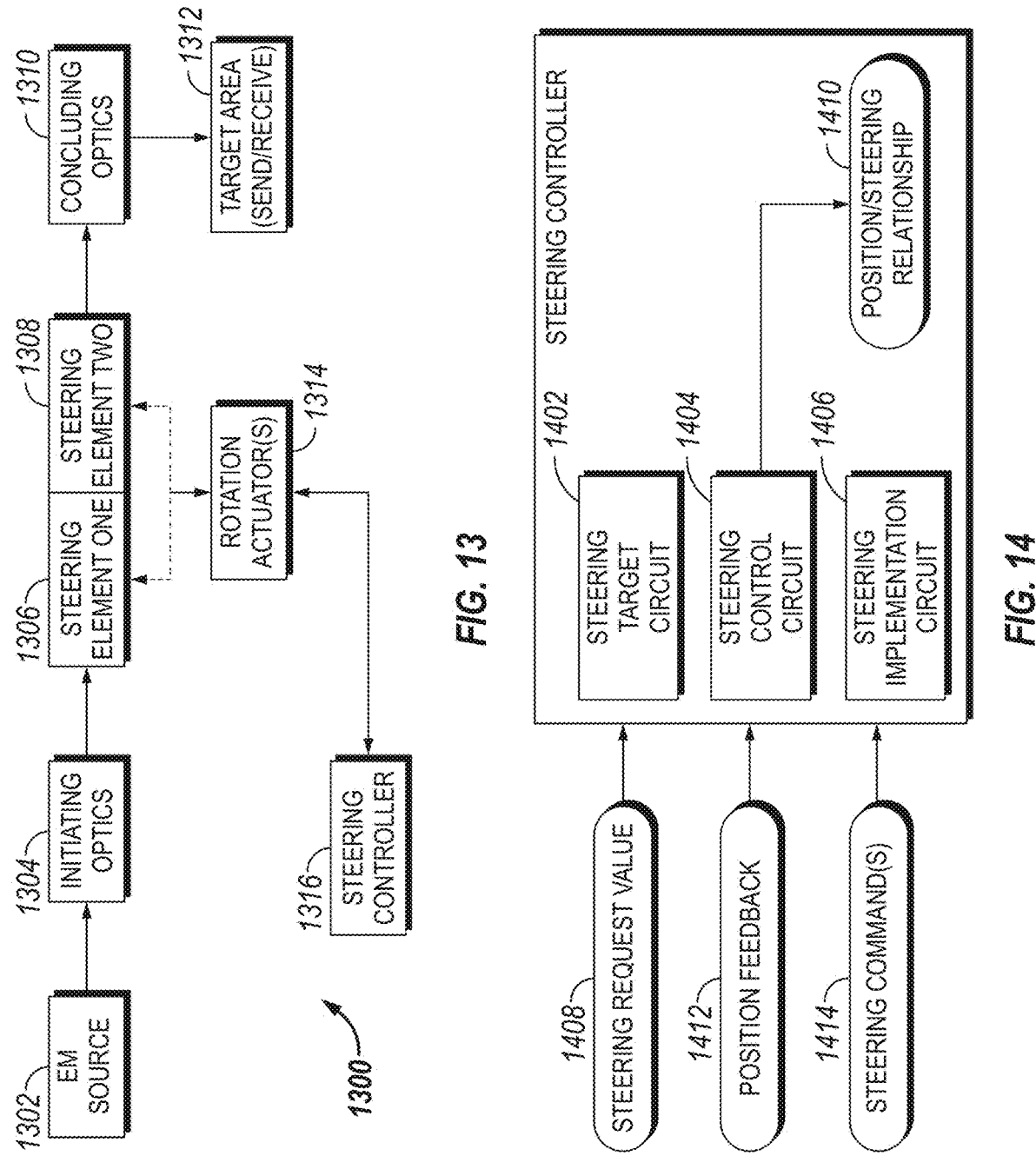
FIG. 13 depicts an example beam steering device.
FIG. 14 depicts an example steering controller.

Referencing FIG. 13, an example scanning system 1300 is schematically depicted. The example of FIG. 13 includes an EM source 1302, for example a light source, providing an incident EM beam to a scanning device. In certain embodiments, the EM source 1302 may additionally or alternatively be a receiving device—for example a detection array. The example scanning system 1300 optionally includes initiating optics 1304, for example utilized to pre-steer, collimate, or otherwise condition the incident EM beam. The example scanning system 1300 includes a pair of steering elements (steering element one 1306, and steering element two 1308), which may be lenslets 404, 406. The pair of steering elements 1306, 1308 include a positive element and a negative element—for example as depicted in FIG. 3 or 6. The example scanning system 1300 includes concluding optics 1310—for example a field lens, additional steering layer(s), emission lens, or the like. The example scanning system 1300 includes a scanned area 1312, which may be a location to be steered to, a location to be scanned, and/or a requested steering direction. The example of FIG. 13 includes a rotating actuator 1314, which may include a rotating actuator for each steering element 1306, 1308. The rotating actuator 1314 may be any type of actuator, including at least an electric motor and/or a stepper motor, and may operationally engage each lenslet in any desired manner, for example coupled to a circumferential portion of each lenslet, such as a ring gear, friction wheel, or the like. The actuator may be of any speed, uni-directional or bi-directional, and/or may be controlled by (without limitation) rotational speed, rotational acceleration, and/or rotational position. In certain embodiments, the rotating actuator (or another device or sensor) may provide feedback values, such as the rotational position of each steering element, and/or an angular difference between the steering elements. The example scanning system includes a steering controller 1316, configured to communicate with any sensors or actuators of the system. In certain embodiments, the steering controller 1316 is configured to communicate externally, for example to receive steering requests from an operator, network communication, or the like.

Referencing FIG. 14, an example steering controller 1316 is schematically depicted. The example steering controller 1316 includes a number of circuits configured to functionally execute certain operations of the steering controller 1316. The example steering controller 1316 includes a steering target circuit 1402 configured to interpret a steering request value 1408 (e.g., a steering target for the scanner), a steering control circuit 1404 configured to determine position values for the steering elements in response to the steering request value. An example steering control circuit utilizes a position/steering relationship 1410 (e.g., a table, calculation, or other determination of an angle difference between steering elements, and a mutual reference angle of the steering elements to achieve and/or progress acceptably toward the steering target) to determine the desired position(s) of the steering elements. The example steering controller 1316 includes a steering implementation circuit 1406 configured to determine steering command(s) 1414 in response to the determined position values, and/or in response to a determined angle difference (e.g., difference between the lenslets to provide a steering magnitude that supports the steering request value 1408) and mutual reference angle values (e.g., rotation relative to a common reference to provide a steering azimuth that supports the steering request value 1408). Example and non-limiting steering commands 1414 include an actuator command to a rotational actuator (e.g., to move to the desired position) and/or commands to the EM source (e.g., to pulse the EM source when the steering elements are in a desired position, for example to prevent incident energy until the steering is implemented, and/or to provide pulses as rapidly spinning steering elements pass through a correct orientation). In certain embodiments, control operations and/or confirmation operations may be performed utilizing feedback from the scanner, such as position feedback 1412 for the steering elements and/or rotational actuator(s), and/or feedback from the target location.

Figure 15:
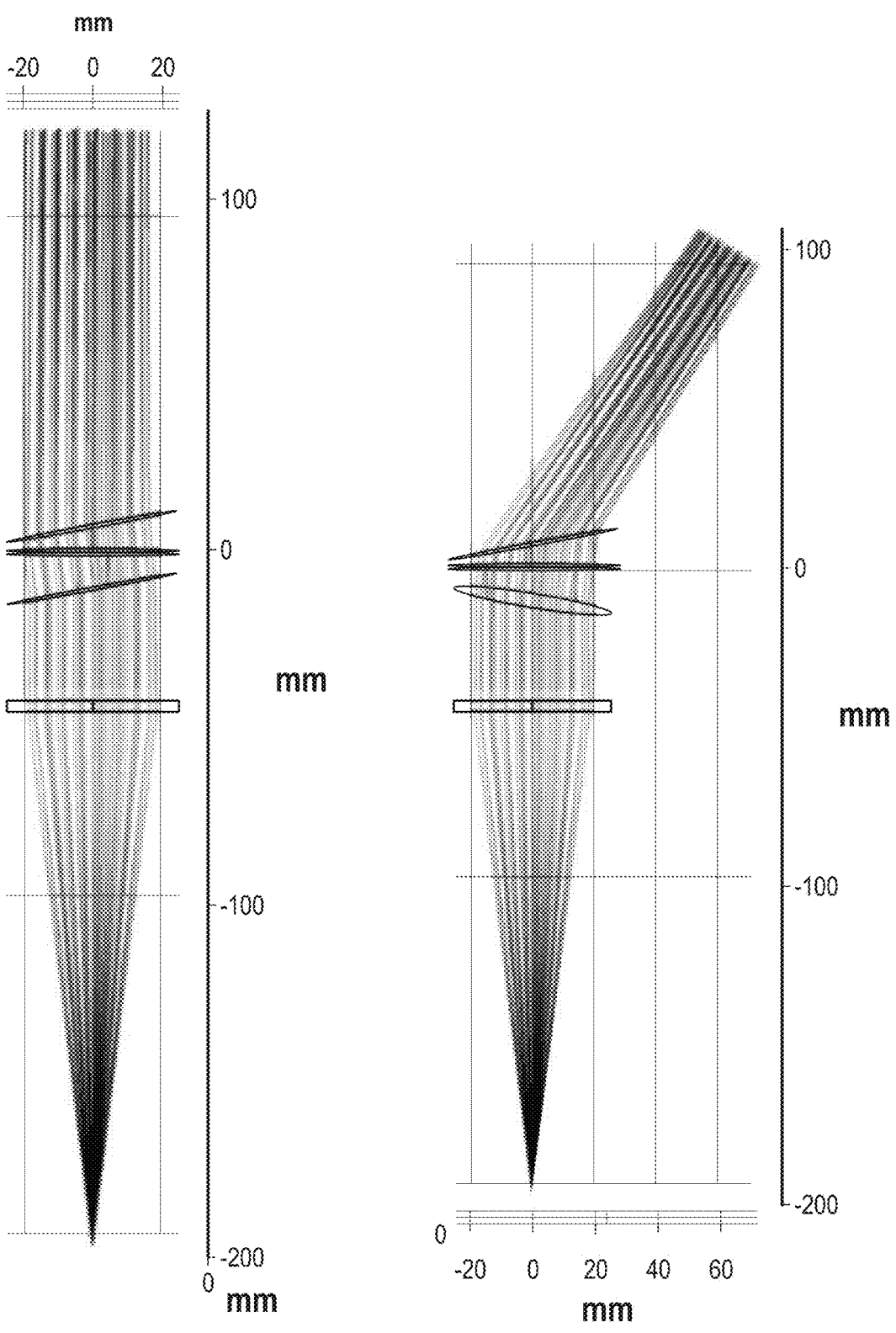
FIG. 15 depicts illustrative steering performance of a lenslet steering layer.

Referencing FIG. 15, illustrative scanner performance is schematically depicted. In the example of FIG. 15, the left side depiction includes two rotating steering elements positioned near the minimum position, with a corresponding near-minimum steering amount (e.g., approximately along the optical axis). The right side depiction is generated by rotating one of the lenses to the near maximum position, providing steering near the maximum capability for the scanner. The example of FIG. 15 depicts a capability of about 30 degrees magnitude of steering, which is believed to be readily achievable, based on simulation and experience, for embodiments herein.

Referencing FIG. 16, illustrative scanner performance is schematically depicted. In the examples of FIG. 16, both steering elements are rotated together with a fixed angular difference. The steering magnitude in the examples of FIG. 16 is the same, with the steering resulting in an azimuthal orbit of the steered beam around the optical axis. It can be seen that steering can be performed to any capable angle by changing the angle difference (e.g., as shown in FIG. 15), and/or rotating the steering elements to a desired reference angle (e.g., as shown in FIG. 16).

Example embodiments herein provide for high precision ("fine") beam steering technology, for example utilizing vari-focal lenses (VFLs). Those VFLs are utilized in embodiments herein to provide for high precision nonmechanical beam steering, which may be utilized alone (e.g., where total steering capability is a small angle but very high resolution) or can be combined with other steering layers to form a wider angle with high precision and/or steering accuracy.

High precision steering, as utilized herein, indicates steering of an EM beam, whether steering an emitted beam, or steering optics to a target location that is imaged by a detector (e.g., an array), or both, where the steering can be controlled with a high precision to the target location. High precision includes any concepts such as: high angular precision (e.g., micro-radian to nano-radian precision), and/or a precision exceeding mechanically available precision. For example, a mechanical steering device may utilize mechanical movement of a lens or other device to perform steering operations, which may be limited in movement precision, thereby limiting the final steering precision. In certain embodiments, steering operations set forth herein are also more responsive than mechanical systems, allowing for higher scanning rates and/or faster movement between steering positions. In certain embodiments, high precision steering embodiments herein may be combined with coarse steering, for example allowing for greater steering capability (e.g., a coarse steering operation capable of steering to a high angle, such as +/−15 degrees, +/−30 degrees, +/−45 degrees, +/−60 degrees, etc.), with the final steering angle trimmed using the high precision steering arrangements set forth herein. In certain embodiments, the total angular capability of the fine steering portion exceeds the angular resolution of the coarse steering portion, allowing for arbitrary and high precision steering operations throughout the entire range of the coarse steering portion. Embodiments set forth herein are capable to steer to micro-radian or nano-radian precision, in either one or two dimensions, with a total steering capability that can approach the cosine steering limit (e.g., total steering angles approaching 90 degrees).

Any type of VFL may be utilized in embodiments herein. Some example VFL types are described herein in separate embodiments to illustrate aspects of the present disclosure. The organization of embodiments among these types is not limiting to the present disclosure, and embodiments may include aspects of more than one type as described herein, and/or may include other types of VFLs. For example, an embodiment may include a first type of VFL for steering in a first dimension, and another type of VFL for steering in a second dimension. In another example, an embodiment utilizes two VFLs for steering in a given dimension, with a first VFL of a first type, and a second VFL of another type. An example type 1 embodiment includes an EO film (e.g., a few microns thick) covered with multiple tiny discrete electrodes on which different voltages are applied to form an Optical Phased Array (OPA), thereby creating a lens and/or further including corrections to the resulting wavefront (e.g., to correct for aberrations, atmospheric conditions, etc.). An example second type includes a bulk Kerr effect crystal (e.g., a few millimeters thick) with three electrodes (e.g., two high side electrodes and a ground electrode), and/or an optional transparent resistive electrode (e.g., coupling the two high side electrodes, and providing for a linear or selected voltage trajectory across the lens), to form a cylindrical lens. An example third type (which may be referenced as "Abtin Triplet Lens", or "ATL" herein) includes a fixed triplet lens including a bulk EO crystal (e.g., a few millimeters thick) sandwiched between a Plano-convex thin lens and a Plano-concave thin lens. That bulk EO crystal located between the two thin lenses is covered by two transparent electrodes on its sides on which voltages are applied to manipulate the optical distance between the two thin lenses and change the overall effective focal length of the ATL. The highest optical power change per applied voltage can be achieved for an ATL if the absolute radius of curvature of those two thin lenses are equal.

Any two VFLs of any type can form a fine nonmechanical decentered lens beam steerer to steer the light to about a few degrees (<+/−2 degrees) very rapidly (~GHz) and very precisely (~a few nano rads). In certain embodiments, the fine nonmechanical decentered lens beam steerer is combined with another steering device (e.g., as an additional steering layer) to provide high precision steering with a high angular steering capability.

Example mechanical beam steerers include various types of AFOCAL optical systems (telescopes) in which at least one lens of the telescope is moving. Example mechanical "fine" beam steerers use two to four thin lens cuts rotating around the same axis by fine servo motors rather than full lenses moving up/down/left/right to steer the light to a wide-angle (up to +/−50 degrees).

As mentioned, example nonmechanical beam steerers based on decentered VFLs are capable to steer rays to small angles but very fast and very accurately. Example mechanical beam steerers are capable to deflect the light to a much wider angle, but their speed and their accuracy are significantly lower than the nonmechanical steerers. Example embodiments combine any type of VFLs with any type of mechanical steerers (or other high angle capability steering devices) to increase the steering angle and yet maintain very high precision. Example embodiments combine any type of VFLs with any type of coarse steering, including for example: a thin beam steering device (e.g., reference the '815 and/or '986 applications), a bulk beam steering device (e.g., reference the '741 application), a spinning beam steering device (e.g., reference FIGS. 48-65 and the related descriptions), and/or a wide angle or discrete beam steering device (e.g., reference the '710 application).

Figure 17:
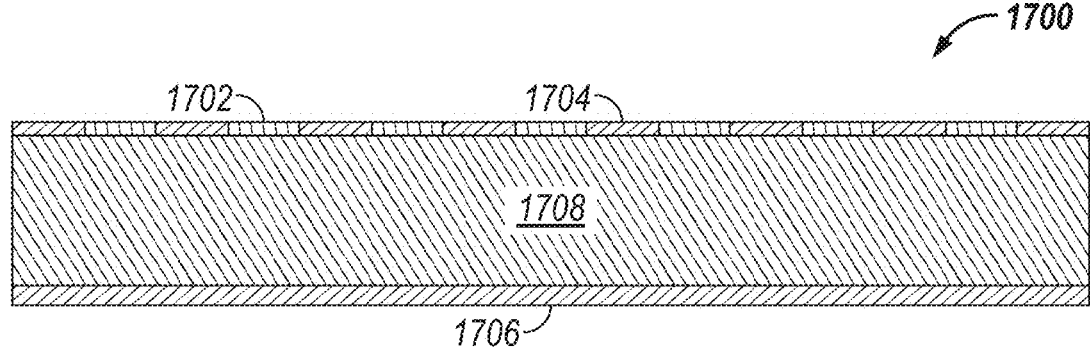
FIG. 17 depicts an example phased array capable to operate as a VFL.

Referencing FIG. 17, an example VFL 1700 is formed from an optical phased array, with an EO active material 1708 positioned between a high side electrode layer including alternating electrodes 1704 and resistors 1702, and a second low side electrode layer 1706 that is depicted as a continuous ground electrode in the example of FIG. 17. The example of FIG. 17 utilizes transparent electrodes, and may be utilized to provide a cylindrical lens (e.g., with a linear array) or a spherical lens (e.g., with a grid array).

As seen in FIGS. 17, a 1 to 10 μm thick linear electro-optical film such as KTN, or BaTiO₃, is sandwiched between two electrode layers. The first layer is a continuous transparent conductive ground electrode, and the second includes transparent discrete electrodes. The reason for having the thickness of the electro-optical layer as small as possible is to minimize the required voltage to obtain a given E field, and to minimize the fringing field effect.

As seen in FIG. 17, in one embodiment there is a transparent resistor between every two transparent conductive electrodes to linearize the voltage profile between the two steps. The reason for that is to minimize any nonlinearities in the phase retardation diagram, which will cause zero-order and −1 order peaks in the far-field intensity profile. In certain embodiments, one or more of the resistors may utilize an insulator instead, which will reduce the linearity of the voltage progression, but may be acceptable in certain embodiments. In certain embodiments, insulators may be provided within the bulk of the EO layer between electrode positions. A voltage profile is applied to the discrete electrodes to provide the target lens characteristic. Defining $V_\lambda$ as the voltage required to provide one wavelength worth of optical phase delay (OPD), an example voltage profile can start at 0, or some other value, then rises to $0.5V_\lambda$, and then drop to $-0.5V_\lambda$ before rising back to the starting voltage (e.g., using a half-wave voltage profile). Utilizing a half-wave voltage profile minimizes the effects of fringing fields, as at the reset location they will have almost the same strength but in the opposite direction, which then tend to cancel each other. Minimizing the fringing field effect and having a linear phase retardation diagram reduce or eliminate sidelobe peaks in the far-field intensity profile, reducing wasted energy and potential negative consequences of energy delivery to undesired or unplanned locations. The voltages applied on the transparent discrete electrodes can write a positive cylindrical lens which the focal length and/or the optical axis of the lens can be varied by applying different voltages.

Figure 18:
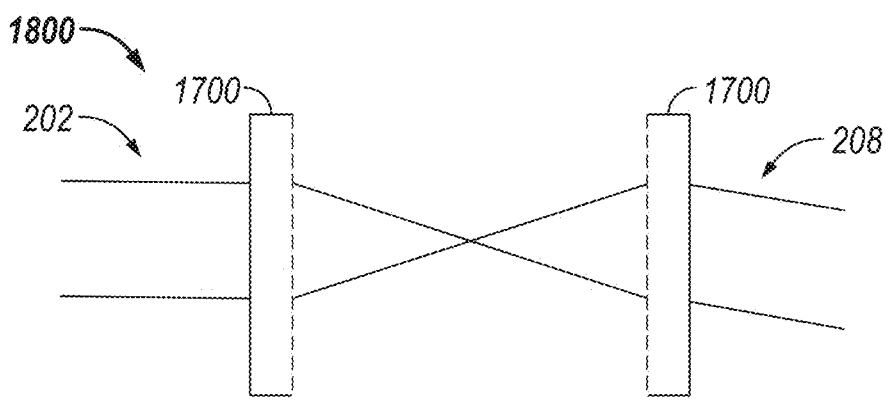
FIG. 18 depicts an example steering layer using phased arrays.

Referencing FIG. 18, a steering assembly 1800 includes two optical phased array VFLs, utilized to make a decentered lens steering system to steer the light very finely to a small angle in a single dimension. The example steering assembly 1800 may be included in an EM steering system, for example as a high precision steering layer. Because the steering assembly 1800 utilizes VFLs based on the EO effect, the speed can be in the order of GHz.

The deflection angle capability of the steering assembly 1800 can be determined as follows:

$$\Delta\tan(\theta) = \Delta\left(\frac{x}{f}\right) = \frac{\Delta x}{f} - x\frac{\Delta f}{f^2}$$

Where $\Delta x$ is the optical axis displacement and $\Delta f$ is the focal length change. The steering assembly 1800 is capable to rapidly and precisely change the position of the center of the electronically written lens. Adjustment of the Ax value may be performed mechanically by moving one or both of the VFLs, which will typically be a mechanical adjustment, and consequently a (relatively) slow and low precision steering operation, while adjustment of the f can be performed electronically using the EO effect, which is (relatively) a high speed and high precision steering operation. In the example of FIG. 18, the $\Delta x$ maybe a fixed value, and/or a value that is adjusted in response to steering operations, with the $\Delta f$ utilized during rapid changes, transient operations, or the like. In certain embodiments, a steering controller may be configured to adjust the $\Delta f$ and/or the $\Delta x$ values in coordination, for example coordinated to mitigate the response time of the Ax, and/or moving the $\Delta x$ as capable, and utilizing the $\Delta f$ to trim the achieved steering to improve realized steering relative to a steering request value.

Example benefits of the embodiment of FIG. 18 include one or more of:

1—The thickness of the device is a few microns, limiting potential absorption.

2—Because it is based on the EO effect, the speed can be in the order of GHz.

3—Both the optical axis and focal length of the lens can be varied in this system.

4—It can work with both linear and Kerr EO effects.

5—By combining this system with a mechanical steerer or other high capability steerer, the displacement in the optical axis (x) can be changed much more by a mechanical system to increase the deflection angle while maintaining the high resolution/precision.

Example limitations of the embodiment of FIG. 18, which can be mitigated as set forth herein, and/or which may be acceptable in certain systems, include one or more of:

1—The steering angle of the base steering assembly 1800 will be limited to a few degrees (e.g., unless combined with further steering components, such as a mechanical steering system).

2—In the near term significant fabrication costs depending upon the number and configuration of electrodes, which may include thousands of electrodes for certain embodiments.

3—For embodiments including the EO film as the only optical surface, with phase retardation resets (e.g., typically at $\pi$, $2\pi$, $n\pi$, and/or $2n\pi$), the system will be dispersive (e.g., having varying response for different wavelengths), and may have reduced performance for broadband light sources, which may be acceptable depending upon the application, energy throughput, or the like.

Figure 19:
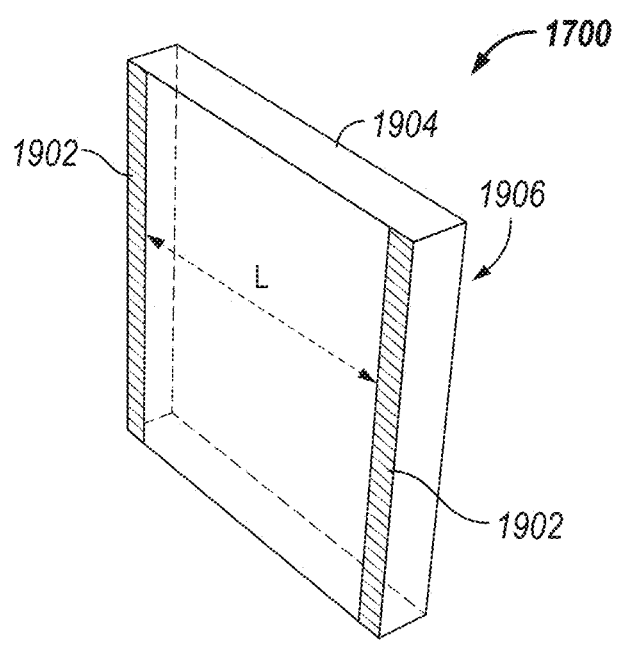
FIG. 19 depicts an example VFL.

Referencing FIG. 19, an example VFL that may be utilized in embodiments herein, for example as a part of a high precision steering layer, is formed utilizing a bulk Kerr EO crystal 1904 attached to three electrodes (e.g., high side electrodes 1902, and low-side electrode 1906), and works like a cylindrical graded-index lens. Generally, a graded-index lens is a plate of uniform thickness $d_0$ and quadratically graded refractive index is as n $(x,y)=n_0$ $[1-0.5\alpha^2 (x^2+y^2)]$, where a is a parameter in terms of m−1 that relates the index to every point of the crystal with a dimension of (x,y). The $ad_0$ is dimensionless and If $\alpha d_0 \ll 1$, it acts like a lens with a focal length of $$f = \frac{1}{n_0 d_0 a^2}.$$

In the case of a cylindrical graded-index lens, the index changes in one direction only, as follows:

$$\Delta n(x)=n(x)-n_0=-0.5n_0\alpha^2 x^2$$

Accordingly, if the index of the thin plate of uniform thickness $d_0$ gradually changes by $x^2$, that plate will behave like a cylindrical lens. In Kerr effect bulk crystals under voltage of V, the refractive index of the crystal is varied in terms of $V^2$. Therefore, a thin plate of the Kerr effect bulk crystal can form a cylindrical lens if the applied voltage is linearly varied with respect to x (e.g., along the distance between the high side electrodes 1902).

As shown in FIG. 19, an example VFL 1700 includes a plate of a bulk Kerr electro-optical (EO) crystal 1904 with a uniform thickness of do, on the order of a few millimeters. The high-side electrodes 1902 are separated by a distance L. Note that the substrate 1904 in the proposed system can be made of any EO crystals with a sizeable Kerr effect, such as KTN or PMNPT.

To operate the VFL 1700, two different voltages are applied on the front electrodes 1902, and the uniform transparent electrode 1906 at the backside of the crystal 1904 is connected to the ground. In certain embodiments, a transparent resistive electrode may couple the two discrete conductive electrodes 1902 on the front of the Kerr effect crystal 1904 to improve the linear distribution of the voltage across the "L".

Assuming voltages of $V_0$ and zero are respectively applied on the first and second electrode, the distribution of the electric field in the crystal will be;

$$E(x) = \frac{dV}{dy} = \frac{V_0 x}{L d_0} \quad 0 \le x \le L$$

Therefore, the index change caused by the Kerr effect will be:

$$\Delta n(x)=n(x)-n_0=-0.5n_0{}^3 s_{ij}E(x)^2$$

Where $n_0$ is the index of the crystal before applying any voltages. If the incident light is polarized perpendicular to the crystal axis, the $n_0$ will be the ordinary index, otherwise $n_0$ is the extraordinary index of the crystal. The $s_{ij}$ is the appropriate element of the Kerr effect tensor which is related to the dielectric constant of the crystal as follows:

$$s_{ij}=g_{ij}\varepsilon(T)^2$$

Where $g_{ij}$ is the appropriate electrostrictive tensor element, and $\varepsilon$ is the dielectric constant, which is a function of temperature. In the case of KTN, the dielectric constant as a function of temperature is given as:

$$\varepsilon(T) = \frac{140000\varepsilon_0}{T - T_c} \quad T > T_c$$

Where $\varepsilon_0$ is the dielectric constant in vacuum and $T_c$ is the Curie temperature of KTN. It should be noted that KTN exhibits a significant Kerr effect in its paraelectric region. Therefore, the temperature of the KTN crystal is maintained higher than its Curie temperature. It should be noted that for KTN the properties are approximately $T_c=300K$, and $n^3 g_{11}=2m^4/C^2$. The properties for other materials will be known by the manufacturer and/or can be readily determined for a given material.

Accordingly, for an embodiment using a KTN crystal, the index change will be:

$$\Delta n(x) = -0.5 s_{ij} n_0^3 E(x)^2 = -0.5 s_{ij} n_0^3 \frac{V_0^2}{L^2 d_0^2} x^2 \quad 0 \le x \le L$$

Figure 20:
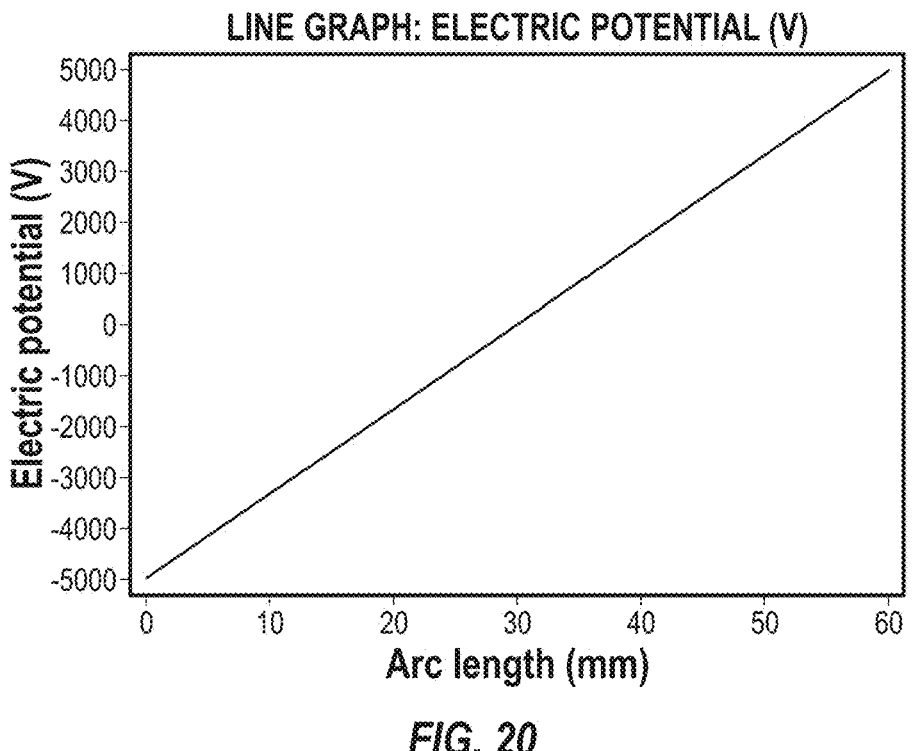
FIG. 20 depicts illustrative applied voltage for a VFL.
Figure 21:
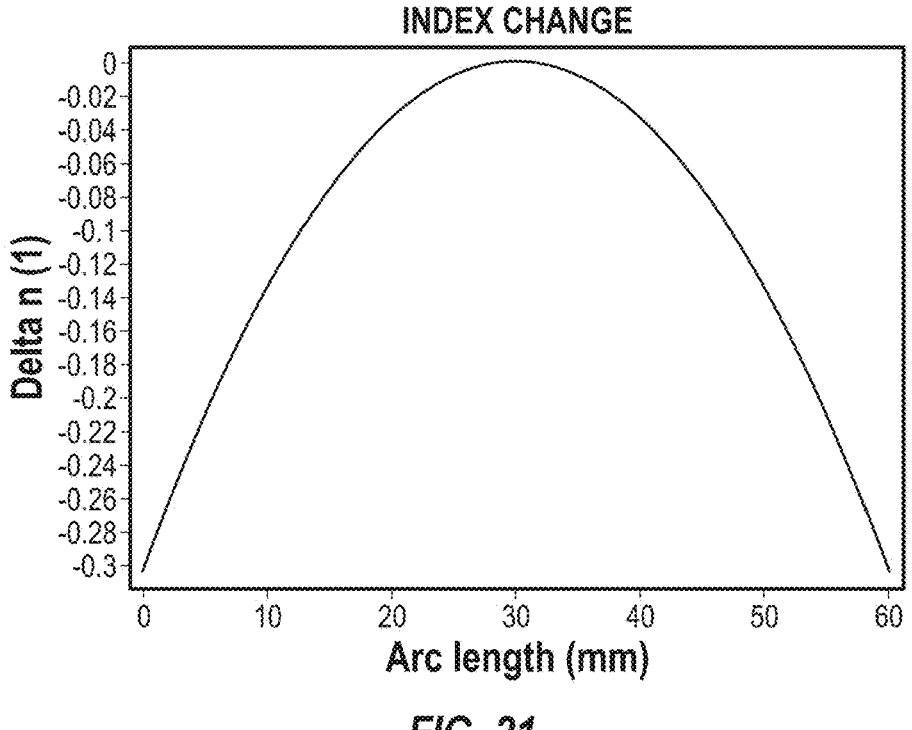
FIG. 21 depicts illustrative index differentials for a VFL.

Referencing FIGS. 20 and 21, the voltage and index change across the length of a 6 cm×6 cm×1 mm KTN crystal plate under ±5 kV are plotted as illustrative data. Relationships such as those depicted in FIGS. 20 and 21 can readily be determined for any material and/or conditions, and utilized as operating curves and/or to guide control of a VFL utilized in embodiments of the present disclosure. Note that the voltage range goes from −5 kV to ±5 kV, but may be provided at any selected value according to the specific design of a contemplated system.

In the example embodiments, the voltage is zero at the mid-point between the electrodes 1902, so there is no index change at that position. In the example of FIG. 21, the index change varies from about −0.3 to zero, then back to about −0.3. As seen in the preceding equations, the index change is a function of $x^2$ (or the length along the distance between the electrodes 1902). Hence, the VFL 1700 of the example of FIG. 18 provides a cylindrical graded index lens in one dimension. The focal length of the lens will be:

$$f = \frac{L^2 d_0}{s_{ij} n_0^3 V_0^2} = \frac{L^2 d_0}{n_0^3 V_0^2 g_{ij} \varepsilon(T)^2} = \frac{K}{V_0^2 \varepsilon(T)^2} \quad T > T_c$$

Where $$K = \frac{L^2 d_0}{n_0^3 g_{ij}}$$

is a constant because the L and $d_0$ are the geometry parameters, no and $g_{ij}$ reflect the material properties. It will be noted that no and $g_{ij}$ depend on the wavelength and polarization of the incident light, but they are constant for given incident light.

The focal length of the VFL 1700 can be altered by changing the applied voltage of $V_0$ or changing the dielectric constant, such as by varying the temperature. In the case of a crystal 1904 made of KTN, the focal length and optical power of the VFL 1700 as a function of temperature and the applied voltage are as follows:

$$f = \frac{K}{V_0^2} \left( \frac{T - T_c}{140000\varepsilon_0} \right)^2 \quad T > T_c$$

$$\phi = \frac{V_0^2}{K} \left( \frac{140000\varepsilon_0}{T - T_c} \right)^2 \quad T > T_c$$

Figure 22:
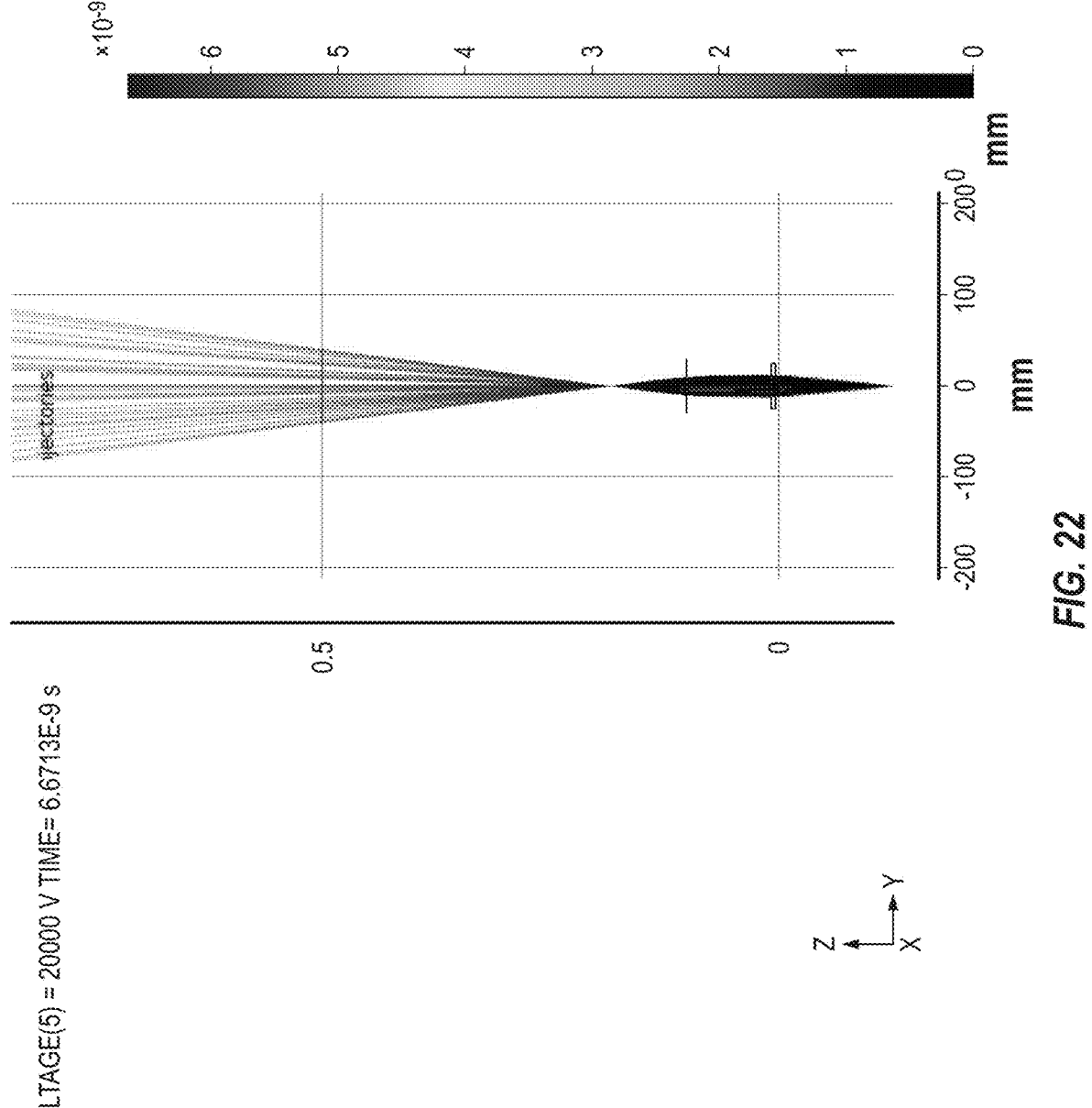
FIG. 22 depicts illustrative optical characteristic results for a VFL.
Figure 23:
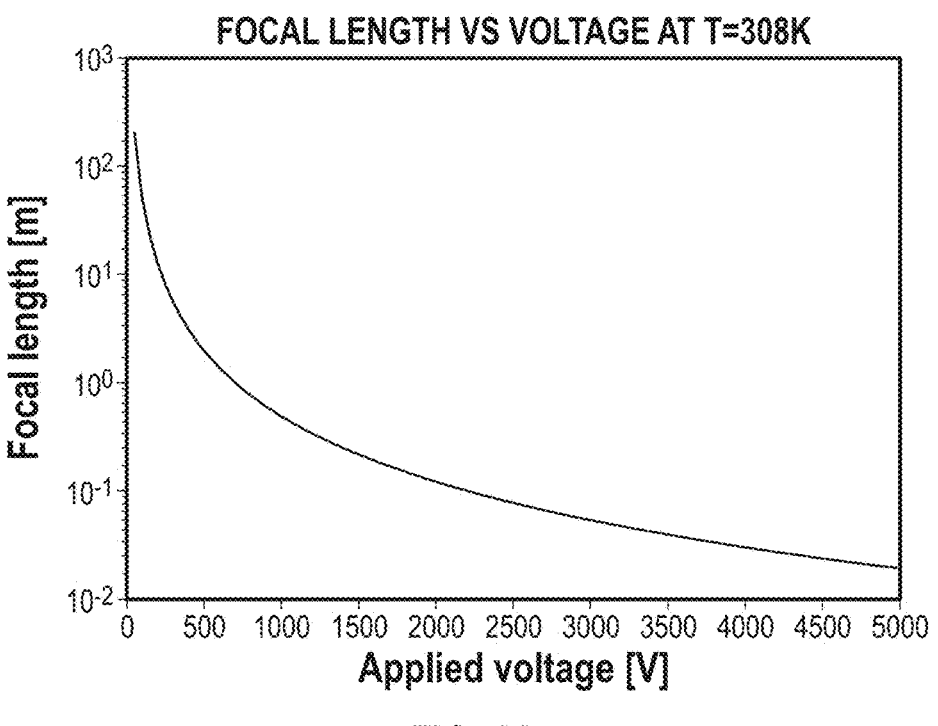
FIG. 23 depicts illustrative focal length response to applied voltage.
Figure 24:
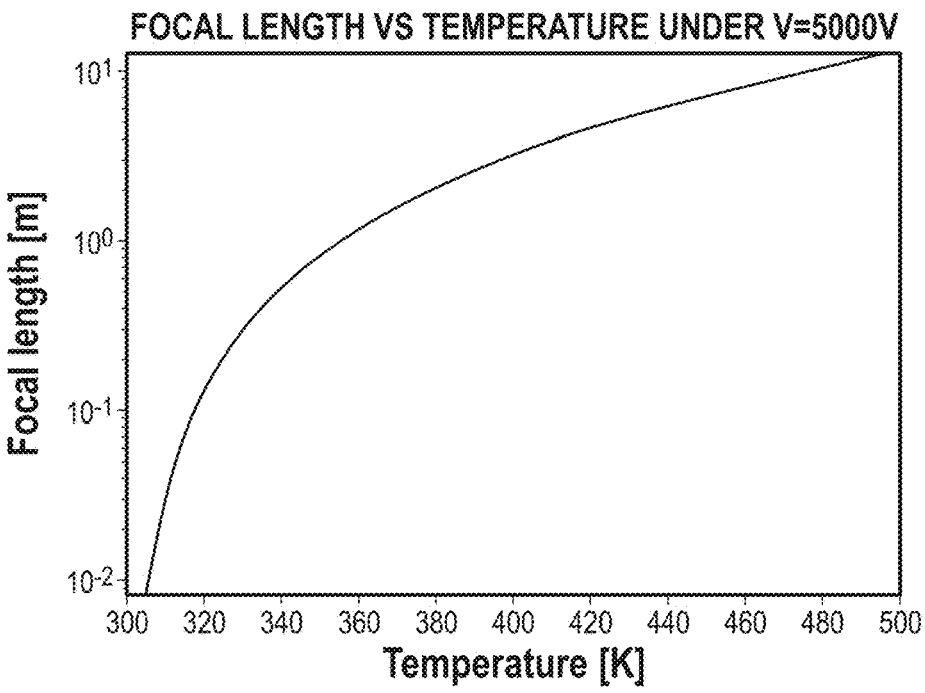
FIG. 24 depicts illustrative focal length response to temperature.

As seen, the focal length and power of the VFL are responsive to temperature and the applied voltage. When no voltage is applied or the temperature is high, the varifocal lens does not have any optical power. In contrast, when the applied voltage is high and/or the temperature is close to the Curie temperature, the optical power will be high. It should be noted that, to achieve a high power lens or a lens with a short focal length, the temperature can be adjusted close to the Curie temperature rather than applying a very high voltage. Referencing FIG. 22, an example performance for a VFL 1700 using a KTN crystal with a length of 5 mm and a thickness of 1 mm is provided in illustrative data. The example of FIG. 22 provides an illustration of the lens strength capability of the VFL 1700. Referencing FIG. 23, illustrative data is depicted for a VFL 1700 having the same configuration as the example of FIG. 22, and depicts the focal length of the VFL 1700 versus the applied voltage at the electrodes 1902. Illustrative data such as that depicted in FIG. 23 may be utilized as an operating curve to control the focal length of the VFL 1700, and consequent operations of a steering device utilizing the VFL 1700, and/or for a steering layer (e.g., a high precision steering layer) of a steering device. Referencing FIG. 24, illustrative data is depicted for a VFL 1700 having the same configuration as the example of FIG. 22, and depicts the focal length of the VFL 1700 versus the temperature of the crystal 1904. Illustrative data such as that depicted in FIG. 24 may be utilized as an operating curve to control the focal length of the VFL 1700 (e.g., adjusting temperature to control, and/or utilizing the operating curve for compensation in response to actual temperatures in the system), and consequent operations of a steering device utilizing the VFL and/or for a steering layer (e.g., a high precision steering layer) of a steering device. In certain embodiments, information such as that depicted in FIGS. 23 and 24 may additionally or alternatively be determined in combination, for example with a surface depicting the focal length versus temperature and applied voltage. Illustrative data such as that depicted in FIGS. 23 and 24 may be available from a manufacturer of a particular crystal substrate, and/or may be readily determined for a range of relevant operating conditions for a contemplated system.

As seen in the example of FIG. 23, the temperature is fixed at 308K, but the voltage is varied from 0 to 5 kV. In the example of FIG. 24, the voltage is fixed at 5 kV, but the temperature is varied from 308K to 500K. It is shown that the focal length will be small for high applied voltage and/or low temperature close to the Curie temperature. An example approach is keeping the temperature very close to, and above, the Curie temperature to be able to reach a high optical power by applying a relatively small voltage. For certain materials, including KTN, the VFL 1700 should be operated above the Curie temperature, because the Kerr effect is the dominant EO effect utilized to implement the VFL.

Figure 25:
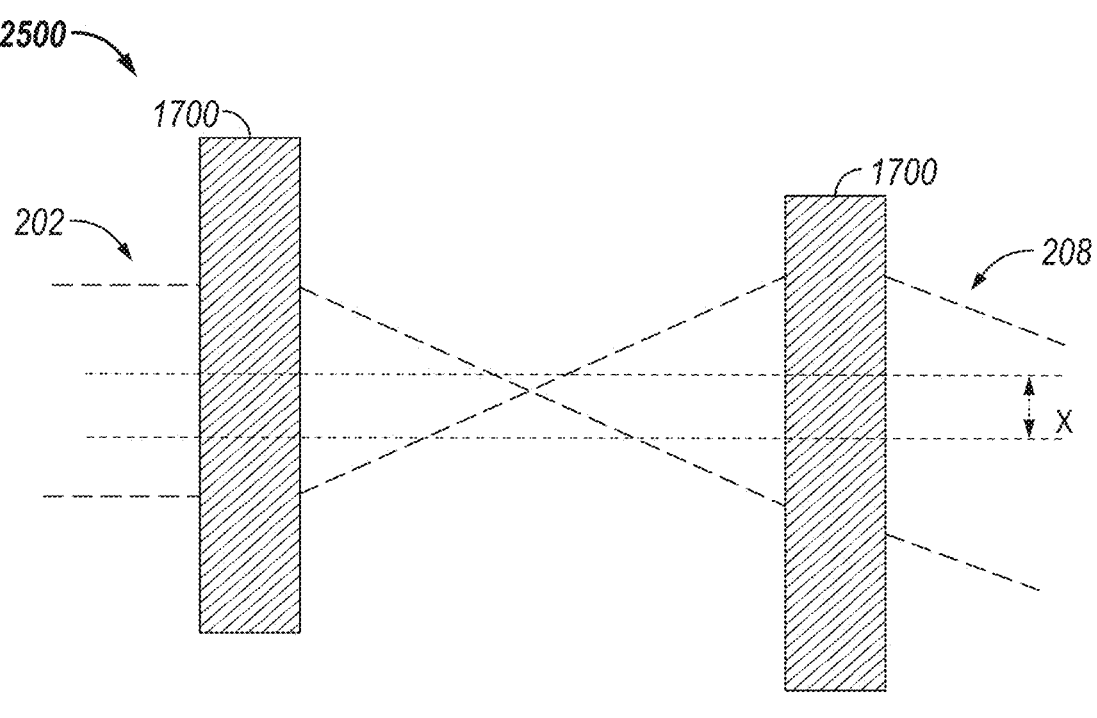
FIG. 25 depicts illustrative steering performance for an offset phased array steering layer.

Referencing FIG. 25, an example steering assembly 2500 is depicted utilizing two VFLs such as depicted in FIG. 19. Similar to the previous steering assembly 1800, two of these VFLs can form a decentered lens system, for example as a steering device and/or to form a high precision steering layer for a steering device. In the example of FIG. 25, the two VFLs are x (x≠0), and deflection angle is:

$$A\tan(\theta) = \Delta\left(\frac{x}{f}\right) = -x\frac{\Delta f}{f^2}$$

Where $$f = \frac{K}{V_0^2 \varepsilon(T)^2},$$

and is varied by changing the voltage and/or temperature. However, as mentioned, an example approach is adjusting and/or maintaining the temperature slightly above the Curie temperature to reduce the voltage required to achieve a given index change. In certain embodiments, one or both of the VFLs 1700 may additionally be moved to adjust the Ax, which will adjust the steering as noted in the equations. In certain embodiments, the VFLs 1700 may be of the same type (e.g., optical phased array and/or crystal based) or of distinct types.

Example benefits of a steering assembly 2500, such as depicted in FIGS. 19-25, include one or more of:

1. The VFL may include just a bulk Kerr EO crystal with three electrodes, which only one of them must be transparent. Therefore, the systems fabrication cost will be low.
2. Because it is based on the EO effect, the speed can be in the order of GHz.
3. By combining this system with a mechanical steerer, the displacement from the optical axis (x) can also be changed by a mechanical system to increase the deflection angle while maintaining the resolution.
4. This system only requires a small number of voltages to be applied Example limitations of a steering assembly 2500, such as depicted in FIGS. 19-25, and which can be mitigated as set forth herein, and/or which may be acceptable in certain systems, include one or more of:

1. VFL embodiments are limited to Kerr effect materials.
2. Embodiments adjusting only the focal length will have a small deflection angle capability (e.g., +/−2 degrees).
3. Embodiments including the EO crystal as the only optical material will be dispersive (e.g., having varying response for different wavelengths), and may have reduced performance for broadband light sources, which may be acceptable depending upon the application, energy throughput, or the like.
4. Example systems utilize relatively high voltages (e.g., depending upon the operating temperature and materials selected, but generally 1 kV to several kV).

Figure 26:
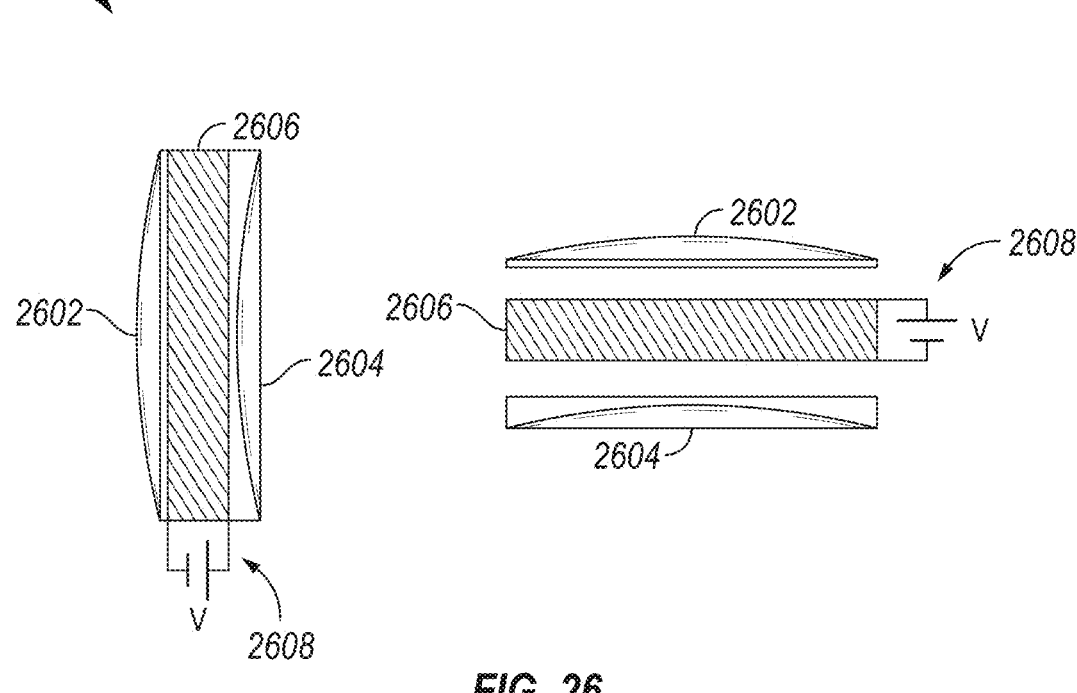
FIG. 26 depicts an example ATL.
Figure 27:
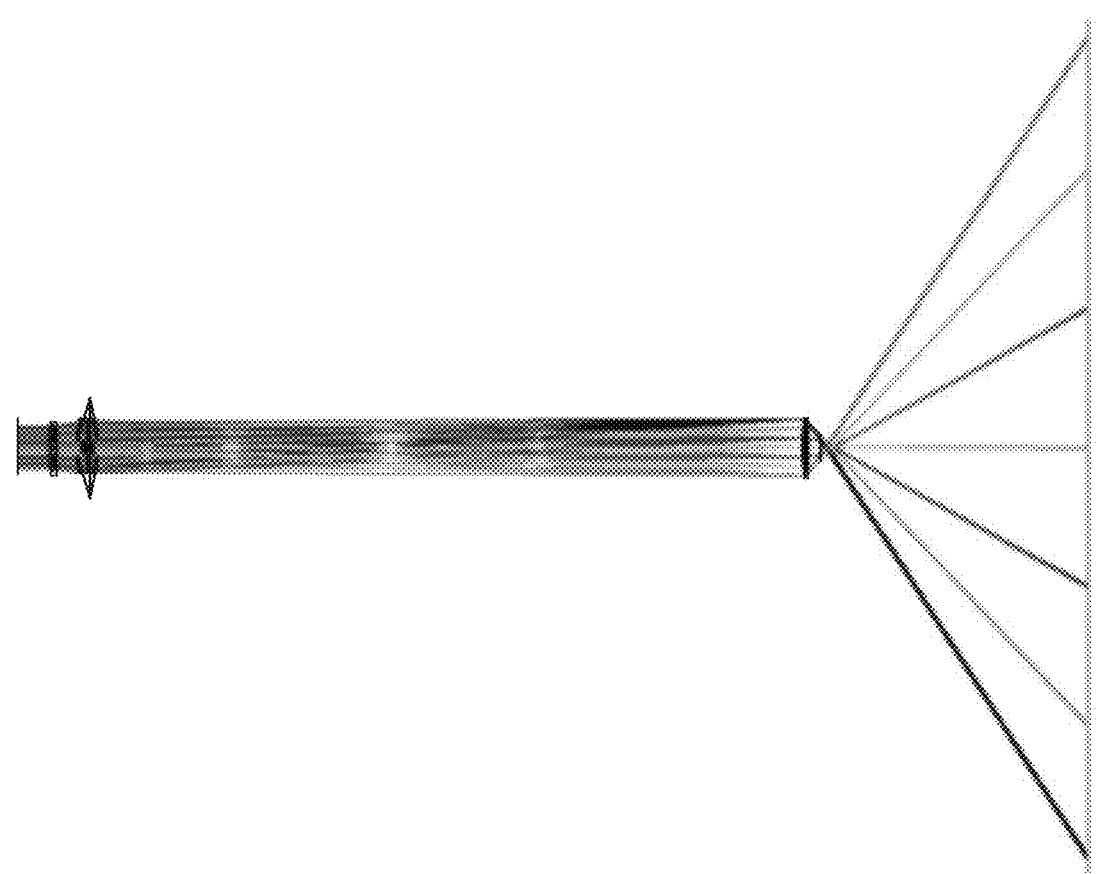
FIG. 27 depicts illustrative steering performance for a beam steering device.
Figure 28:
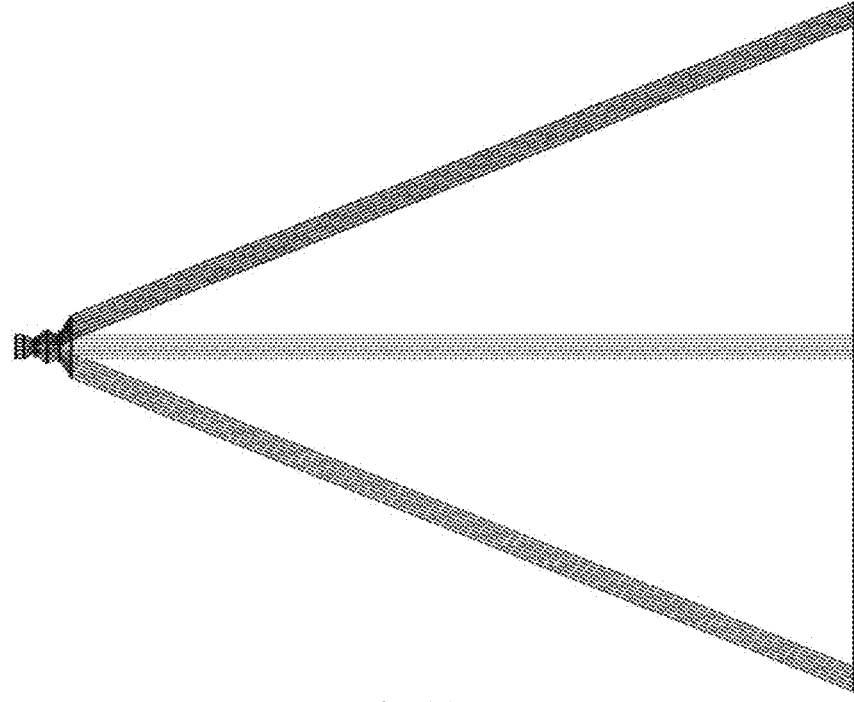
FIG. 28 depicts illustrative steering performance for a beam steering device.

Referencing FIG. 26, an example of ATL 2600 is a cemented/fixed triplet lens using a bulk EO crystal 2606 with two uniform transparent electrodes sandwiched between one Plano-convex thin lens 2602 and one Plano-concave thin lens 2604. The example ATL 2600 may be utilized as a steering device, and/or as a steering layer (e.g., a high precision steering layer) within a steering device. An applied voltage 2608 across the EO crystal 2606 adjusts the index of the EO crystal. As the index of the EO crystal 2606 is adjusted, the optical distance (the index times length) between the two curved surfaces 2602, 2604 will be changed. Therefore, by changing the voltage applied across the EO crystal 2606 the total effective focal length of the ATL 2600 will be varied. In certain embodiments, the ATL 2600 includes the lenses 2602, 2604 having an equal absolute radius of curvature, which maximizes the focal length change per unit of applied voltage to the EO crystal 2606. In certain embodiments, such as fabrication constraints and/or the availability of particular lenses, the absolute radius of curvature of the lenses 2602, 2604 may be distinct.

In certain embodiments, an ATL 2600 may be utilized as one or both stages of a VFL 1700 and/or steering assembly 1800, 2500. In certain embodiments, one or more ATLs 2600 may be combined in a steering apparatus such as depicted throughout the present disclosure. In certain embodiments, the plano-convex thin lens 2602 and/or plan-concave thin lens 2604 may be a lens cut-out portion (e.g., a lenslet), including any portion of the lens that is not centered on the thickest portion of the lens, allowing for rotation of the lens to adjust the steering of the EM beam, for example as described in the portions referencing FIGS. 4-14.

Example benefits of embodiments utilizing ATL(s) 2600 include one or more of:

1—ATLs 2600 can be formed as a spherical or cylindrical lens, selectively focusing the EM beam to a line (and/or utilizing two stages of a cylindrical lens to focus to a point), or to a point (e.g., using spherical lenses). ATLs 2600 can be constructed having net positive (e.g., converging) or net negative (e.g., diverging) power.
2—The EO crystal changes the optical distance between the positive and negative components by changing the index of the medium, but also improves the field curvature and specifically the Petzval aberration. Therefore, the optical quality of ATL 2600 is improved relative to other VFL types. Without limitation to any other aspect of the present disclosure, an ATL 2600 based steering device and/or high precision steering layer can readily be constructed that supports imaging quality steering (e.g., whether steering an emitted EM beam, or received EM energy from a target location).
3—The example ATLs 2600 are depicted as coupled components, and may be cemented together. However, a given embodiment may include ATL elements that are not coupled or cemented, for example allowing for air gaps, independent rotation of lens elements, or the like.

4—ATLs 2600 may be utilized with any transparent material having a controllable index, including at least transparent crystals, whether working on a Kerr effect or a linear EO crystal, and/or liquid crystals.
5—For embodiments utilizing a linear EO crystal, the change in the optical path does not depend on the thickness of the crystal $$\left( L\Delta n = -0.5 L r_{ij} n_0^3 E = -\frac{0.5 r_{ij} n_0^3 L V}{L} = -0.5 r_{ij} n_0^3 V \right).$$

Therefore, the thickness of the EO crystal can be very small if the amount of the applied electric field is lower than the damage threshold. Accordingly, an ATL 2600 can be embodied utilizing relatively smaller voltages than with a Kerr effect crystal.

6—The example ATL 2600 includes a number of features that can be tuned according to desired behavior of the ATL 2600. For example, the surfaces of the lenses may be aspheric or spheric, with or without conic, and/or they may be doublets. The materials of the positive and the negative lenses as well as the curvatures, surface conics and aspheric coefficients of the two surfaces can be tuned to mitigate anomalies such as aberration, axial color, and/or spherochromatism. Accordingly, an ATL 2600 can be constructed having a high optical quality, including to the extent that the optical quality is diffraction limited.
7—Because ATL 2600 is based on the EO effect, the speed can be in the order of GHz, at least for the high precision focal length modulation portion of the ATL 2600. In certain embodiments, for example where the ATL 2600 forms a combined steering layer (e.g., with rotating lens 2602, 2604 elements), certain response aspects may be more limited, for example by the rotational response of the lenses 2602, 2604.
8—By combining this system with an a mechanical steerer, the displacement from in the optical axis (x) can also be changed by a mechanical system to increase the deflection angle while maintaining the high precision/resolution.
9—Various aspects of the ATL 2600 reduce fabrication costs, including the limited number of components, electrodes, applied voltages, etc.

Example potential limitations from embodiments utilizing an ATL 2600, such as depicted in FIGS. 26-32, and which can be mitigated as set forth herein, and/or which may be acceptable in certain systems, include one or more of:

1—Although the thickness of the EO crystal 2606 can be small, the diameter of the crystal 2606 must be at least equal to the diameter of the Plano lenses 2602, 2604. Therefore, if the lenses 2602, 2604 are large, the EO crystal 2606 must be large too. Some crystals like KDP or Liquid crystals have no major size limitations, and some ceramics like PMN-PT can be fabricated in large scale. Some bulk crystals, such as SBN or KTN, are usually fabricated with a diameter less than an inch. Accordingly, in certain embodiments, embodiments utilizing an ATL 2600 may limit aperture size, and/or increase fabrication costs (e.g., to utilize a crystal of unusual size).

2—Where a bulk EO crystal 2606 is used in an ATL 2600, a voltage on the order of at least several hundred volts is typically needed.

As seen, an ATL 2600 can be used for high precision beam steering, with imaging quality optical characteristics. Two ATLs 2600 can be arranged (e.g., similar to the arrangements in FIG. 18 or 25), decentered by x (x≠0), and can provide fine steering (and/or high precision steering) to the EM beam by changing the focal length. An ATL 2600 can be included in a steering device as a high precision steering layer, in combination with other layer(s) to increase the steering magnitude that can be controlled. In certain embodiments, two ATLs 2600 can be arranged with linear movement available therebetween, creating a combined high precision and de-centered steering device or layer. In certain embodiments, an ATL 2600 can be configured with rotating lenslets, creating a combined high precision steering device or layer having enhanced steering magnitude capability.

Example steering devices includes a mechanical steering layer (e.g., a de-centered steering layer and/or a rotating lenslet steering layer) combined with a high precision steering layer (e.g., utilizing VFLs and/or ATLs). Referencing FIG. 27, an example steering device capability is illustrated using a de-centered steering layer combined with a high precision steering layer, allowing for high precision (e.g., to micro- and/or to nano-radian precision) with high steering magnitude capability (e.g., +/−60 degrees, in the example). The illustrated capability depicted in FIG. 27 can be readily achieved utilizing embodiments herein. Referencing FIG. 28, an example steering device capability is illustrated using a rotating lenslet layer combined with a high precision steering layer, allowing for high precision with high steering magnitude capability (e.g., +/−30 degrees, in the example).

Figure 29:
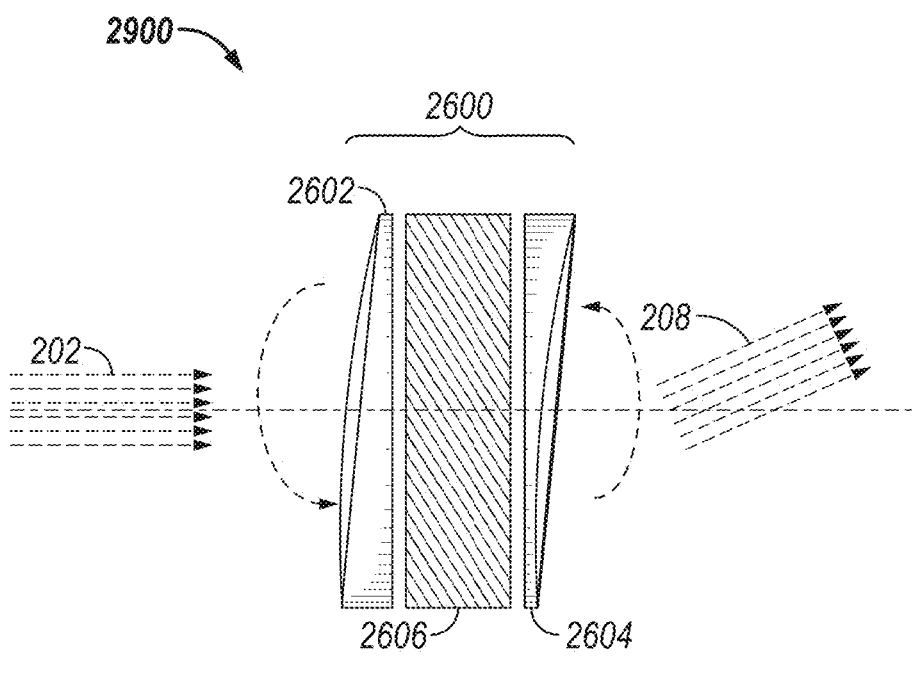
FIG. 29 depicts illustrative steering performance for an ATL based steering layer.

Referencing FIG. 29, an example steering assembly 2900 is depicted, having an ATL 2600, where the lenses 2602, 2604 are coupled to a rotating actuator and configured to rotate, thereby controlling macro steering operations of the steering assembly 2900. The example steering assembly 2900 may be utilized as a steering device, and/or included as a steering layer (e.g., a high precision steering layer, and/or a lenslet steering layer) in a steering device.

Figure 30:
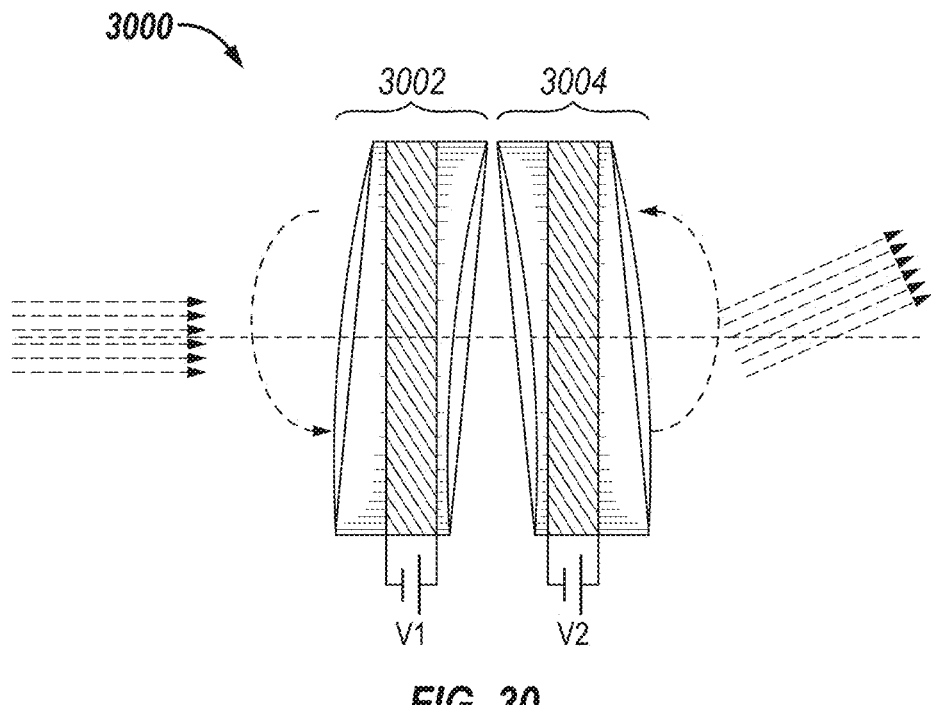
FIG. 30 depicts illustrative steering performance for an ATL based steering layer.

Referencing FIG. 30, an example steering assembly 3000 is depicted, having two ATLs 3002, 3004 in series, operating together as a combined high precision steering layer (e.g., through adjustment of the focal length) and/or lenslet steering layer (e.g., through control of the relative difference angle between the ATLs 3002, 3004, or the mutual rotation relative to a reference angle). The lenses of the example steering assembly 3000 are lenslets, or lens cuts from a portion of a reference lens. The example steering assembly 3000 provides for a high magnitude steering capability (e.g., readily exceeding +/−30 degrees), combined with high precision steering capability. The steering assembly 3000 may be utilized as a steering device, and/or included as a steering layer in a steering device. As in other embodiments utilizing lenslets, the effective displacement of the lenses (or between the ATL stages, in the example of FIG. 30), can be greater than the lens radius, greatly increasing the magnitude of steering capability, leading to a steering capability that is greater than tan $$\tan^{-1}\left(\frac{1}{2f\#}\right).$$

Adjustment of the focal length can increase the deflection angle as previously indicated, but can also be utilized to adjust the deflection angle, providing for greater precision in steering. A de-centered lens steerer can deflect to an angle of $$\Delta\tan(\theta) = \Delta\left(\frac{x}{f}\right) = \frac{\Delta x}{f} - x\frac{\Delta f}{f^2},$$

where $\Delta x$ is the effective displacement (or virtual displacement) for a rotating lenslet steering layer, so tuning of the focal length (applying a $\Delta f$) can be utilized to trim the steering to the desired location. The example of FIG. 30 depicts ATLs 3002, 3004 having opposite cuts, for example a positive cut 3002 and a negative cut 3004.

An example steering device includes a mechanical steering layer providing a displacement ($\Delta x$, which may be a de-centered layer, lenslet layer, rotating steering layer, and/or a wide angle or discrete steering layer), and a high precision steering layer using a VFL and/or ATL to adjust the focal length ($\Delta f$). In certain embodiments, the mechanical aspects and the high precision aspects may be combined into a single steering layer as set forth throughout the present disclosure.

Figure 31:
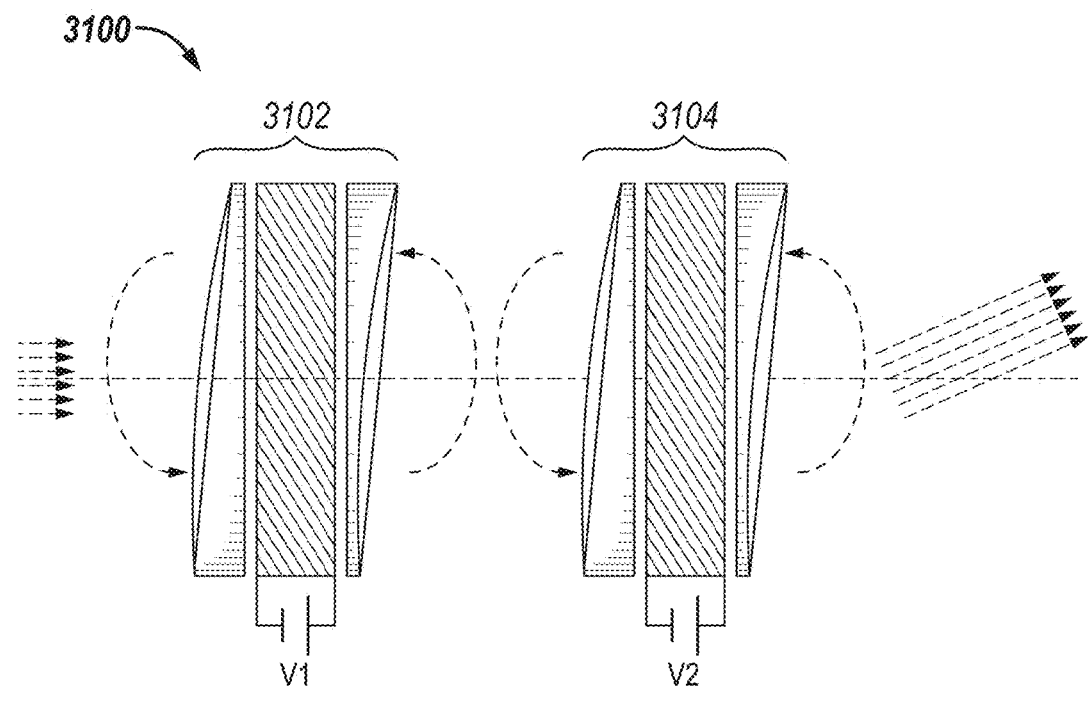
FIG. 31 depicts illustrative steering performance for an ATL based steering layer.

Referencing FIG. 31, an example steering assembly 3100 includes two ATLs 3102, 3104, each having independently rotatable lens elements. In the example of FIG. 31, the lens elements are lens cuts or lenslets. The example steering assembly 3100 is capable of high scanning speeds (at least as fast as the lens elements can rotate), high steering magnitude capability, and high precision steering operation. The example of FIG. 31 is further capable of full aperture steering.

Figure 32:
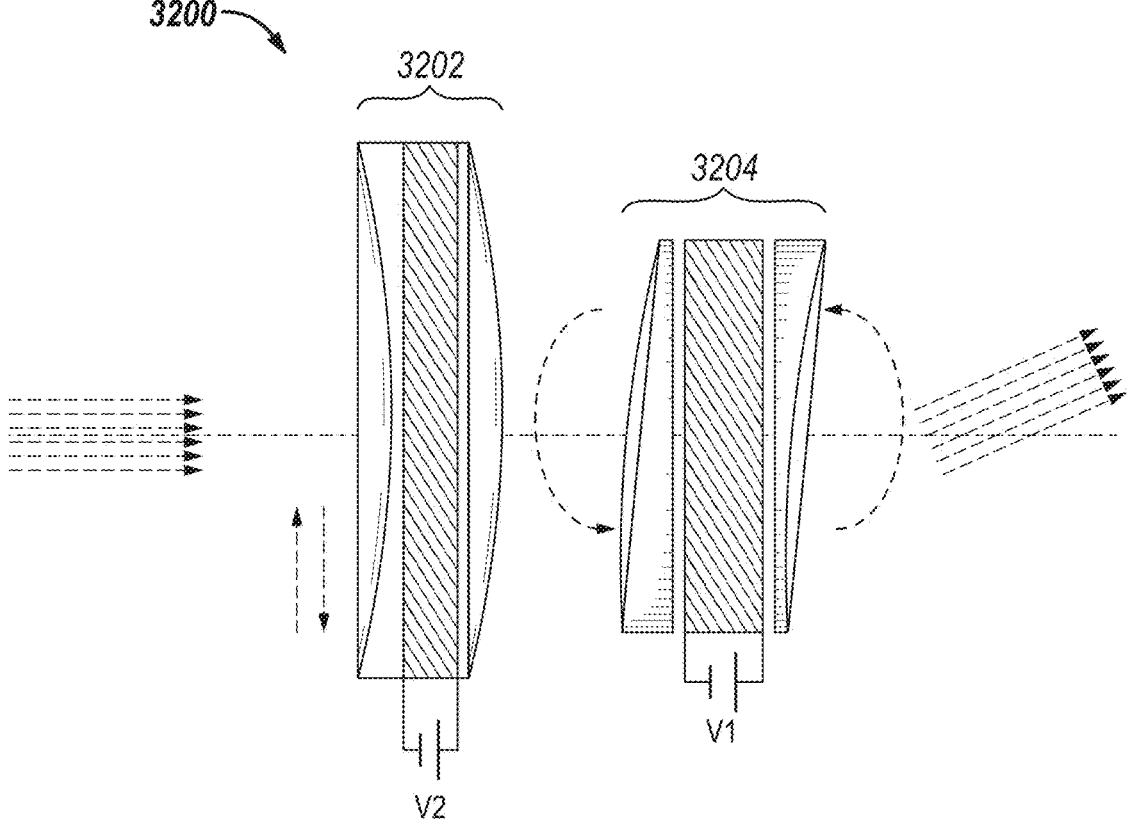
FIG. 32 depicts illustrative steering performance for an ATL based steering layer.

Referencing FIG. 32, an example steering assembly 3200 includes two ATLs 3202, 3204, with the first ATL 3202 moveable in a first direction (vertical, in the example of FIG. 32) to adjust the displacement ($\Delta x$), and with the second ATL 3204 having independently rotatable lens elements (e.g., which may be lenslets). The example of FIG. 32 allows for high steering magnitude capability, high precision steering operations, and simple fabrication. In the example of FIG. 32, the first ATL 3202 may have fused elements, for example to simplify the linear actuation, as the lens elements and intermediate crystal do not move relative to each other. Embodiments depicted in FIGS. 31 and 32, without limitation to other embodiments herein, are well suited to perform raster scanning with high precision operation.

Figure 33:
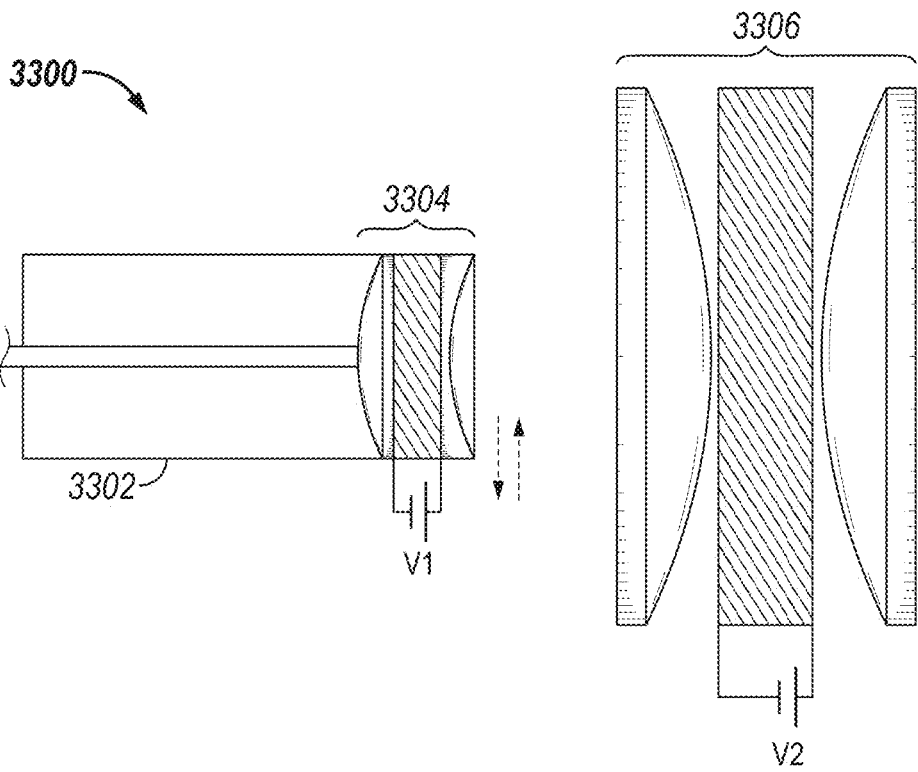
FIG. 33 depicts an illustrative steering layer.

Referencing FIG. 33, an example steering assembly 3300 is schematically depicted. The example steering assembly 3300 includes a source package 3302 having a fiber (e.g., EM source) and a negative ATL 3304 included therewith. The example source package 3302 is optional, and the components may be arranged as desired. An example source package 3302 may be movable, for example by a mechanical actuator configured to move the source package 3302 in a single steering axis or in both steering axes. The example steering assembly 3300 includes a fixed collimator/steerer formed from an ATL 3306 having two positive lenses. Applied voltages to each ATL 3304, 3306 are utilized to configure the EM beam to be steered. In the example, diverging light emerging from the source package 3302 is collimated and steered to a desired angle by adjusting the mechanical mover (e.g., displacement of the source package 3302) and the applied voltages to each ATL 3304, 3306. The steering of the steering assembly 3300 may be to a target location, and/or to another steering layer on a steering device. The example steering assembly 3300 may be provided as a steering device, as an initiating optics element for a steering device, and/or as a steering layer for a steering device.

In certain embodiments, the EO collimator/steerer (ATL 3306) is a 2f telecentric anastigmat lens which has an EO crystal under voltage between its two elements. Generally, the fixed 2*f* telecentric anastigmat lens can include more than two elements but no more than one EO crystal is required between its elements. In one example, one component of the fixed 2*f* telecentric anastigmat lens can embodied as an ATL 3306.

Figure 34:
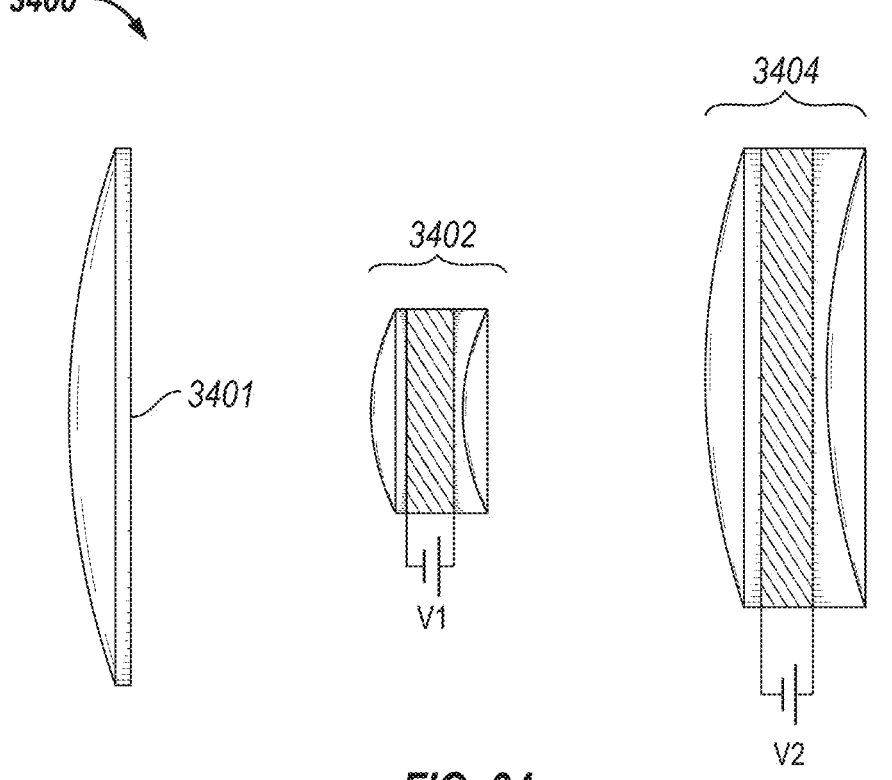
FIG. 34 depicts an illustrative steering layer.

Referencing FIG. 34, an example steering assembly 3400 is depicted, having a positive lens 3401, a negative ATL 3402, and a positive ATL 3404. In the example of FIG. 34, the ATLs 3402, 3404 are moveable, for example along a single steering axis, or along both steering axes.

In the example of FIG. 34, the negative ATL 3402 acts as a field lens, and the positive ATL 3404 acts as the emission lens. The movement of the ATLs 3402, 3404, combined with adjustments to f, can be utilized to deflect the light with high precision to the desired angle. The example steering assembly 3400 may be utilized as a steering device, and/or may be included as a high precision steering layer in a steering device.

Figure 35:
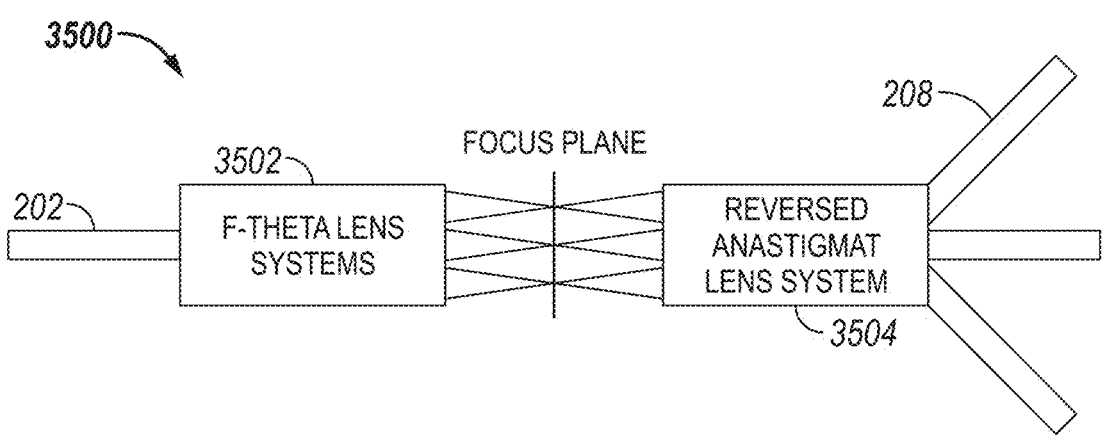
FIG. 35 depicts an illustrative steering layer.
Figure 36:
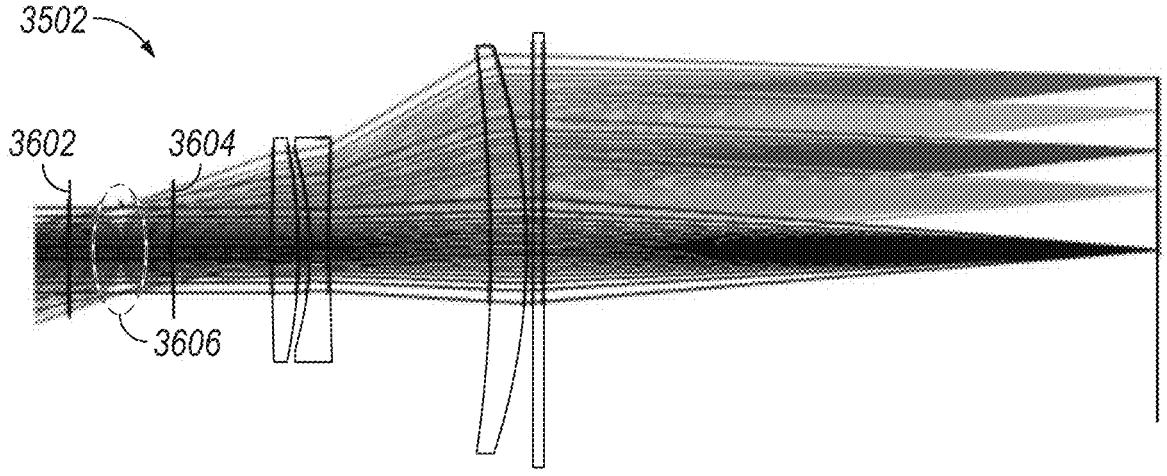
FIG. 36 depicts illustrative steering performance for an F-theta lens system.
Figure 37:
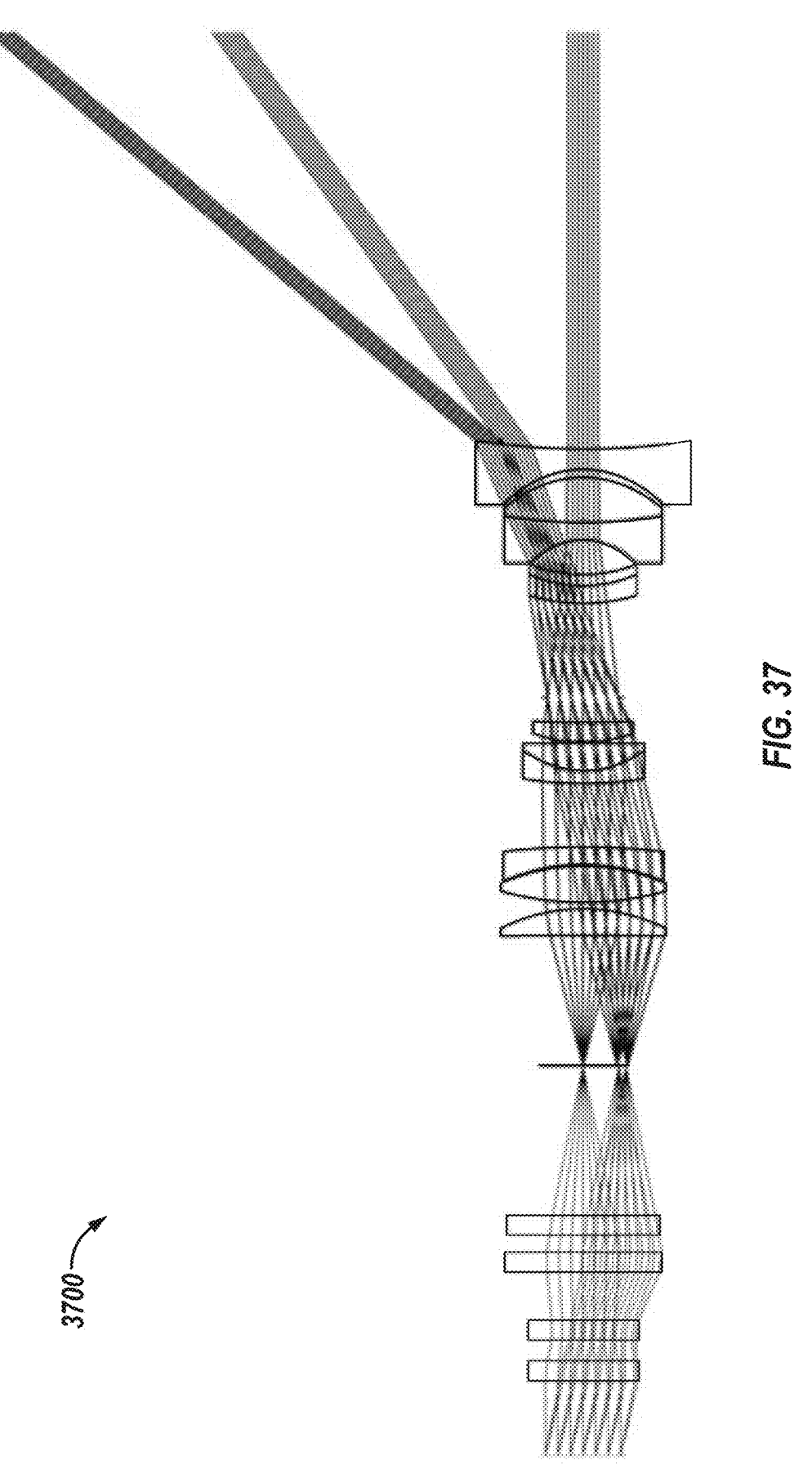
FIG. 37 depicts illustrative steering performance for a beam steering device.

Referencing FIG. 35, an example steering assembly 3500 is depicted, having a telecentric F-theta lens 3502 and a reversed telecentric anastigmat lens 3504. In the example, the incident EM beam 202 is steered by spinning mirrors of the F-theta lens 3502, and gets focused on the entrance pupil of the reversed anastigmat lens 3504. The light is steered to a wide angle by the reversed anastigmat lens 3504. In the example, the F-theta lens includes between two and five elements, and two small mirrors, with the height of the image (H) calculated at the focal length times the field angle (H=f×θ). An example F-theta lens 3502 is depicted in FIG. 36, with the mirrors 3602, 3604 and aperture stop surface 3606 marked for reference. Example and non-limiting options for the reversed telecentric wide-angle anastigmat lens system 3504 include, without limitation, a Tessar, double Gauss, Hypergon, Topogon, Hologon, or Biogon system, and/or a retrofocus lens system which is reversed. The example steering assembly 3500 is capable to steer the incident EM beam to +/−60 degrees, and may be included as a steering device and/or as a steering layer. Referencing FIG. 37, an illustrative performance example 3700 for the steering assembly 3500 is schematically depicted.

Referencing FIG. 38, an example steering assembly 3800 is depicted, which includes additional aspects relative to steering assembly 3500. In the example of FIG. 38, the accuracy of the steering angle can be controlled even more precisely than in the example of FIG. 35. In the example of FIG. 38, an F-theta lens system 3802 is provided, including an ATL 3806 that replaces the emitting optics of the F-theta lens system 3802. In the example of FIG. 38, a reversed anastigmat lens system 3804 is provided, including an ATL 3808 that replaces the emitting optics of the reversed anastigmat lens system 3804. In certain embodiments, another component of each of the systems 3802, 3804 may instead be replaced with an ATL. The ATLs 3806, 3808 allows for fine tuning of the overall focal length of the anastigmat lens system 3804 without blurring the wavefront of the steered EM beam.

An example steering device includes a high precision steering layer, such as an ATL configured with lenslets, allowing for combined high magnitude and high precision steering. Example lenslets may be prepared as a circular cut from any type of lens, and/or a directly formed lens equivalent to a cut lens. The lens that the lenslet is cut from may be called the "parent lens" or a reference lens 902 (e.g., reference FIG. 9). The reference lens may be a singlet lens, a doublet lens, a triplet lens, or the like. Accordingly, the lenslet has at least two surfaces, each of which may be Plano, concave, or convex. In certain embodiments, the lenslet may also have diffractive surfaces instead of refractive surfaces. The power of the reference lens defines the power of the lenslet, which is a circular cut from the parent lens and/or an equivalent shape. A positive lenslet is based on a positive reference lens, a negative lenslet is based on a negative reference lens, and a zero power lenslet is based on a zero-power meniscus reference lens.

An example beam steering device includes a high precision steering layer as an effective alternative to Risley prisms with improved optical quality, reduced mass, no beam displacement at the center of the steering range, and capability to support a broadband EM beam. In certain embodiments, in a light beam steerer system using lenslets, one or more lenslets rotate around their centerline to steer the light to a desired angle with the desired optical quality. In certain embodiments, depending on the application, that steering system may also have some fixed optical surfaces before, after, or between the rotating lenslets.

In certain embodiments, it should be noted that in the fabrication process of a lenslet, it is not necessary to fabricate a reference lens first and then cut the lenslet from it. In certain embodiments, a lenslet is fabricated directly, and the description herein of the reference lens is utilized for formulation and performance modeling of the lenslet, and to illustrate aspects of the present disclosure.

The first surface of the lenslet, for example the first surface impinged by an EM beam to be steered, is called the "entrance surface." In certain embodiments, the entrance surface can be Plano, tilted Plano, concave or convex. In certain embodiments, when steering to a wide-angle with a high optical quality required for an application, the entrance surface may be considered as tilted Plano followed by one or more curved surfaces.

Referencing FIGS. 39A to 39F, a number of example configurations for a lenslet are schematically depicted. The examples of FIGS. 39A to 39D have two surfaces. The example of FIG. 39D includes four surfaces, and the examples of FIGS. 39E to 39F have three surfaces. The example of FIG. 39A includes a concave surface 3902 for each of the two surfaces. The example of FIG. 39B includes two convex surfaces 3904. The example of FIG. 39C includes a Plano surface 3906 and a concave surface 3902. The example of FIG. 39D includes a Plano surface 3906 and a convex surface 3904. It can be seen that the examples of FIGS. 39A and 39C will have a negative optical power, and the examples of FIGS. 39B and 39D will have a positive optical power. All of the lenslet examples from FIG. 39A to FIG. 39D are formed from a singlet lens, and accordingly are formed from a single material.

Referencing FIG. 39E, the lenslet includes three surfaces, including a concave surface 3902 and a convex surface 3904 for the entrance and/or exit surfaces, and an intermediate Plano surface 3906. The example of FIG. 39E may be formed from a doublet lens, and may include two different types of materials. Referencing FIG. 39F, the lenslet includes three surfaces, including a tilted Plano surface 3908 and a Plano surface 3906 for the entrance and/or exit surfaces, and an intermediate concave surface 3902. The example of FIG. 39F may be formed from a doublet lens, and may include two different types of materials. referencing FIG. 39G, the lenslet includes four surfaces, including a tilted Plano surface 3908 and a convex surface 3904 for the entrance and/or exit surfaces, and intermediate surfaces including a concave surface 3904 and a Plano surface 3906. The example of FIG. 39F may be formed from a triplet lens, and may include three different types of materials. It can be seen that the optical power of the examples in FIGS. 39E and 39G is configurable, and can be adjusted to zero power if desired. It can be seen that the optical power of the example in FIG. 39F will be negative.

Figures 40A, 40B, 40C, 40D, 40E, 41, 42:
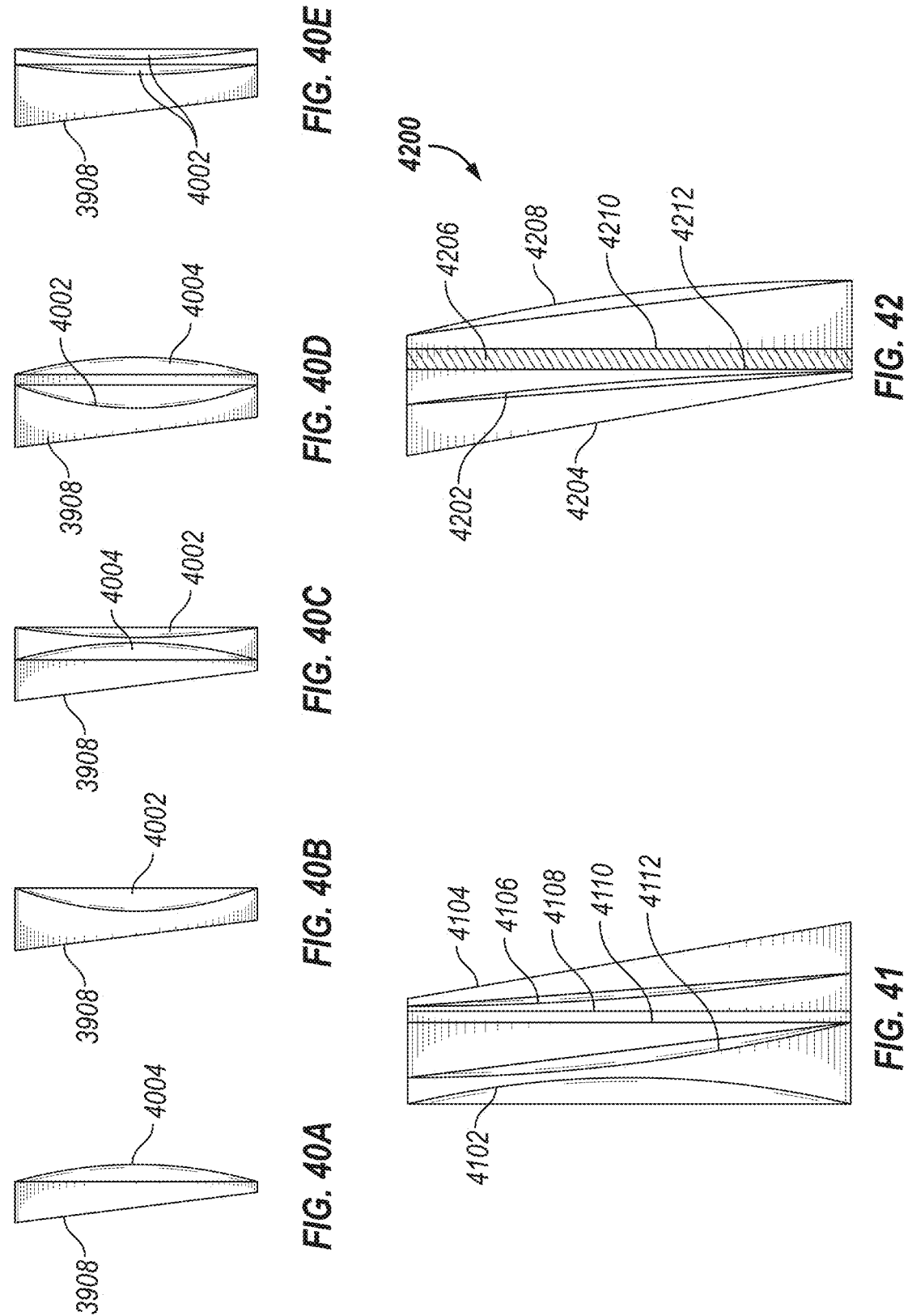
FIGS. 40A to 40E depict a number of configuration options for an ATL.
FIG. 41 depicts an illustrative ATL.
FIG. 42 depicts an illustrative ATL.

It should be noted that, in certain embodiments, the asymmetry of a lenslet with respect to its centerline makes it usable for beam steering. Therefore, in certain embodiments, if the entrance surface of a lenslet is tilted Plano, the other surface(s) can be symmetric with respect to the centerline like full curvatures instead of a cut portion of a curvature from a reference lens. Referencing FIGS. 40A to 40E, example lenslets with a tilted Plano entrance surface (or exit surface) are depicted, with the lenslet including a fully formed surface on the other side. In the example of FIG. 40A, the lenslet includes the tilted Plano surface 3908 on one side, and an opposing full convex surface 4004. In the example of FIG. 40B, the lenslet includes the tilted Plano surface 3908 on one side, and an opposing full concave surface 4002 on the other side. In the example of FIG. 40C, the lenslet includes the tilted Plano surface 3908 on one side, and an opposing full concave surface 4002 on the other side. The example of FIG. 40C further includes an intermediate full convex surface 4004. In the example of FIG. 40D, the lenslet includes the tilted Plano surface 3908 on one side, and an opposing full convex surface 4004 on the other side. The example of FIG. 40D further includes an intermediate full concave surface 4002. In the example of FIG. 40E, the lenslet includes the tilted Plano surface 3908 on one side, and a full concave surface 4002 on the other side. The example of FIG. 40E further includes an intermediate full concave surface 4002.

In certain embodiments, as in FIGS. 40A to 40E, the entrance surface of those five lenslet examples is tilted Plano, and the other surfaces are full convex and full concave curvatures (full lenses). In certain embodiments, those fully curved refractive surfaces can also be diffractive. The full curved surface(s) do not affect deflection angle, but they impose optical power and may improve optical quality. For example, the lenslets in FIGS. 40A and 40D have positive optical power, FIGS. 40B and 40C have negative optical power, and FIG. 40E can have selectable power, including zero power. All the full curved surfaces in FIGS. 40A to 40E can be utilized to improve the optical quality. Using more than two optical surfaces makes it possible to use more than one type of material, for example to support broadband light and to efficiently mitigate optical aberrations.

Generally, in certain embodiments, depending on the application, the desired angle, and required optical quality, the lenslet may be formed using any or all of the surface types set forth in relation to FIGS. 39A to 40E. In certain embodiments, a lenslet can be formed utilizing lens cuts, full curvature surfaces, and/or Plano and/or tilted Plano surfaces. It can be seen that if a lenslet has only two surfaces, with one surface being a tilted Plano surface and the other surface being a Plano surface, with just one optically inactive material, that lenslet is reduced to a Risley prism.

Referencing FIG. 41, an example lenslet is depicted, including six surfaces, including a full concave surface 4102 and a tilted Plano surface 4104 as the entrance and/or exit surfaces. The example of FIG. 41 includes a number of intermediate surfaces, for example a concave cut surface 4106, a Plano surface 4108, another Plano surface 4110, and a convex cut surface 4112. The example of FIG. 41 includes a lenslet that may be formed from a number of materials, for example to support broadband EM steering applications, with a number of surfaces to configure the steering capabilities and/or optical performance.

In certain embodiments, an ATL can be cemented, or can have air space between its elements. An ATL has the ability to change the optical thickness and/or distance (nxL) between the bounding lenses (or lenslets) by applying a voltage to an intervening EO crystal. If there is no air space between the ATL elements, the whole distance will be filled by EO crystal. Therefore, in certain embodiments, there is no fixed material (air) between the element, and the whole optical thickness can be changed significantly by applying a voltage. By contrast, if only 50% of the distance between the bounding lenses is occupied by EO crystal, and the rest is filled by fixed materials, such as glass or air, applying voltage will change only 50% of the thickness, and thus, the change in focal length will be reduced per unit of voltage applied. In addition, having air space between the ATL's elements provides two additional optical surfaces to optimize and mitigate optical aberrations, and therefore may lead to a better optical quality. As such, the focal length of the cemented ATL can be changed more per applied voltage, but the optical quality of an air-spaced ATL may be preferable to a cemented one.

Referencing FIG. 42, an example ATL 4200 is formed from lenslets. The ATL 4200 formed from lenslets is equivalent to a circular cut of an ATL formed from reference lenses, and accordingly the reference lens for an ATL 4200 formed from lenslets would also be an ATL. The example ATL 4200 includes an intermediate optically active layer 4206 that can be utilized to modulate the focal length between the lenslets. The example ATL 4200 includes a tilted Plano surface 4204 and a convex cut surface 4208 as the entrance and/or exit surfaces, an intermediate concave cut surface 4202, and intermediate Plano surfaces 4210, 4212. In certain embodiments, any ATL set forth herein may have tilted Plano surfaces, Plano surfaces, full curvature curved surfaces (full lens), cut curvature (lenslet) surfaces, or combinations of these. Example ATLs can have different materials between each two adjacent surfaces, but should have at least one type of EO material positioned between two lens elements, which may include an EO material coupled to transparent electrodes between two adjacent Plano surfaces to adjust the index of the EO material and accordingly the effective optical distance between the lens elements.

Referencing FIG. 43, an example depiction of a resulting prism operating curve 4302 implemented from operating a modulo $2\pi n$ phased array is schematically depicted. The phased array steering system of FIG. 43 may be an example thin steering device. The reset diagram 4304 depicts the voltage progression across the array, with resets to a baseline voltage at the $2\pi$ voltage—which may be performed at any multiple of $2\pi$, subject to the limits of the maximum voltage to be utilized in the particular system. The baseline voltage may be a zero voltage, a ground voltage, and/or any selected voltage such as a negative voltage corresponding to $-\pi$ (e.g., as a half-wave voltage profile). The voltage can be adjusted to change the wedge angle of the prism operating curve 4302. The resets will still occur at one wavelength and/or multiples thereof. The example of FIG. 43 would steer an EM beam to an angle of $\theta$ where $\theta = \sin^{-1}\lambda/\Lambda$, where $\Lambda$ is the reset length. In certain embodiments, the wedge angle may be referenced as an "unfolded prism," or the equivalent prism after the $2\pi$ resets are removed.

A challenge experienced by previously known phased array steering systems is that, when the desired deflection angle is very high, the process of fabricating thousands of electrodes and applying and controlling the voltages on those tiny electrodes becomes very difficult and expensive. In addition, when the deflection angle is high, the fringing field issue becomes more important and diffraction efficiency decreases. Changing the reset allows for fewer electrodes in one reset, increasing the quantization issue for such embodiments. Furthermore, if the reset length is adjusted, several middle voltages should also be applied on the middle electrodes. Middle voltages may be between $0.5V_\lambda$ and $-0.5V_\lambda$. In contrast, when the reset is fixed, only two voltages (e.g., $0.5V_\lambda$ and $-0.5V_\lambda$) will be enough, for example by utilizing resistive electrodes to linearize the voltage between adjacent applied voltages.

An example embodiment improves the capability of a phased array steering system by utilizing two or more phased arrays configured to each provide a fixed prism (e.g., the unfolded prism such as depicted in FIG. 43), where the fixed prisms are configured to be rotated. Such embodiments may be provided as a thin beam steering layer and/or a lenslet steering layer (e.g., conceptually, the rotating lenslets and the rotating phased arrays operate in a similar manner, and for many embodiments of the present disclosure may be substituted for a given steering device and/or steering layer). Referencing FIG. 44, two phased arrays 4402, 4404 are coupled to a rotating actuator, and can be utilized to steer an EM beam. The example phased arrays 4402, 4404 deflect the light to an angle of $\sin^{-1} m\lambda/\Lambda$, where m is the number of phased arrays in the system (e.g., two in the example of FIG. 44). The embodiment of FIG. 44 does not require changes to the reset (e.g., where the wedge angle is held constant), quantization is reduced (e.g., including with the utilization of resistive electrodes on the phased arrays), and no middle voltages are required. The utilization of two or more rotating phased arrays 4402, 4404 allows for steering the light to an angle $\theta$, where each individual array is capable to steer the light to an angle $\theta/m$. The phased arrays 4402, 4404 may be aligned (e.g., as depicted in FIG. 44) or offset.

In certain embodiments, a beam steering device and/or steering layer utilizing rotating phased arrays have the following benefits compared previously known systems, such as utilizing rotating diffraction gratings:

1—By rotating phased arrays, it is possible to finely and precisely steer the beam.

2—With rotating phased arrays, it is possible to change the prism angle very quickly by adjusting only one voltage. There is no need to change the reset. Therefore, if this system is used at the receiver side of a bistatic lidar, it can delay the receiver so that the receiver can do the back scan very quickly.

As mentioned, a rotating phased array can offer precise scanning, as well as back scanning. Those features are also exhibited by an ATL 4200 using lenslets. In certain embodiments, utilization of rotating phased arrays, as compared an ATL 4200 using lenslets, include:

1—ATLs utilize an EO crystals requiring significant voltage (e.g., 100s of volts) to operate, whereas the rotating phased array is based on EO films that can be controlled in the tens of volts range.

2—At least two ATL lenslets are required to rotate together, while only one rotating phased array may be sufficiently functional.

3—ATLs with lenslets are heavier and take up more space than rotating phased arrays.

However, in certain embodiments, the benefits of an ATL 4200 with lenslets, compared to rotating phased arrays, include:

1—The optical quality of an ATL 4200 with lenslets is significantly better than for rotating phased arrays, including imaging optical quality.

2—An ATL 4200 with lenslets utilizes only two electrodes, a simpler structure, and can be built in any size, but the phased arrays are small and expensive to make.

3—An ATL 4200 with lenslets can be constructed for broadband applications, but phased arrays work for very limited light frequency ranges, such as monochromatic lights.

4—An ATL 4200 with lenslets is based refraction, but rotating phased arrays have multiple diffractive elements, challenging the steering efficiency for the rotating phased arrays.

5—An ATL 4200 with lenslets can be configured with optical power (e.g., magnification), but rotating phased arrays do not apply optical power to the steered beam.

At long steering distances, for example in beam steering operations from space, the limitations of the speed of light can have a significant effect on steering operations. For example, steering at an elevation of thousands of miles from the earth, it takes time for the transmitted light to hit the ground and come back to the receiver. In most bistatic systems, the transmitter and receiver are moving together by the same motor, and they are both pointed at the same angle $\theta$, at the same time. Because the speed of the light finite, if the elevation is very high, when the transmitter sends the light at $\theta$, the receiver receives the reflection associated with the angle of $(\theta-\varepsilon)$, where $\varepsilon>0$.

An example embodiment using at ATL can address the speed of light issue for beam steering operations. In certain embodiments, the $\varepsilon$ is sufficiently close to zero that any delay can be ignored. For example, if the elevation is not very high, such as typically within atmosphere systems, the receiver can be successfully operated without a delay. For distant applications, such as space applications, a considerable delay to the receiver may be required to successfully perform steering operations for EM beam emission and target scanning. The delay herein is described in terms of the receiver, but the delay may be applicable to either side of an emission/receive operation, for example the delay is applied to the receiver where the system emits to the target location and then receives from the target location. However, the delay could be applied to the emitter, for example where the system receives from the target location and then emits to the target location (e.g., certain communication operations). The following embodiments are applicable to applying an appropriate delay to either side of such operations.

To address the speed of light issue, a mechanical delay could be provided for the mover of the receiver. It can be done by using a separated motor for the receiver or using gears to impose a delay on the receiver. The first solution imposes the synchronization complication, and the latter will cause more obstruction to the receiver. Furthermore, if the lidar system changes its elevation, the mechanical gear solution will either be useless or include complicated adjustable elements to conform to the new delay. Additionally, the response time for a mechanical system will be limited, for example which may be unable to adjust to transient distance changes. Further, additional mechanical systems introduce additional potential failure points relative to electronic systems.

One solution to the aforementioned problem is to use an electro-optical (EO) bulk crystal in the structure of the beam pointer at the receiver side (e.g., guiding the received light from the steering layers back to the EM source, which is the receiver in the example). By applying an appropriate voltage for that elevation, the receiver will be pointed to a slightly different angle while it is still rotating by the same motor, which is rotating the transmitter at the same time. Referencing FIG. 45, an example solution includes a bulk crystal 4502 configured with electrodes to apply a voltage across the crystal 4502, where the crystal is optically interposed between the steering optics (e.g., steering layers of a beam steering device) and the receiver (e.g., an optical array, which may be included in a system at the position of the EM source).

In the example of FIG. 45, the wedge 4502 made of the EO crystal is covered by two uniform transparent electrodes at both sides in which the voltage is applied. The applied voltage will impose a nonuniform electric field (E=V/y tan φ) in the EO wedge, and will change its index linearly through the diameter of the wedge:

$$(Dn(V) = -0.5n^3 r_{ij} V/y \tan \varphi)$$

Therefore, the deflection angle will be:

$$\Theta = (n(V) - 1)\varphi$$

Where the φ is the angle of the EO wedge 4502 and the n (V) is the index of the EO wedge 4502, which is a function of the applied voltage. The applied voltage is defined by the elevation of the satellite, and/or otherwise determined according to the delay determined by the distance to the target location, the speed of the beam steering system, and/or the speed of the target location. For example, if the elevation is low, no voltage will be applied. If the elevation is high, a high voltage will be applied to manipulate the pointing angle and delay the receiver of the satellite such that the transmitted EM beam and the received EM radiation from the target location are both directed to the same location (or an intended distinct location, such as an offset distance).

Although the EO wedge 4502 is a simple and effective solution for the speed of the light issue in the receiver of satellites, it is not always cost-effective and/or feasible. For example, a large aperture system, and/or a system with a high wedge angle, may require an EO wedge 4502 that is large, and therefore heavy, expensive, and requiring a very high voltage (e.g., >10 kV) to implement a sufficient delay.

In certain embodiments, an ATL assembly, and/or an ATL with lenslets can be used to implement a sufficient delay to address the speed of light issue for a broad range of applications. For example, an ATL 4200 with lenslets, such as depicted in FIG. 42, can be utilized to create a high precision steering layer, which may be positioned on the receiver side to implement a sufficient delay. Referencing FIG. 30, an example arrangement is depicted, where each ATL 3002, 3004 may be rotated, and/or lenslet associated with each ATL 3102, 3104 may be rotated (e.g., reference FIG. 31), to provide capability to guide the received light from the target location to the receiver. In certain embodiments, minor delay modulations can be managed using focal length modulation, which can be performed entirely with electronics. In certain embodiments, mechanical rotation of elements (e.g., each ATL, and/or lenslets thereof) may be performed on a slower time constant, for example at initial setup, periodically to adjust to long term changes (e.g., elevation change, wear or degradation of parts or capability, etc.), and/or utilized more frequently with the focal length modulation utilized to trim and perform steering feedback operations.

Referencing FIG. 30, a pair of ATLs with lenslets 3002, 3004 can be used at the receiver side of the lidar in satellites. In certain embodiments, the pointing angle at any Δx supplied by the mechanical mover can be manipulated just by applying the appropriate voltage associated with the elevation of the satellite, for example using a lookup table or stored function of elevation versus applied voltage. The angle of adjustment follows:

$$\Delta \tan(\theta) = \Delta \left( \frac{x}{f} \right) = \frac{\Delta x}{f} - x \frac{\Delta f}{f^2} = -x \frac{\Delta f}{f^2}$$

If the elevation is low, no voltage is required to apply on the ATL lenslets (e.g., no adjustment to the focal length). If the elevation is changed, a steering controller applies the correct voltage on the ATLs 3002, 3004 to implement an appropriate delay on the receiver. The ATL based delay solution to manage the speed of light issue provides a number of advantages over the wedge solution of FIG. 45. For example, the thickness of the EO layer in an ATL is small, and no high voltage is necessary to apply the delay. Further, a significant portion, or all, of the adjustments can be made electronically, with optional mechanical portions utilized only at setup or on a slower time constant operation.

In certain embodiments, if a linear EO crystal is used in an ATL with lenslets, the change in the optical path does not even depend on the thickness of the crystal $$\left( L\Delta n = -0.5 L r_{ij} n_0^3 E = -\frac{0.5 r_{ij} n_0^3 L V}{L} = -0.5 r_{ij} n_0^3 V \right).$$

Therefore, in certain embodiments, the thickness of the EO crystal can be very small, limited only by mechanical strength limitations, or the damage threshold for the material of the applied electric field. Accordingly, embodiments using ATLs with lenslets can work with relatively smaller voltages. Furthermore, focal length modulation using an ATL is based on the EO effect, and can accordingly have a response in the gigahertz (GHz) range.

In certain embodiments, the ATLs can have a negative optical power (for the receiver side) and/or a positive optical power (for the emitter side). Therefore, unlike the EO wedge solution of FIG. 45, an ATL based solution does not require that the ATL be as large as the aperture.

Embodiments set forth in FIGS. 46-65 and the related descriptions include a number of beam steering devices, or steering layers, that use a rotating actuator to move a lens through the optical path of a beam steering system, allowing for rapid steering through a selected target location—for example to raster a scan through a region. The examples of FIGS. 46-65 may be included with any systems, beam steering devices, or the like, of the present disclosure, including inclusion of such embodiments as a steering layer in combination with other steering layers, EM source, optics (e.g., divergence management, a field lens, a magnifying lens, an emission lens, etc.). A steering layer according to the embodiments of FIGS. 46-65, or based on such embodiments as disclosed herein, may be referenced as a rotating steering layer. The example embodiments perform steering operations using a de-centered lens principal, for example as described in relation to various embodiments herein, and/or in the '253 application incorporated preceding.

Figure 46:
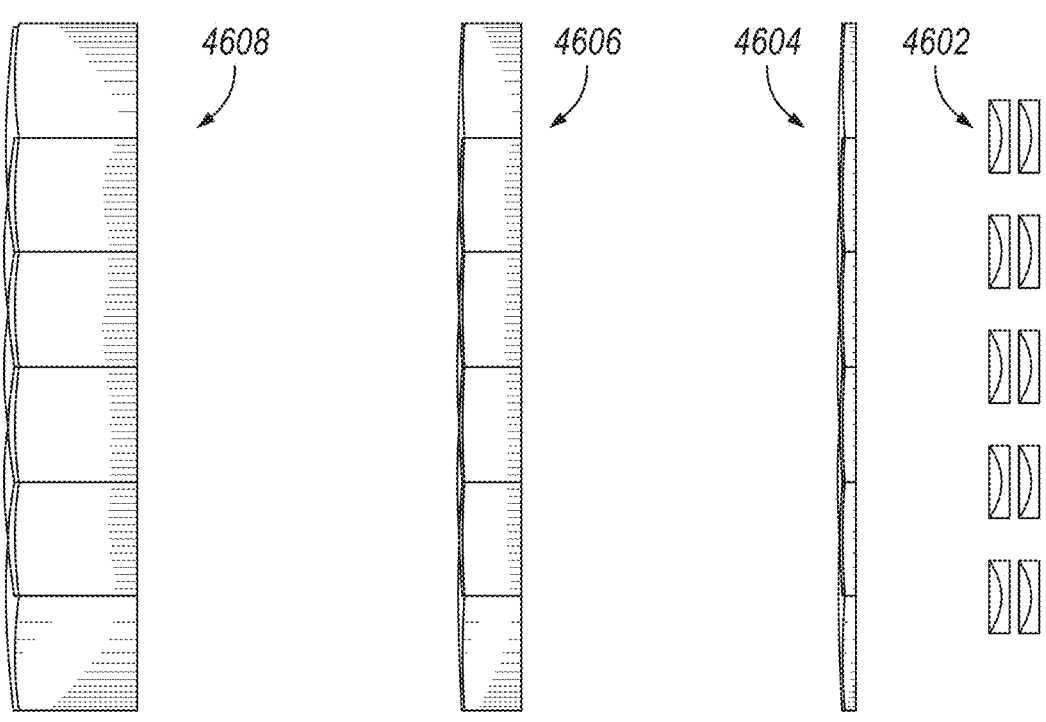
FIG. 46 is a schematic depiction of a rotating steering layer.
Figure 47:
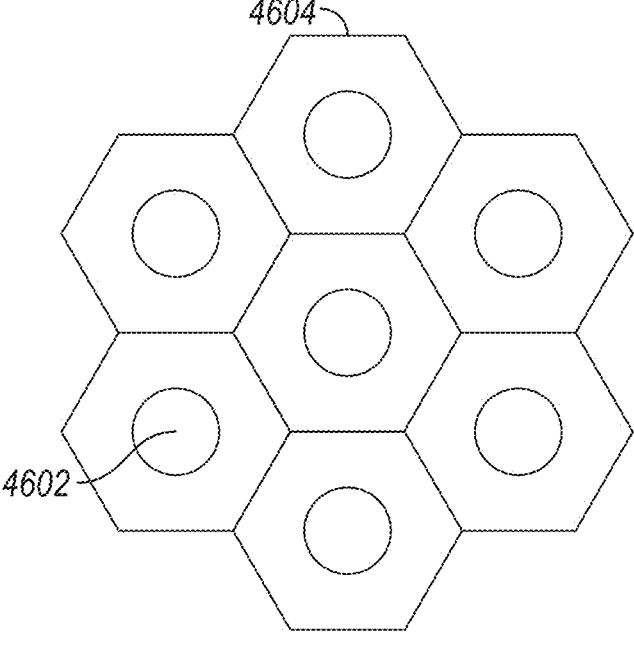
FIG. 47 is a schematic depiction of a rotating steering layer.
Figure 48:
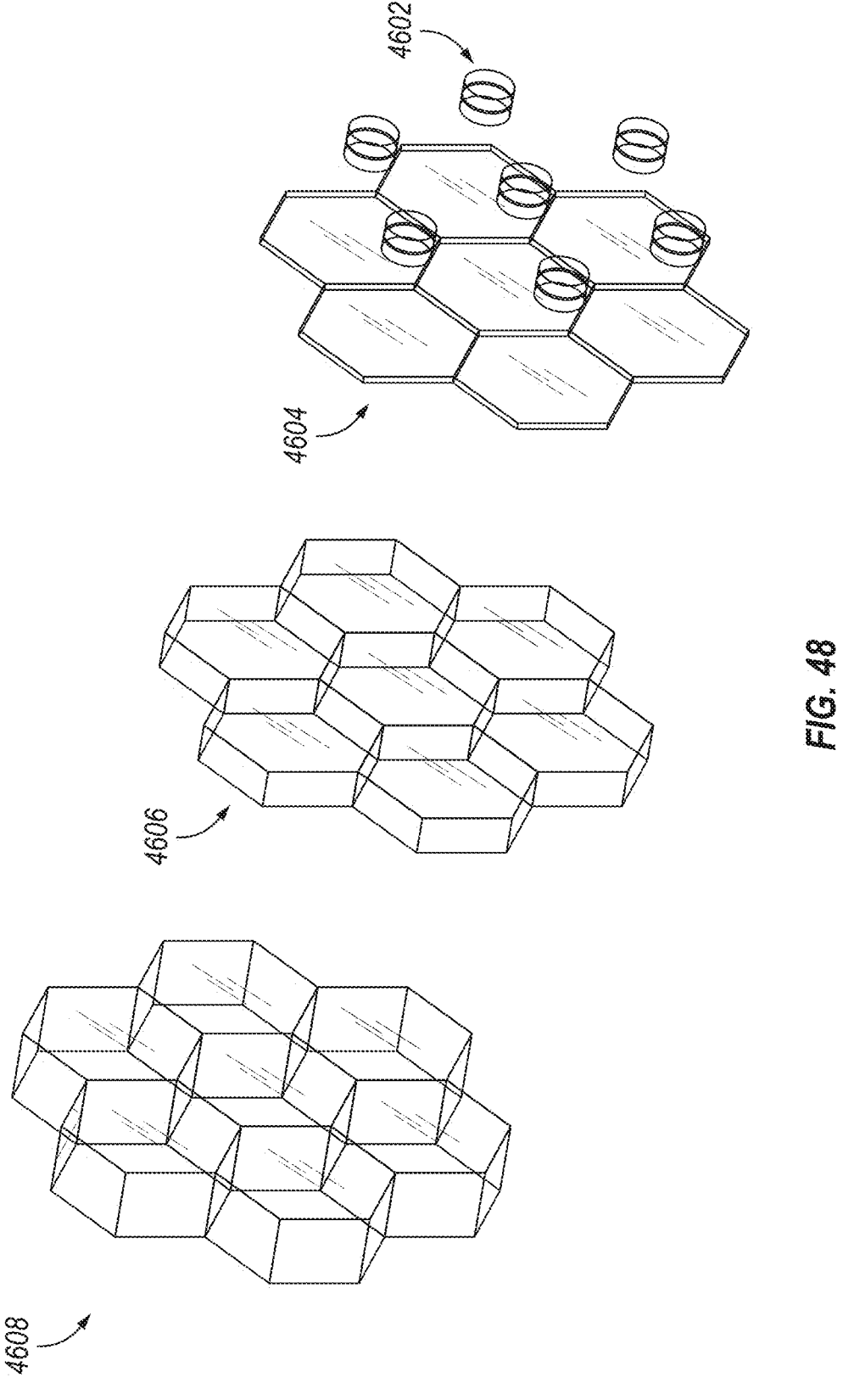
FIG. 48 is a schematic depiction of a rotating steering layer.

Referencing FIG. 46, a seven aperture array of a mechanical beam steering device is schematically depicted in a side view. The example array is capable to steer seven beams simultaneously, for example as set forth in the '253 application. The example array, progressing from right to left in FIG. 46, includes a number of steering lens pairs 4602 that perform steering operations, a number of magnifying lenses 4604, each corresponding to one of the beam paths, a number of field lenses 4606, each corresponding to one of the beam paths, and a number of emission lenses 4608, each corresponding to one of the beam paths. The example of FIG. 46 is a non-limiting example to provide a context for examples herein, but any arrangement for a de-centered beam steering device, and/or for a multiple beam steering device, is contemplated herein.

Embodiments of the rotating steering layer herein are applicable to a single beam steering path, or a multi-path embodiment such as that depicted in FIG. 46. In certain embodiments, one or more optical elements of the paths may be shared, for example an embodiment may utilize a common field lens 4904 and/or common emission lens 4902 (e.g., reference FIG. 49). The steering in the embodiment of FIG. 46 is performed by moving the steering lens pairs 4602, resulting in a mechanical steering operation for the corresponding beam path. Referencing FIG. 47, the example seven aperture array is depicted in a schematic view. Referencing FIG. 48, the example seven aperture array is depicted in an end view, from the end corresponding to the steering lens pairs 4602.

Figure 49:
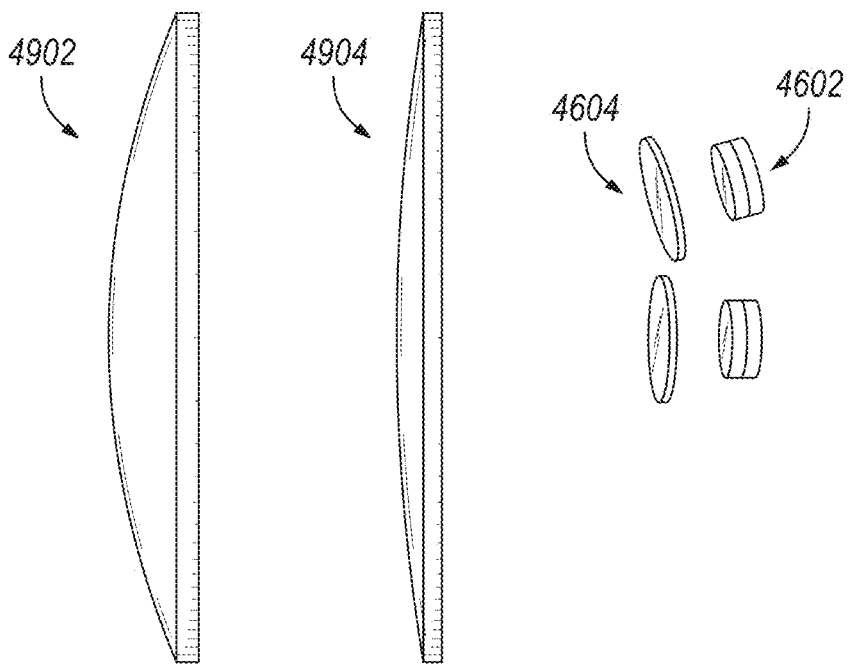
FIG. 49 is a schematic depiction of a rotating steering layer.
Figure 50:
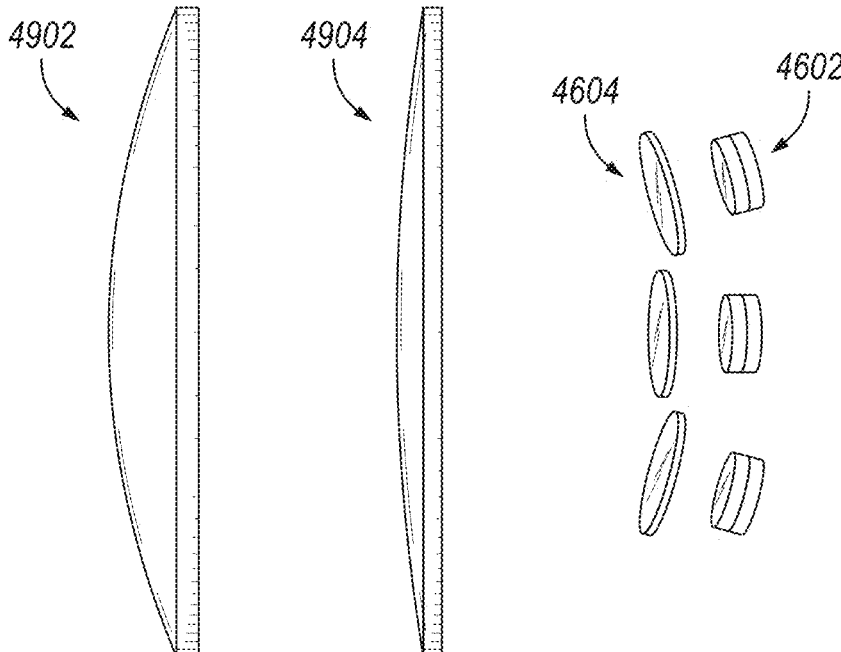
FIG. 50 is a schematic depiction of a rotating steering layer.

Further to the example of FIG. 49, it can be seen that one steering path may be positioned along the optical axis of the steering device, for example the lower lens pair 4602 in the example of FIG. 49. The other steering paths will be off-axis paths. In certain embodiments, depending upon the arrangement of the steering paths, there may be no on-axis path. For example, an arrangement may prioritize having all paths similarly positioned (e.g., all paths 2° off-axis, rather than a single path on-axis, with other paths off-axis), and/or an arrangement may prioritize having a lowest off-axis differential overall, limiting a maximum off-axis amount for any path, or the like, that may lead to arrangements that do not have an on-axis steering path. Other considerations for arranging a multiple path steering device are set forth in the '253 application. Referencing FIG. 50, an example steering device, consistent with the arrangement of FIG. 49 but depicting seven steering paths, is schematically depicted in a side view. Referencing FIG. 51, an example steering device, consistent with the arrangement of FIG. 50, is schematically depicted in a perspective view.

Figure 52:
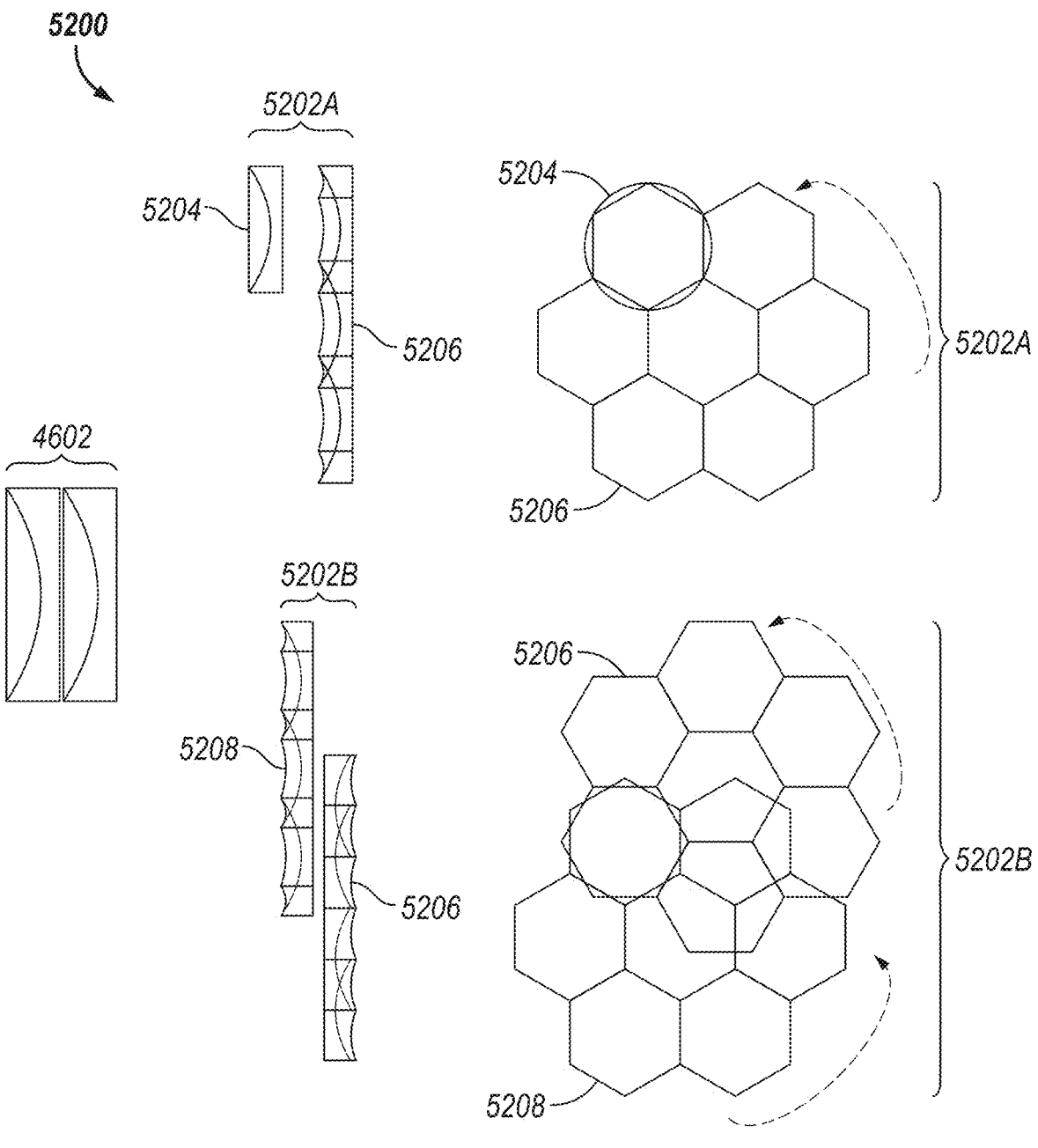
FIG. 52 is a schematic depiction of a rotating steering layer.

Referencing FIG. 52, an example rotating steering device 5200 is schematically depicted. The example embodiments depicted in FIG. 52 replace the steering lenses of a de-centered steering layer or device. The examples of FIG. 52 are capable to steer an EM beam in two dimensions (or axes), and accordingly include two moveable lens elements. In certain embodiments, steering capability may be provided for only one dimension (or axis), and/or steering capability of the rotating steering layer 5200 is provided for one steering dimension, with other steering layers of a beam steering device providing steering capability for other dimensions. The example of FIG. 52 includes a baseline embodiment having steering lenses 4602 that are independently moveable, and consistent with embodiments depicted in FIGS. 46-51.

The example of FIG. 52 depicts a first single lens wheel 5202A embodiment in both a side view and an end view, where one of the steering lenses is replaced with a spinning wheel 5206 having one or more lenses thereon, which pass through the optical path over a selected portion of the wheel rotation. It can be seen that, when the spinning wheel 5206 positions a given lens within the optical path, steering operations may be performed. The single lens wheel 5202A embodiment utilizes a single moving lens 5204 to steer in a second dimension. In certain embodiments, the wheel 5206 is spun rapidly, where the EM source (and/or receiving optics) is controlled, for example by a steering controller, to emit the EM beam during the time window when a steering lens is properly positioned for steering of the EM beam. In certain embodiments, multiple lenses are positioned on the wheel 5206, allowing for multiple scanning/steering operations per rotation of the wheel. For example, with a wheel 5206 having six lenses positioned thereon, and with the wheel 5206 spinning at 1,000 RPM, the scanner would have scanning opportunities through the entire steering range at up to 100 Hz. In certain embodiments, the scanning speed can much higher, including speeds over 1 kHz, depending upon the speed capability of the wheel and the number of lenses positioned thereon. In certain embodiments, the device 5200 can be configured to rapidly scan across an entire range, for example with the EM source emitting the EM beam as the lens moves through the entire range to be scanned. In the example of FIG. 52, beam steering is performed during the operating regions where the lens 5204 and one of the lenses on the wheel 5202A are both present in the optical path. In certain embodiments, the wheel 5202A is moved to a controlled position, for example utilizing a stepper motor or other actuator capable to rotate the wheel 5202A to a selected position. In certain embodiments, the single lens wheel 5202A is useful where a significant time difference capability in each dimension is present (e.g., horizontal scanning should be fast, but vertical scanning can be slower), a significant operational difference between steering dimensions (e.g., one dimension is rastering through a range, and the other dimension is being steered to selected arbitrary positions), and/or where system constraints only allow for a single wheel and/or single moving lens.

The example of FIG. 52 depicts a double lens wheel 5202B embodiment in both a side view and an end view, where both of the steering lenses are replaced with spinning wheels 5206, 5208. The wheels 5206, 5208 are positioned such that a lens from each wheel passes through the optical path for steering, moving along a selected axis, and with a coordinated position with a lens from the other wheel. In the example of FIG. 52, the wheels 5206, 5208 are arranged such that the lenses from each wheel are moving approximately perpendicularly to each other, subject to the constraints of the circular motion of the wheels, the extent of the relevant steering range (e.g., the corresponding arc of the travel motion of the wheel), and the like. Purely perpendicular motion maximizes the available steering window, but other arrangements are sufficient for many steering applications. The utilization of two wheels allows for rapid rastering motion in both dimensions. In certain embodiments, one or both wheels 5206, 5208 may be spun rapidly, and/or controlled to discrete positions, with the EM source (and/or receiver) emitting (and/or detecting) at appropriate wheel positions corresponding to the desired steering positions. In certain embodiments, the wheels 5206, 5208 may be coupled, for example with a gear, timing chain, timing belt, active feedback based controls, or the like, such that the wheels can be moved with a single actuator, and/or to enforce certain relationships between lens positions of each wheel.

Without limitation to any other aspect of the present disclosure, an example embodiment includes two coextensive wheels, for example with a second wheel 5206 that is coextensive (relative to the optical path) with the first wheel 5206. In certain embodiments, utilization of more than one coextensive wheel provides for additional options (e.g., different lens sets, etc.), where steering operations can be performed through an inactive wheel, for example with the wheel positioned such that the optical path to be steered goes through a transparent portion of the wheel, through a gap in the wheel, and/or through a lens center on the wheel (e.g., where the centered lens does not steer the EM beam, but may be present, for example, to configure the light such as applying a selected convergence or divergence to the light). In certain embodiments, utilization of more than one coextensive wheel allows for rapid steering in opposing directions, for example with a lens from a first wheel providing left-to-right steering, and a lens from a second coextensive wheel providing right-to-left steering. In certain embodiment, the two coextensive wheels may be counter-rotating, for example with a first wheel rotating clockwise and a second wheel rotating counter-clockwise. It can be seen that multiple coextensive wheels may be provided in certain embodiments, which may further include a mix of wheel rotational directions (e.g., providing rapid scanning in both directions, with different lens sets available for each direction). In certain embodiments, the coextensive wheels may be coupled, for example with a gear, timing chain, timing belt, active feedback based controls, or the like, such that the wheels can be moved with a single actuator, and/or to enforce certain relationships between lens positions of each wheel.

Figure 53:
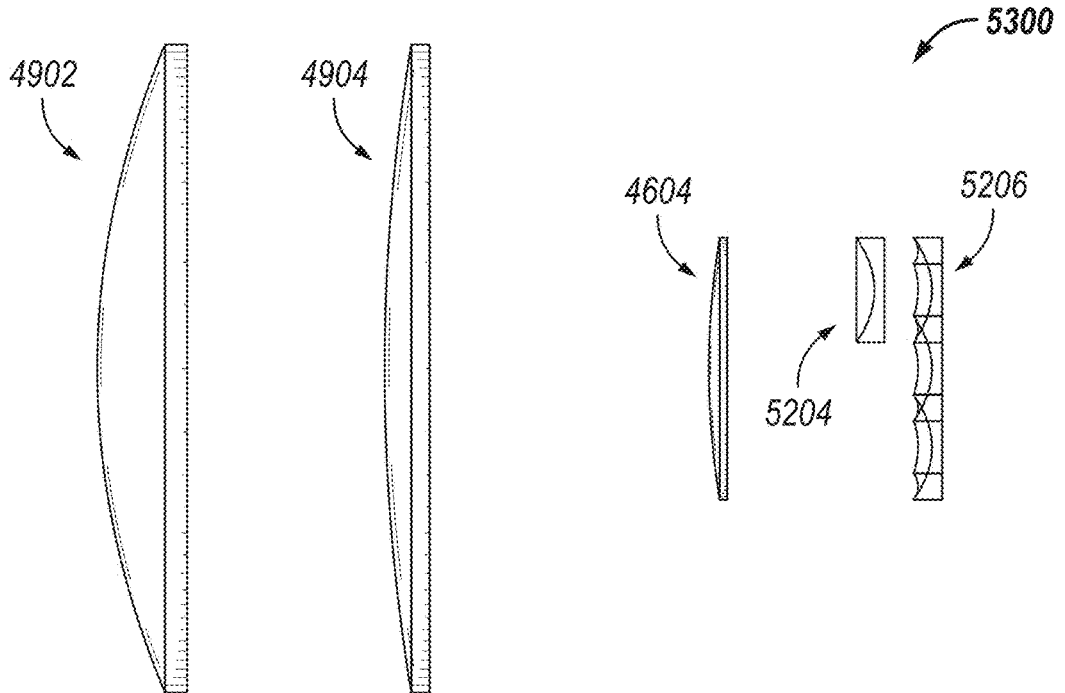
FIG. 53 is a schematic depiction of a rotating steering layer.
Figure 55:
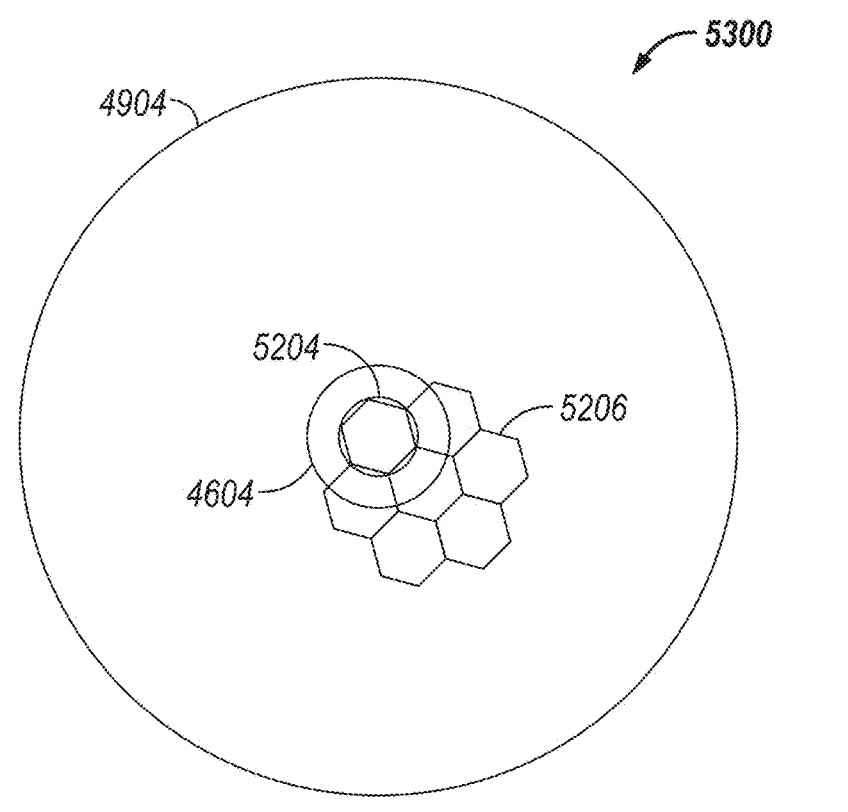
FIG. 55 is a schematic depiction of a rotating steering layer.
Figure 54:
FIG. 54 is a schematic depiction of a rotating steering layer.

Referencing FIG. 53, an example single path scanner 5300 with a rotating wheel replacing one of the moveable lenses is schematically depicted in a side view. The example scanner 5300 may be included in any embodiments herein, may be provided as a steering device, and/or may be provided, in whole or part, as a steering layer (e.g., a rotating steering layer) in any systems, scanners, and/or devices herein. The example scanner 5300 includes the magnifying lens 4604, field lens 4904, and emission lens 4902 (e.g., reference FIGS. 46 and 49). The example scanner 5300 includes a first moving lens 4604, for example moving with a linear actuator, piezo electric actuator, or the like. The example scanner 5300 further includes a spinning wheel 5206 having a lens (or lenses) positioned thereon, which is coordinated (e.g., by a steering controller) to perform steering operations for an EM source or receiver. The example scanner 5300 is capable to provide steering in two dimensions. Referencing FIG. 54, an example single path scanner 5300, consistent with the embodiment of FIG. 53, is schematically depicted in a perspective view. Referencing FIG. 55, an example single path scanner 5300, consistent with the embodiment of FIG. 53, is schematically depicted in an end view, from the end corresponding to the spinning wheel 5206.

Figure 56:
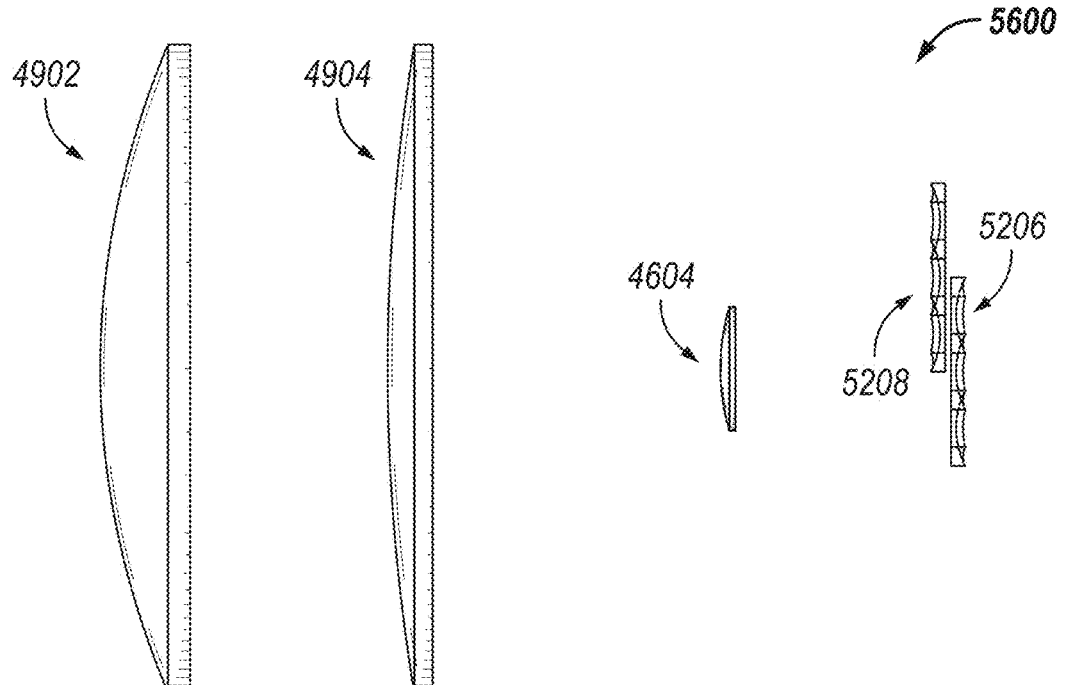
FIG. 56 is a schematic depiction of a rotating steering layer.
Figure 57:
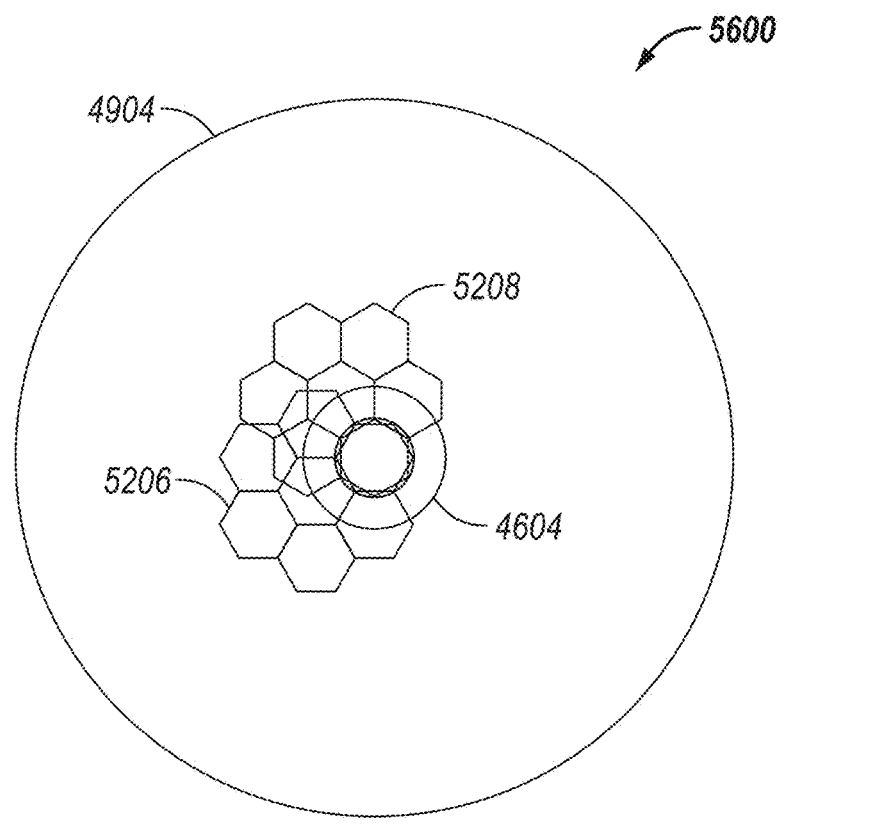
FIG. 57 is a schematic depiction of a rotating steering layer.

Referencing FIG. 56, an example single path scanner 5600 with two rotating wheels replacing the moveable lenses is schematically depicted in a side view. The example scanner 5600 may be included in any embodiments herein, may be provided as a steering device, and/or may be provided, in whole or part, as a steering layer (e.g., a rotating steering layer) in any systems, scanners, and/or devices herein. The example scanner 5600 includes the magnifying lens 4604, field lens 4904, and emission lens 4902 (e.g., reference FIGS. 46 and 49). The example scanner 5600 includes a first spinning wheel 5206 that provides steering in a first dimension, and a second spinning wheel 5208 that provides steering for the second dimension. The example scanner 5600 is capable to provide steering in two dimensions. Referencing FIG. 57, an example single path scanner 5600, consistent with the embodiment of FIG. 56, is schematically depicted in an end view, from the end corresponding to the spinning wheel 5206.

Figure 58:
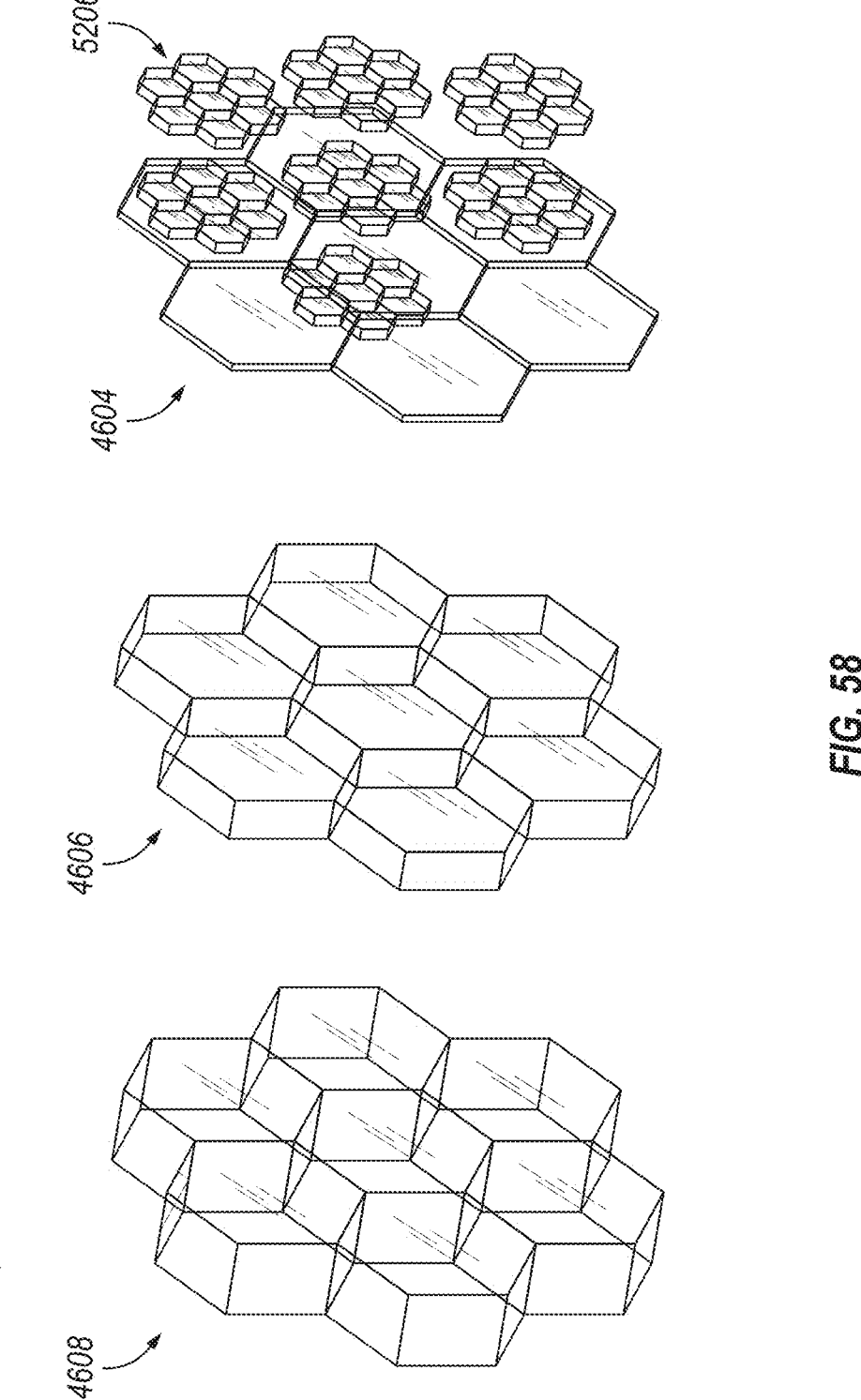
FIG. 58 is a schematic depiction of a rotating steering layer.

Referencing FIG. 58, an example multi-path scanner 5800 with a rotating wheel 5206 replacing the moveable lens is schematically depicted in a perspective view. The example of FIG. 58 provides steering in a single dimension, with a rotating wheel 5206 provided for each of the seven depicted steering paths. In certain embodiments, one or more of the paths may be steered with a spinning wheel 5206, and other paths steered with a moving lens, steered in other steering layers of a beam steering device including the scanner 5800 as a steering layer therein, and/or may be unsteered. The example of FIG. 58 includes a dedicated magnifying lens 4604, field lens 4606, and emission lens 4608 for each steered path. In certain embodiments, more than one, or all, of the steered paths may share or omit one or more of the magnifying lens, field lens, and/or emission lens. The example scanner 5800 may be included in any embodiments herein, may be provided as a steering device, and/or may be provided, in whole or part, as a steering layer (e.g., a rotating steering layer) in any systems, scanners, and/or devices herein.

Figure 59:
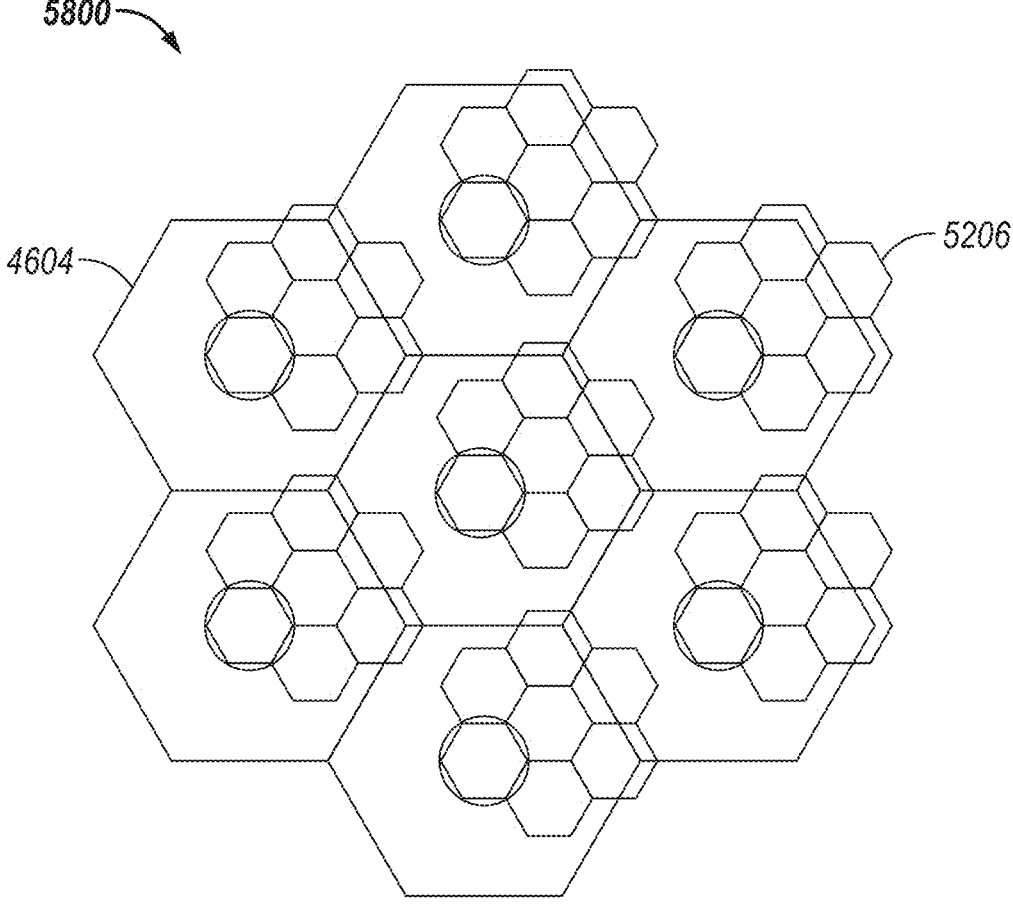
FIG. 59 is a schematic depiction of a rotating steering layer.
Figure 60:
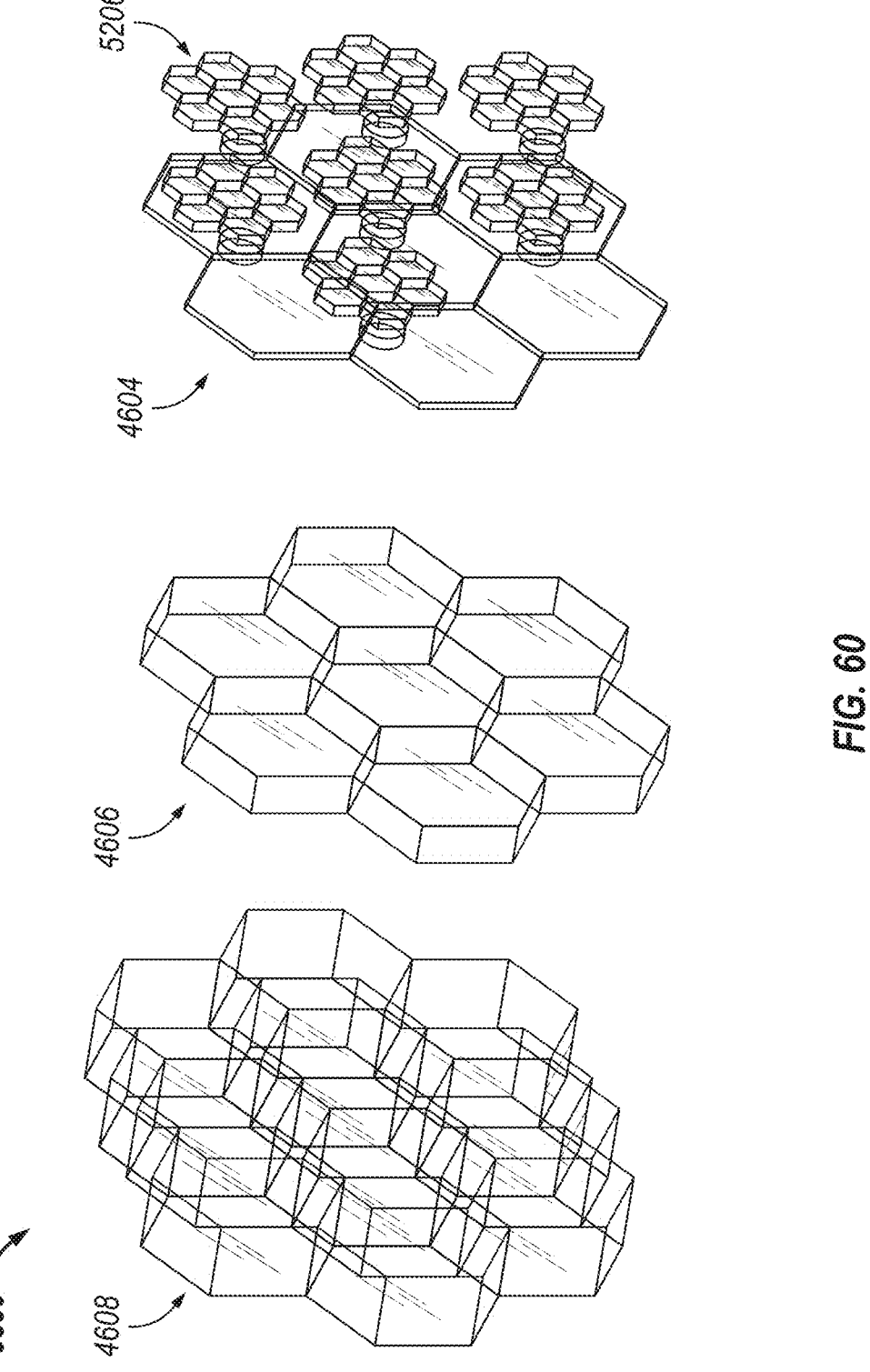
FIG. 60 is a schematic depiction of a rotating steering layer.

Referencing FIG. 59, an example multi-path scanner 5800, consistent with the embodiment of FIG. 58, is schematically depicted in an end view, from the end corresponding to the spinning wheel 5206. Referencing FIG. 60, an example multi-path scanner 5800, consistent with the embodiment of FIG. 58, is schematically depicted in another perspective view.

Figure 61:
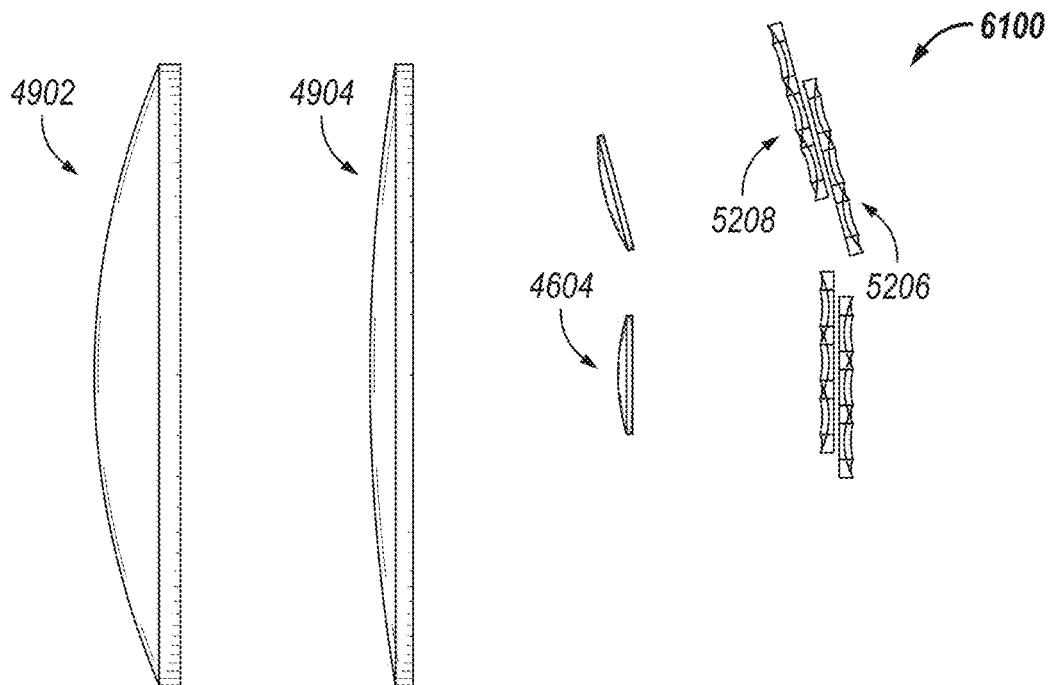
FIG. 61 is a schematic depiction of a rotating steering layer.
Figure 62:
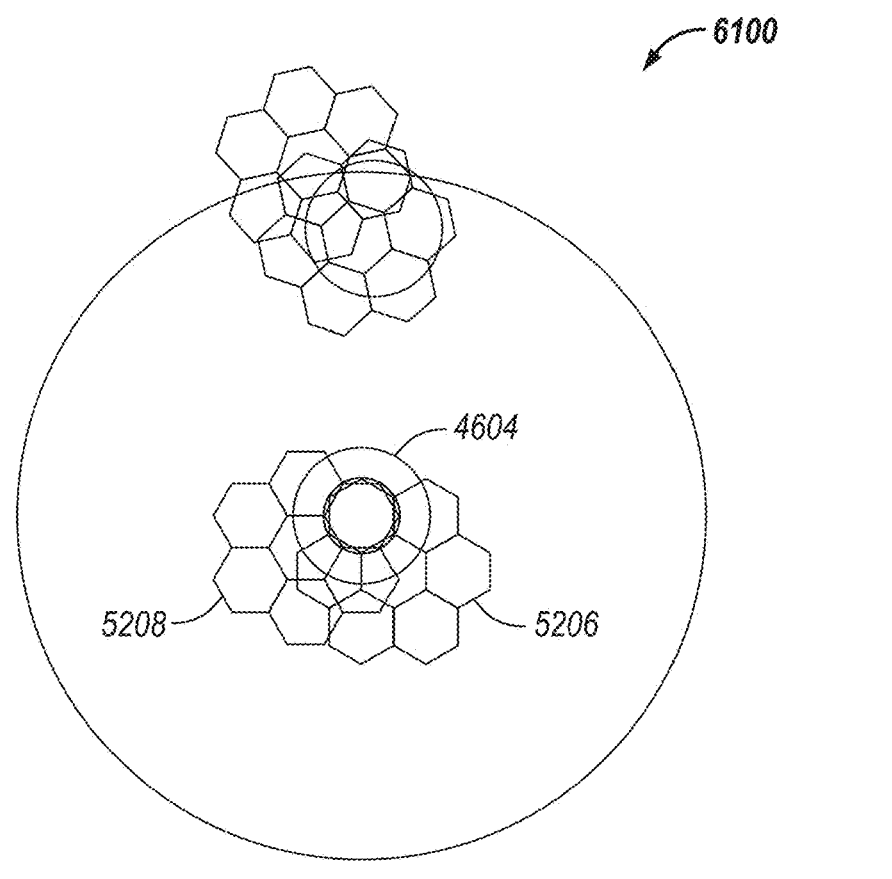
FIG. 62 is a schematic depiction of a rotating steering layer.

Referencing FIG. 61, an example multi-path scanner 6100 with rotating wheels 5206, 5208 replacing the moveable lenses is schematically depicted in a side view. The example of FIG. 61 provides steering in two dimensions, with a first rotating wheel 5206 providing steering in a first dimension, and a second rotating wheel 5208 providing steering in the second dimension. In certain embodiments, the wheels 5206, 5208 may be coextensive along the optical path, where the wheels 5206, 5208 provide alternate capabilities, back-up capabilities or redundancy, scanning in opposing directions, or the like. In certain embodiments, one or more of the paths may be steered with wheels 5206, 5208, with a single wheel 5206, and/or without wheels (e.g., using moving lenses, omitting steering in one or more directions, and/or with steering implemented in a different layer from the scanner 6100). The example of FIG. 61 includes a dedicated magnifying lens 4604 for each steered path. In certain embodiments, more than one, or all, of the steered paths may share or omit the magnifying lens. The example of FIG. 61 includes a common field lens 4904 and emission lens 4902. Referencing FIG. 62, an example multi-path scanner 6100, consistent with the embodiment of FIG. 61, is schematically depicted in an end view, from the end corresponding to the spinning wheel 5206.

Figure 63:
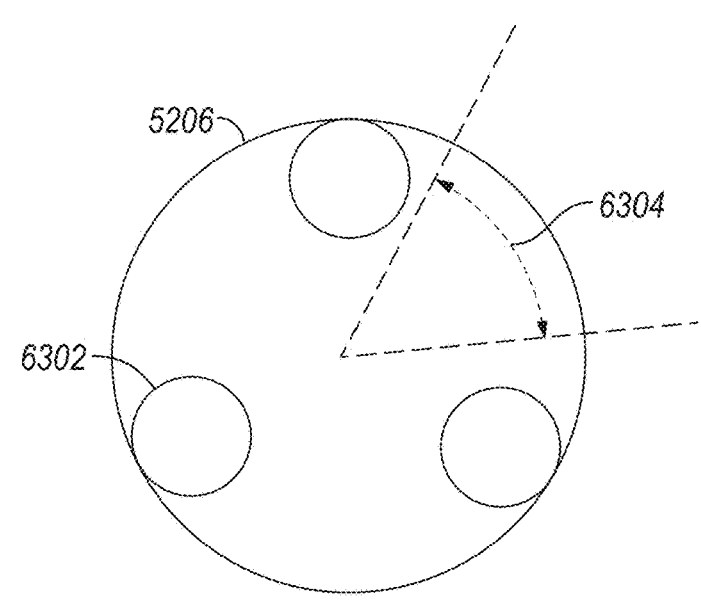
FIG. 63 is a schematic depiction of a lens wheel.

Referencing FIG. 63, an example wheel 5206 is schematically depicted. The example wheel may be utilized in any embodiments herein, for example as a part of a rotating steering layer, as a wheel 5206, 5208, or the like. The example of FIG. 63 is a non-limiting example to illustrate certain aspects of the present disclosure. For example, embodiments herein may utilize a different number and/or arrangement of lenses on a wheel. The example wheel 5206 includes a number of lenses 6302 thereon, that sequentially pass through a target steering area 6304 as the wheel 5206 rotates. It can be seen that, through the target steering area 6304, the lens movement is approximately linear. The example of FIG. 63 is not to scale, and the size of the wheel 5206, the arc distance of the target steering area 6304, and/or the positions of the lenses 6302, will all factor into the actual linearity of the lens movement through the target steering area. For a large wheel and a small target steering area, the lens movement can be treated as linear. In certain embodiments, a steering controller accounts for the curvature of the movement, for example by determining the actual lens position during steering operations, by compensating for the curvature (e.g., adjusting imaging or received data), and/or by adjusting another steering axis (e.g., on another wheel, with the moving lens, and/or with another steering layer present in the device, such as with a high precision steering layer which has high response speed and high resolution to make rapid, small corrections.

Figure 64:
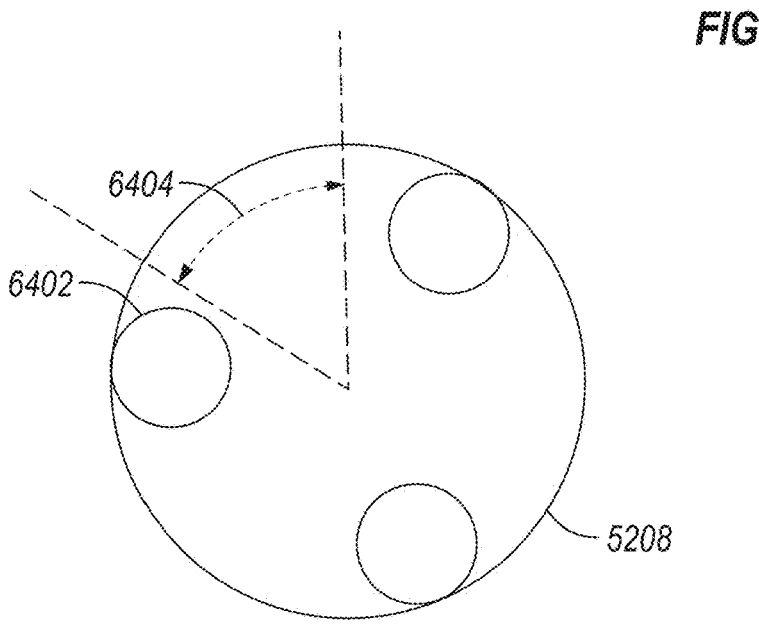
FIG. 64 is a schematic depiction of a lens wheel.

Referencing FIG. 64, an example wheel 5208 is schematically depicted. The example of FIG. 64 is also not to scale, but the orientation of the wheels 5206, 5208 is coordinated to illustrate certain aspects of the present disclosure. The example wheel 5208 includes a number of lenses 6402 positioned therein, and a target steering area 6404 where steering operations, for example by a steering controller, are performed as one or more (or each) of the lenses 6402 pass through the target steering area 6404. If the steering area 6404 is overlaid on the steering area 6304, it will be seen that the two wheels 5206, 5208 can cooperate to provide full steering in two dimensions for a beam steering device. In the ideal case, the steering areas 6304, 6404 would be straight and perpendicular, providing for full capability steering for an entire rectangular region defined by the extent of the steering areas 6304, 6404. The example of FIGS. 63 and 64 can provide full capability steering in a selected range, for example by sizing the steering areas 6304, 6404 to fully encompass the selected range accounting for the actual curvature of the lens steering paths and any offset from perpendicularity for the steering areas 6304, 6404.

Figure 65:
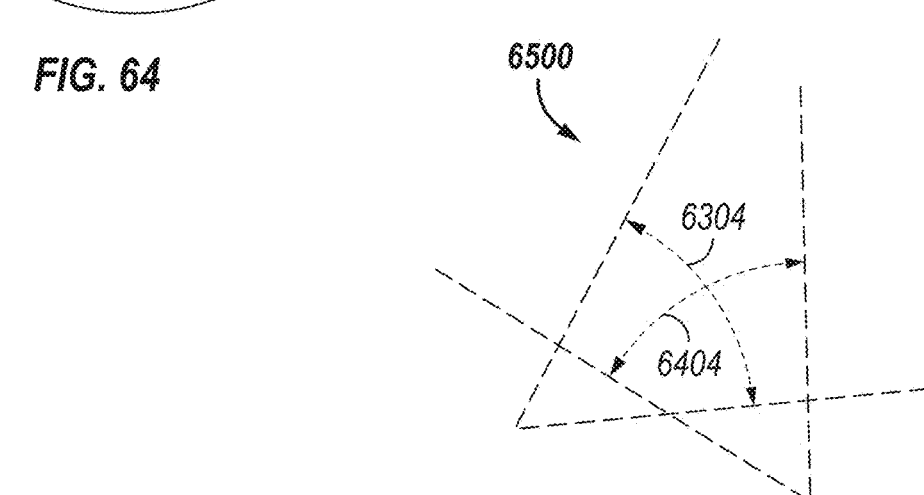
FIG. 65 depicts illustrative steering axes for a rotating steering layer.

Referencing FIG. 65, an example illustration 6500 of steering area overlap is schematically depicted. The example of FIG. 65 is consistent with the example wheels 5206, 5208 depicted in FIGS. 64 and 65. In the example of FIG. 65, steering capability for any arbitrary region can be provided by adjusting the size, angles, and/or curvature of the steering areas 6304, 6404. The theoretical steering range will be limited to the corresponding shape, roughly a rhombus around the steering areas 6304, 6404 in the example of FIG. 65, but the actual steering range may be limited by the mutual relationships available between the lenses of the wheels 5206, 5208—for example if both wheels are spinning simultaneously, then only portions of the theoretical range may be available. If one, or both, of the wheels 5206, 5208 are moveable by direct position control, then the entire theoretical steering range would be available. Additionally, a beam steering device may operate a rotating steering layer, for example utilizing wheels 5206, 5208, in different operating modes at different times, for example rapidly spinning a wheel 5206 (or both wheels 5208) at one time, and providing selected position control at another time.

An example system, including a first steering layer interposed between an electromagnetic (EM) source and an emission lens, the first steering layer including a steering lens; a second steering layer interposed between the EM source and the emission lens, the second steering layer including at least one steering lens operationally coupled to a rotating actuator, wherein the steering lens of the first steering layer and the at least one steering lens of the second steering layer include a combined first effective focal length; the emission lens including a positive lens having a second focal length; wherein the first effective focal length is shorter than the second focal length; a first steering actuator coupled to the steering lens of the first steering layer, and configured to move the steering lens of the first steering layer along a first movement course; and the rotating actuator coupled to the at least one steering lens of the second steering layer, and configured to move the at least one steering lens of the second steering layer along a second circular movement course. Example systems are depicted, without limitation, in FIGS. 46, 49, 50, 53, 58, and 61.

Certain further aspects of the example system are described following, any one or more of which may be present in certain embodiments. The first movement course includes a linear movement course. The second steering layer further includes a plurality of steering lenses, the plurality of steering lenses including the at least one steering lens. The plurality of steering lenses includes between three (3) and twelve (12) lenses. The first movement course corresponds to a first steering axis, and wherein a steering segment of the second circular movement course corresponds to a second steering axis. The system further including a controller, including a steering request circuit structured to interpret a steering request value; a steering configuration circuit structured to determine a steering response value in response to the steering request value; and a steering implementation circuit structured to provide at least one steering command in response to the steering response value; and wherein at least one of the rotating actuator or the first steering actuator are responsive to the at least one steering command, thereby performing a steering operation of an EM beam from the EM source.

The system further including a controller, for example a steering controller such as that depicted in FIG. 14, including a steering request circuit structured to interpret a steering request value and an actuator position value for at least one of the rotating actuator or the first steering actuator. In certain embodiments, the actuator position value may be determined from a position/steering relationship 1410. In certain embodiments, the actuator position value may be a position feedback 1412, for example provided by an encoder, smart actuator, or the like associated with the rotating actuator. The example controller includes a steering configuration circuit structured to determine a steering configuration value in response to the steering request value and the actuator position value, where the steering configuration value includes target values for control of the steering device, such as voltages, lens positions, lenslet positions, target actuator positions, or the like. The example controller further includes a steering implementation circuit structured to provide an EM beam command (e.g., as a steering command 1414) in response to the steering configuration value, where the EM source is responsive to the EM beam command to provide an EM beam, thereby performing a steering operation of the EM beam from the EM source. Example steering commands 1414 include voltage commands, position commands, rotational speed commands, and/or emitting/receiving commands (e.g., to time EM source emissions and/or EM receiving capture operations, for example timed with the position of steering elements in the beam steering device).

The system further including wherein the at least one steering lens operationally coupled to a rotating actuator includes a first lens group assembly; wherein the second steering layer further includes a second lens group assembly, the second lens group assembly including at least one steering lens operationally coupled to a second rotating actuator; and wherein an EM beam from the EM source is selectively steered using the first lens group assembly or the second lens group assembly. An example rotating actuator and the second rotating actuator are configured to counter-rotate, for example in embodiments where the first lens group assembly and the second lens group assembly comprise co-extensive wheels (e.g., reference the description related to FIG. 61).

An example system, including an initiating optics layer interposed between an electromagnetic (EM) source and a lenslet steering layer; the lenslet steering layer including a first positive lens element and a second negative lens element, the lenslet steering layer interposed between the initiating optics layer and a concluding optics layer. Example systems are depicted, without limitation, in FIGS. 4-8. The example system includes; a steering controller (e.g., reference FIG. 14) configured to steer an EM beam from the EM source by controlling a first relative rotation between the first positive lens element (e.g., a lenslet) and the second negative lens element (e.g., a lenslet), and further by controlling a second absolute rotation of the lenslet steering layer; and a rotating actuator responsive to rotation commands from the steering controller. In certain embodiments, the relative rotation of lenslets adjusts the steering magnitude, for example the angular distance between the optical axis and the steered beam, while the absolute rotation of the lenslets (e.g., common rotation of the elements with a fixed angular distance) adjusts the azimuthal position of the steered beam. In certain embodiments, the lenslets may be controlled or adjusted separately, for example using separate lookup tables for each lenslet will still result in applying the selected steering operation. In certain embodiments, the lenslets may be controller or adjusted together, for example to control a trajectory of the steered beam during a transition from one steering position to another.

Certain further aspects of the example system are described following, any one or more of which may be present in certain embodiments. The concluding optics layer includes a field lens and an emission lens. The steering controller further includes a steering target circuit structured to interpret a steering request value; a steering control circuit structured to determine the first relative rotation and the second absolute rotation in response to the steering request value; and a steering implementation circuit structured to provide a steering command in response to the first relative rotation and the second absolute rotation, wherein the steering command includes the rotation commands. In certain embodiments, a rotating actuator (or actuators) are responsive to the steering command to move the lenslets and thereby implement steering operations. In certain embodiments, other actuators such as a voltage controller may be responsive to the steering command to provide steering operations. The first positive lens element and the second negative lens element each include a same optical power magnitude, and an opposite optical power sign. Each of the first positive lens element and the second negative lens element includes a de-centered portion of a corresponding reference lens. Each corresponding reference lens includes at least one of a spherical lens; a cylindrical lens; or a Fresnel lens. In certain embodiments, at least one of the first positive lens element or the second negative lens element includes a varifocal lens (VFL).

An example system, including a first steering layer interposed between an electromagnetic (EM) source and an emission lens, the first steering layer including a triplet lens including a stacked structure including, in order a Plano-convex lens; and a first transparent electrode on the Plano-convex lens; an electro-optical (EO) crystal having the first transparent electrode on a first side thereof; a second transparent electrode on a second side of the EO crystal, opposite to the first side of the EO crystal; and a Plano-concave lens on the second transparent electrode; the EM source configured to provide an EM beam incident upon the first steering layer; and the emission lens configured to emit a steered EM beam to a target location. Example systems are depicted in FIGS. 29-34, and 41-42, and the related descriptions. The example stacked structure may utilize any lens curvature scheme, and/or any lenslet curvature scheme, as set forth throughout the present disclosure, including Plano portions, convex portions, concave portions, tilted Plano portions, and/or curved portions comprising a complete surface or a lens cut (e.g., lenslet) portion.

Certain further aspects of the example system are described following, any one or more of which may be present in certain embodiments. The EO crystal is configured to have a voltage applied across the EO crystal to change a refraction index of the EO crystal. The applying the voltage changes an optical distance between the Plano-convex lens and the Plano-concave lens. An absolute radius of curvature of the Plano-convex lens and the Plano-concave lens are equal. The triplet lens is a spherical or a cylindrical lens. The triplet lens has a net positive or net negative power. Each of the Plano-convex lens and the Plano-concave lens further includes a respective circular cut curvature surface. The system further including a second steering layer interposed between the EM source and the emission lens, wherein the second steering layer includes a bulk steering layer. The bulk steering layer includes a fishtail booster. The second steering layer is interposed between the first steering layer and the emission lens. The system further including a second steering layer interposed between the EM source and the emission lens, wherein the second steering layer includes a thin steering layer. The thin steering layer includes a half-wave voltage profile thin steering layer. The thin steering layer includes a resistive high-side electrode thin steering layer. The thin steering layer is interposed between the first steering layer and the emission lens. The system further including a second steering layer interposed between the EM source and the emission lens, wherein the second steering layer includes a lenslet steering layer. The lenslet steering layer is interposed between the first steering layer and the emission lens. The system further including a second steering layer interposed between the EM source and the emission lens, wherein the second steering layer includes a de-centered lens steering layer. The de-centered lens steering layer is interposed between the first steering layer and the emission lens. The system further including a second steering layer interposed between the EM source and the emission lens, wherein the second steering layer includes a rotating steering layer. The rotating steering layer includes two counter-rotating lens group assemblies. The rotating steering layer is interposed between the first steering layer and the emission lens.

A number of example procedures of the present disclosure are described following. The example procedures, or any portion thereof, may be implemented, without limitation, using any circuit, controller, steering device, steering layer, and/or steering component as set forth throughout the present disclosure. Operations of the example procedures may be re-ordered and/or combined, in whole or part, including with operations of other procedures.

An example procedure includes an operation to interpret a steering request value (e.g., a selected steering angle, a target location description, and/or a general request such as a parameter indicating that scanning should commence), and an operation to determine a steering response value (e.g., steering parameters to achieve and/or progress acceptably toward a steering target), and an operation to provide steering command(s) in response to the steering response value. Example and non-limiting steering commands include voltage commands, actuator position commands, and/or actuator operating commands such as a rotational speed value.

An example procedure includes an operation to interpret a steering request value and an actuator position value for a rotating actuator and/or a first steering actuator. The actuator position value may be a feedback value, for example a value representing a current position of an actuator. The example procedure includes an operation to determine a steering configuration value in response to the steering request value and the actuator position value, for example where the steering configuration value sets forth actuator positions, steering layer configurations, lens positions, etc., at which an EM beam should be emitted (or received), and/or a configuration that should be achieved to provide the targeted steering operations. In certain embodiments, multiple steering assemblies may be provided (e.g., with more than one coextensive wheel, and/or with multiple steering layers available to perform steering operations), where the steering configuration value and/or the steering command(s) include selecting which available steering assembly will perform the steering operations.

An example procedure includes an operation to interpret a steering request value, and an operation to control steering operations in response to the steering request value, for example by adjusting a first relative rotation between lenslets, and a second relative rotation of the lenslets together (e.g., of an entire lenslet layer). In certain embodiments, steering operations are performed by providing rotation commands (e.g., to an actuator or actuators coupled to the lenslets). In certain embodiments, for example where a lenslet layer includes an ATL with lenslets, steering operations may additionally or alternatively be performed by providing a voltage command to modulate a focal length between the lenslets or another focal length within the lenslet layer.

In certain embodiments, for example with combined steering layers, arbitrary steering to any location within the scanner steering capability can be achieved with proper configuration of the steering capability between layers. For example, if the magnitude capability of a high precision steering layer (e.g., +/−2° steering capability) is at least as large as a resolution capability of another steering layer (e.g., a rotating steering layer, thin steering layer, bulk steering layer, and/or a lenslet steering layer, which may include steering magnitude capability that can exceed +/−60° steering), then the embodiment can utilize the full magnitude capability of both steering layers, with full capability to utilize the precision of the high precision steering layer. In another example, a discrete steering layer is provided, for example as set forth in the '710 application (e.g., using a polar birefringence grating, and/or a volume hologram), which may be combined with other steering layers. In the example, if the other steering layers have a steering magnitude capability that exceeds the step size of the discrete steering layer (e.g., discrete steering layer is capable to steer to −10°, 0°, or +10°, then another steering layer having a steering magnitude capability of greater than +/−5° would exceed the step size), then the scanner can achieve any steering angle within the steering range.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112 (f). In particular, any use of "step of" in the claims is not intended to invoke the provision of 35 U.S.C. § 112 (f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A system, comprising:
a first steering layer interposed between an electromagnetic (EM) source and an emission lens, the first steering layer comprising a steering lens;
a second steering layer interposed between the EM source and the emission lens, the second steering layer comprising at least one steering lens operationally coupled to a rotating actuator, the steering lens of the first steering layer and the at least one steering lens of the second steering layer have a combined first effective focal length;
the emission lens comprising a positive lens having a second focal length, the first effective focal length being shorter than the second focal length;
a first steering actuator coupled to the steering lens of the first steering layer, and configured to move the steering lens of the first steering layer along a first movement course; and
the rotating actuator coupled to the at least one steering lens of the second steering layer, and configured to move the at least one steering lens of the second steering layer along a second circular movement course.

2. The system of claim 1, wherein the first movement course comprises a linear movement course.

3. The system of claim 1, wherein the second steering layer further comprises a plurality of steering lenses, the plurality of steering lenses including the at least one steering lens.

4. The system of claim 3, wherein the plurality of steering lenses comprises three (3) to twelve (12) lenses.

5. The system of claim 1, wherein;
the first movement course corresponds to a first steering axis; and
a steering segment of the second circular movement course corresponds to a second steering axis.

6. The system of claim 1, further comprising:

a controller, comprising:

a steering request circuit structured to interpret a steering request value;

a steering configuration circuit structured to determine a steering response value in response to the steering request value; and a steering implementation circuit structured to provide at least one steering command in response to the steering response value, wherein at least one of the rotating actuator or the first steering actuator is responsive to the at least one steering command, thereby performing a steering operation of an EM beam from the EM source.

7. The system of claim 1, further comprising:

a controller, comprising:

a steering request circuit structured to interpret a steering request value and an actuator position value for at least one of the rotating actuator or the first steering actuator;

a steering configuration circuit structured to determine a steering configuration value in response to the steering request value and the actuator position value; and a steering implementation circuit structured to provide an EM beam command in response to the steering configuration value; and wherein the EM source is responsive to the EM beam command to provide an EM beam, thereby performing a steering operation of the EM beam from the EM source.

8. The system of claim 1, wherein:

the at least one steering lens operationally coupled to a rotating actuator comprises a first lens group assembly;

the second steering layer further comprises a second lens group assembly, the second lens group assembly comprising at least one steering lens operationally coupled to a second rotating actuator; and an EM beam from the EM source is selectively steered using the first lens group assembly or the second lens group assembly.

9. The system of claim 8, the rotating actuator and the second rotating actuator are configured to counter-rotate.

10. A method, comprising:

moving a steering lens of a first steering layer along a first movement course, the first steering layer being interposed between an electromagnetic (EM) source and an emission lens, a first steering actuator being coupled to the steering lens of the first steering layer; and moving at least one steering lens of a second steering layer along a second circular movement course, the second steering layer being interposed between the EM source and the emission lens, the at least one steering lens being operationally coupled to a rotating actuator, wherein the steering lens of the first steering layer and the at least one steering lens of the second steering layer have a combined first effective focal length, the emission lens comprises a positive lens having a second focal length, wherein the first effective focal length is shorter than the second focal length, and wherein the rotating actuator is coupled to the at least one steering lens of the second steering layer.

11. The method of claim 10, the first movement course comprises a linear movement course.

12. The method of claim 10, wherein:

the second steering layer further comprises a plurality of steering lenses; and the plurality of steering lenses comprises the at least one steering lens.

13. The method of claim 12, the plurality of steering lenses comprises three (3) to twelve (12) lenses.

14. The method of claim 10, wherein:

the first movement course corresponds to a first steering axis; and a steering segment of the second circular movement course corresponds to a second steering axis.

15. The method of claim 10, further comprising:

interpreting a steering request value;

determining a steering response value in response to the steering request value; and providing at least one steering command in response to the steering response value, wherein at least one of the rotating actuator or the first steering actuator is responsive to the at least one steering command, thereby performing a steering operation of an EM beam from the EM source.

16. The method of claim 10, further comprising:

interpreting a steering request value and an actuator position value for at least one of the rotating actuator or the first steering actuator;

determining a steering configuration value in response to the steering request value and the actuator position value; and providing an EM beam command in response to the steering configuration value, wherein the EM source is responsive to the EM beam command to provide an EM beam, thereby performing a steering operation of the EM beam from the EM source.

17. The method of claim 10, wherein:

the at least one steering lens operationally coupled to a rotating actuator comprises a first lens group assembly;

the second steering layer further comprises a second lens group assembly, the second lens group assembly comprising at least one steering lens operationally coupled to a second rotating actuator; and an EM beam from the EM source is selectively steered using the first lens group assembly or the second lens group assembly.

18. The method of claim 17, the rotating actuator and the second rotating actuator counter-rotate.

* * * * *